(12) United States Patent
Nishimura et al.

(10) Patent No.: US 6,975,288 B2
(45) Date of Patent: Dec. 13, 2005

(54) METHOD OF DRIVING IMAGE-FORMING APPARATUS AND APPARATUS THEREOF

(75) Inventors: Michiyo Nishimura, Kanagawa (JP); Daisuke Sasaguri, Kanagawa (JP); Kazushi Nomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 09/956,305

(22) Filed: Sep. 20, 2001

(65) Prior Publication Data

US 2002/0036599 A1 Mar. 28, 2002

(30) Foreign Application Priority Data

Sep. 22, 2000 (JP) ........................................ 2000/289185
Sep. 18, 2001 (JP) ........................................ 2001/283052

(51) Int. Cl.[7] ................................................ G09G 3/22
(52) U.S. Cl. ..................... 345/74.1; 345/75.2; 345/208; 315/169.1; 315/169.3
(58) Field of Search ................................ 345/74.1, 75.1, 345/75.2, 204, 208, 209, 216; 315/169.1, 169.3, 161.9; 313/495, 292, 305–310, 74, 336–337

(56) References Cited

U.S. PATENT DOCUMENTS

| | | | |
|---|---|---|---|
| 3,681,650 A | 8/1972 | Koll ............................. | 315/30 |
| 4,084,259 A | 4/1978 | Cahill et al. ................. | 364/900 |
| 4,313,124 A | 1/1982 | Hara ............................ | 346/140 |
| 4,345,262 A | 8/1982 | Shirato et al. ............... | 346/140 |
| 4,449,150 A | 5/1984 | Kato ............................ | 358/283 |
| 4,459,600 A | 7/1984 | Sato et al. ................... | 346/140 |
| 4,463,359 A | 7/1984 | Ayata et al. .................. | 346/1.1 |
| 4,558,333 A | 12/1985 | Sugitani et al. ............. | 346/140 |
| 4,578,714 A | 3/1986 | Sugiura et al. .............. | 358/283 |
| 4,608,577 A | 8/1986 | Hori ............................ | 346/140 |
| 4,660,077 A | 4/1987 | Kawamura et al. ........... | 358/75 |

(Continued)

FOREIGN PATENT DOCUMENTS

| | | |
|---|---|---|
| EP | 0036296 A2 | 9/1981 |
| EP | 0291300 A2 | 11/1988 |

(Continued)

OTHER PUBLICATIONS

US 6,028,575, 2/2000, Todokoro et al. (withdrawn)

M.I. Elinson et al., *The Emission of Hot Electrons and the Field Emission of Electrons from Tin Oxide*, Radio Eng. And Electron Phys., (1965) pp. 1290–1296.

Hisashi Araki et al., *Electroforming and Electron Emission of Carbon Thin Films*, Journal of the Vacuum Society of Japan, vol. 26, No. 1, (1981) pp. 22–29 (English Abstract on p. 22).

(Continued)

*Primary Examiner*—Lun-yi Lao
(74) *Attorney, Agent, or Firm*—Fitzpatrick, Cella, Harper & Scinto

(57) ABSTRACT

Disclosed is an electron-emitting device, an electron source, and an image-forming apparatus that have uniform electron-emitting characteristics, emit electron beams whose diameters are small, have simple constructions, and are easy to be manufactured. The electron-emitting device comprising: a first electrode arranged on a surface of a substrate; an insulating layer arranged on the first electrode; a second electrode arranged on the insulating layer; and an electron-emitting film arranged on the second electrode, where the second electrode has two side surfaces that oppose each other in a direction parallel to the surface of the substrate, and the electron-emitting film is arranged so as to be shifted toward one of the two side surfaces.

12 Claims, 20 Drawing Sheets

U.S. PATENT DOCUMENTS

| | | | |
|---|---|---|---|
| 4,680,596 A | 7/1987 | Logan | 346/140 |
| 4,723,129 A | 2/1988 | Endo et al. | 346/1.1 |
| 4,725,849 A | 2/1988 | Koike et al. | 346/1.1 |
| 4,740,796 A | 4/1988 | Endo et al. | 346/1.1 |
| 4,860,026 A | 8/1989 | Matsumoto et al. | 346/1.1 |
| 4,939,583 A | 7/1990 | Tsuboi et al. | 358/261.1 |
| 4,951,157 A | 8/1990 | Koh et al. | 358/433 |
| 4,969,204 A | 11/1990 | Jones et al. | 382/56 |
| 5,020,120 A | 5/1991 | Weldy | 382/56 |
| 5,048,111 A | 9/1991 | Melnychuck et al. | 382/56 |
| 5,050,101 A | 9/1991 | Kiuchi et al. | 364/519 |
| 5,050,230 A | 9/1991 | Jones et al. | 382/56 |
| 5,060,285 A | 10/1991 | Dixit et al. | 382/56 |
| 5,086,487 A | 2/1992 | Katayama et al. | 382/56 |
| 5,111,302 A | 5/1992 | Chan et al. | 358/298 |
| 5,124,811 A | 6/1992 | Ohsawa | 358/448 |
| 5,136,396 A | 8/1992 | Kato | 358/426 |
| 5,138,672 A | 8/1992 | Hirabayashi et al. | 382/54 |
| 5,153,749 A | 10/1992 | Katayama | 358/448 |
| 5,159,468 A | 10/1992 | Yoshida et al. | 358/451 |
| 5,185,813 A | 2/1993 | Tsujimoto | 382/240 |
| 5,233,366 A | 8/1993 | Stephany | 347/15 |
| 5,270,738 A | 12/1993 | Takahashi et al. | 346/140 |
| 5,291,245 A | 3/1994 | Charnitski et al. | 355/208 |
| 5,327,254 A | 7/1994 | Daher | 358/261.1 |
| 5,430,469 A | 7/1995 | Shioya et al. | 347/15 |
| 5,521,717 A | 5/1996 | Maeda | 358/426 |
| 5,914,731 A | 6/1999 | Yano et al. | 347/9 |
| 5,939,823 A | 8/1999 | Kiyomiya et al. | 313/495 |
| 5,955,850 A * | 9/1999 | Yamaguchi et al. | 313/495 |
| 6,040,973 A * | 3/2000 | Okamoto et al. | 315/161.9 |
| 6,057,636 A | 5/2000 | Sakai et al. | 313/306 |
| 6,133,893 A * | 10/2000 | Maslennikov et al. | 345/74 |
| 6,169,528 B1 | 1/2001 | Oguchi et al. | 345/74 |
| 6,172,455 B1 | 1/2001 | Bancal et al. | 313/495 |
| 6,267,636 B1 | 7/2001 | Onishi et al. | 445/6 |
| 6,288,494 B1 | 9/2001 | Tsukamoto et al. | 315/169.1 |
| 6,339,414 B1 | 1/2002 | Todokoro et al. | 345/74.1 |
| 6,400,091 B1 | 6/2002 | Deguchi et al. | 315/169.1 |
| 6,437,503 B1 * | 8/2002 | Konuma | 313/495 |
| 6,445,367 B1 | 9/2002 | Suzuki et al. | 345/75.2 |
| 6,448,949 B1 | 9/2002 | Maslennikov et al. | 354/74 |
| 6,626,720 B1 * | 9/2003 | Howard et al. | 445/24 |

FOREIGN PATENT DOCUMENTS

| | | | |
|---|---|---|---|
| EP | 0392753 A3 | 10/1990 | |
| EP | 0526205 A2 | 2/1993 | |
| EP | 0526233 A2 | 2/1993 | |
| EP | 0558236 A2 | 9/1993 | |
| EP | 0 905 670 A1 | 3/1999 | |
| EP | 1 037 250 A1 | 9/2000 | |
| FR | 2497043 | 6/1982 | |
| GB | 2219114 A | 11/1989 | |
| JP | 54-56847 | 5/1979 | |
| JP | 55-28862 | 2/1980 | |
| JP | 57-2733 | 1/1982 | |
| JP | 59123670 | 7/1984 | |
| JP | 59138461 | 8/1984 | |
| JP | 60-49953 | 3/1985 | |
| JP | 60-71260 | 4/1985 | |
| JP | 61-228974 | 10/1986 | |
| JP | 63-98455 | 4/1988 | |
| JP | 1267048 | 10/1989 | |
| JP | 2187343 | 7/1990 | |
| JP | 3-46589 | 2/1991 | |
| JP | 4-18358 | 1/1992 | |
| JP | 5-169664 | 7/1993 | |
| JP | 5-212951 | 8/1993 | |
| JP | 8-96703 | 4/1996 | |
| JP | 08-096704 A | 4/1996 | H01J/1/30 |
| JP | 10-149778 | 6/1998 | |
| JP | 2000-251783 | 9/2000 | |
| JP | 2000-268706 | 9/2000 | |
| JP | 2002-063862 | 2/2002 | |

OTHER PUBLICATIONS

W.P. Dyke, et al., *Advances in Electronics and Electron Physics*, Academic Press Inc., (1956) pp. 90–184.

C.A. Mead, *Operation of Tunnel–Emission Devices*, Journal of Applied Physics, vol. 32 (1961) pp. 646–652.

C.A. Spindt et al., *Physical Properties of Thin–Film Field Emission Cathodes with Molybdenum Cones*, Journal of Applied Physics, vol. 47, No. 12 (1976) pp. 5248–5263.

G. Dittmer, *Electrical Conduction and Electron Emission of Discontinuous Thin Films*, Thin Solid Films—Elsevier Sequoia S.A. (1972), pp.317–328.

M. Hartwell et al., *Strong Electron Emission from Patterned Tin–Indium Oxide Thin Films*, Int'l Electron Devices Meeting (1975) pp. 519–521.

Toshiaki Kusunoki et al., *Fluctuation–Free Electron Emission from Non–Formed Metal–Insulator–Metal (MIM) Cathodes Fabricated by Low Current Anodic Oxidation*, Japanese J. Appl. Phys., vol. 32, No. 11B (1993) pp. 1695–1697.

* cited by examiner

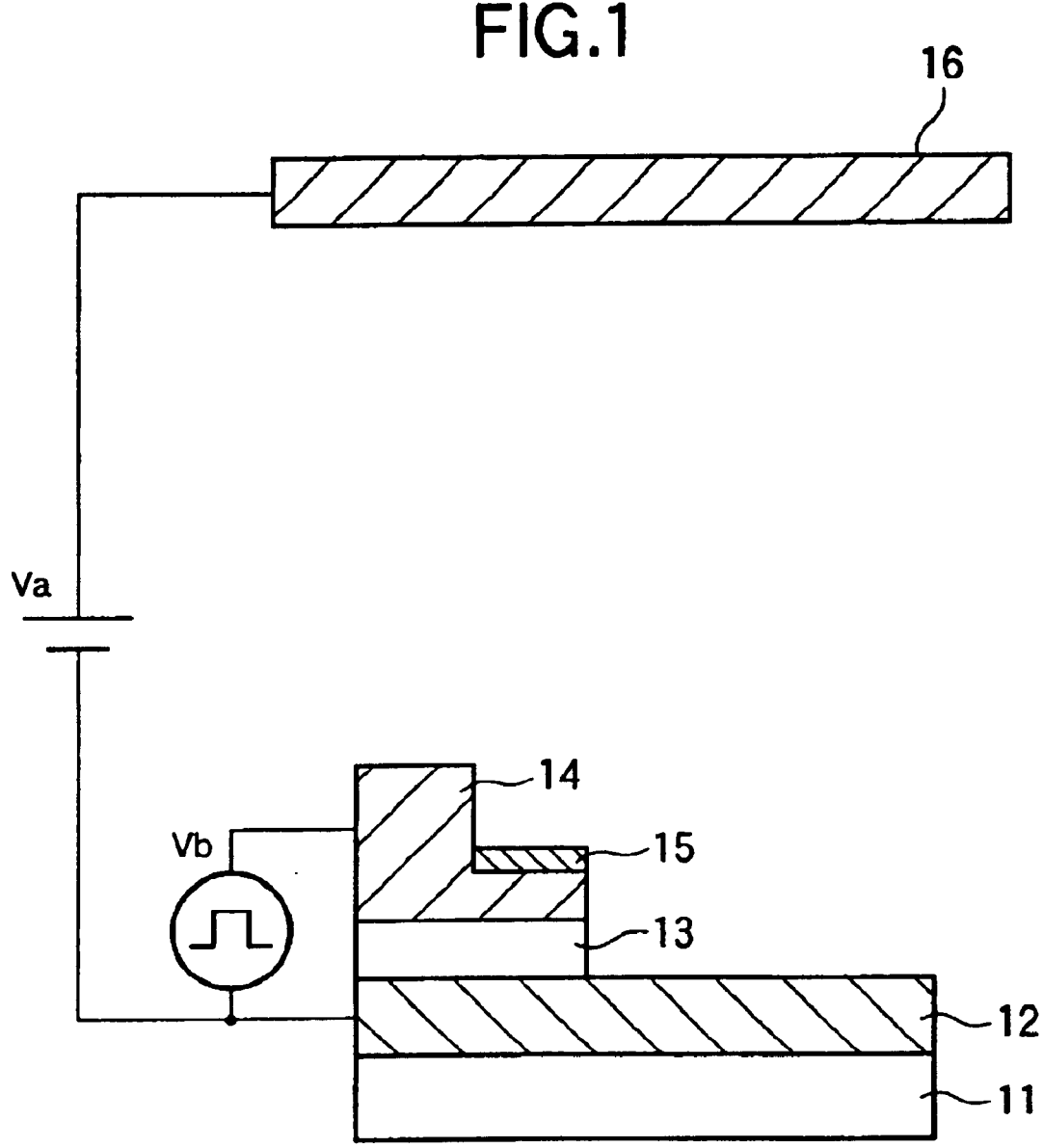

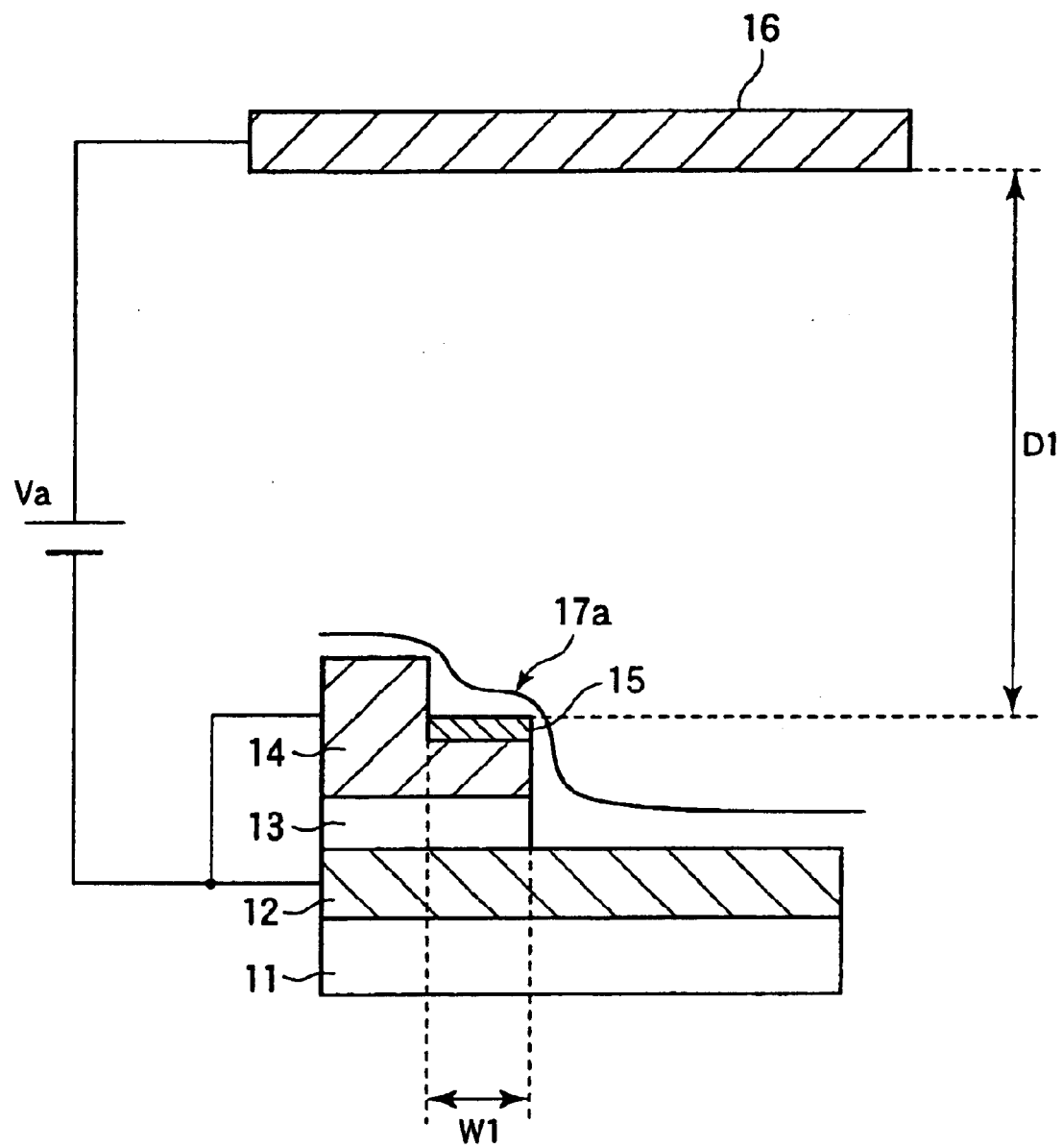

STRIPE

MATRIX

METHOD OF DRIVING IMAGE-FORMING APPARATUS AND APPARATUS THEREOF

BACKGROUND OF THE INVENTION

1. Field of the Invention

The present invention relates to an electron-emitting device, an electron-emitting apparatus using the electron-emitting device, an electron source in which a plurality of the electron-emitting devices are arranged, and an image-forming apparatus constructed using the electron source.

2. Related Background Art

There have been conventionally known two types of electron-emitting devices: thermionic cathode electron-emitting devices and cold cathode electron-emitting devices. The cold cathode electron-emitting devices include, in the category thereof, devices of electric field emitting type (hereinafter referred to as the "FE" type), devices of metal/insulating layer/metal type (hereinafter referred to as the "MIM" type), and surface conduction electron-emitting devices. The FE type electron-emitting devices include devices of diode type that extract electrons using anode electrodes and devices of edge emitter type that emit electrons from edge portions of emitters.

As the diode type electron-emitting devices, there has been known an device disclosed in U.S. Pat. No. 5,551,903.

As the edge emitter type electron-emitting devices, there have been known devices disclosed in Japanese Patent Application Laid-open No. 10-289650 and Japanese Patent Application Laid-open No. 8-298068.

SUMMARY OF THE INVENTION

In the case of the conventional techniques described above, there occur the following problems.

The application of electron-emitting devices to image-forming apparatuses, such as displays, needs enough emission current to have phosphor emit light having sufficient brightness. Also, to achieve high-definition displays, it is necessary that the diameter of electron beam applied onto phosphor are small and electron-emitting characteristics are uniform. Further, it is important that the electron-emitting devices are driven at low voltage and are easy to be manufactured.

FIG. 16 shows an example of the foregoing diode type electron-emitting devices among the FE-type electron-emitting devices.

The electron-emitting device in this example has a construction where a conductive material 302 is disposed on a substrate 301, a convex portion 304 made of a conductive material is formed on the conductive material 302 an electron-emitting film 305 is laminated on the top end of the convex portion 304, and electrons are extracted by an anode 306 disposed above these components. With this construction, however, the maximum electric field is applied to the end portion of the electron-emitting film 305, so that the beam diameter of emitted electrons tends to be increased.

Also, because electrons are extracted by the voltage applied to the anode 306, a large anode voltage is required in order to have a phosphor (not shown) arranged at the back of the anode 306 emit light having sufficient brightness. However, because the anode 306 doubles as a modulation voltage in this construction, it is difficult to apply a high voltage to the anode 306.

If a distance D2 between the anode 306 and the electron-emitting film 305 is reduced in view of these problems, the beam diameter of emitted electrons is decreased to some extent and the anode voltage required for electron emission is lowered. In this case, however, the energy of emitted electrons is also lowered and therefore it becomes difficult to have the phosphor emit light having sufficient brightness.

An example of the foregoing edge emitter type electron-emitting devices is shown in FIG. 17.

The electron-emitting device in this example has a construction where a cathode 312 is sandwiched between two gate electrodes 314, with insulating layers 313 being inserted between the cathode 312 and the gate electrodes 314. With this construction, the two gate electrodes 314 apply positive voltages ($0 < |Vg1| \leq |Vg2|$) to the cathode 312, thereby increasing the amount of electrons emitted from the cathode 312. In this case, however, the beam diameter of emitted electrons tends to be increased.

The present invention has been made in the light of the above-mentioned problems of the conventional techniques, and an object of the present invention is to provide an electron-emitting device, an electron source, and an image-forming apparatus, which are driven at low voltage, have uniform electron-emitting characteristics, produce electron beams having small diameters, have simple constructions, and are easy to be manufactured.

The present invention which has been attained to solve the above-mentioned problems is given below:

That is, an electron-emitting apparatus of the present invention is characterized in that: the apparatus comprises: an electron-emitting device including a first electrode, a second electrode that is provided so as to be insulated from the first electrode, and an electron-emitting film connected to the second electrode; and an anode provide at a predetermined distance from the electron-emitting film; and that the first electrode, the second electrode, and the electron-emitting film oppose the anode; a distance between the anode and the electron-emitting film is longer than a distance between the anode and the second electrode; and a distance between the anode and the first electrode is longer than the distance between the anode and the electron-emitting film.

Further, the electron-emitting device of the present invention is characterized in that: the device comprises: a first electrode arranged on a surface of a substrate, an insulating layer arranged on the first electrode, a second electrode arranged on the insulating layer, and an electron-emitting film arranged on the second electrode, and that the second electrode has two side surfaces that oppose each other in a direction parallel to the surface of the substrate; and the electron-emitting film is arranged so as to be shifted toward on of the two side surfaces.

An electron source is formed by arranging a plurality of the above electron-emitting devices, and is characterized in that the electron source emits electrons using at least one of the plurality of electron-emitting devices according to an input signal.

An image-forming apparatus is characterized by comprising the above electron source, and an image forming member on which an image is formed by irradiation with electrons emitted from the electron source.

With employment of the electron-emitting device according to the present invention, an electron beam, which is driven at a low voltage; is easy to produce; and has a small beam diameter, can be obtained, and in addition an electron source and an image-forming apparatus, which have uniform electron-emitting characteristics with high definition, and are stable for a long time period, can be realized.

DETAILED DESCRIPTION OF THE PREFERRED EMBODIMENTS

The preferred embodiment of the present invention will be exemplarily described in detail below with reference to the drawings. Note that the sizes, materials, shapes, relative positions, and other aspects of components described below should be appropriately changed according to the construction and various conditions of an apparatus to which the present invention is applied. Therefore, there is no intention to limit the scope of the present invention to the following description.

An electron-emitting device to which the present invention is applied has a characteristic that a first electrode, an electron-emitting film, and a second electrode oppose an anode, a step is formed between a surface of the first electrode opposing the anode and a surface of the electron-emitting film opposing the anode, another step is formed between the surface of the electron-emitting film opposing the anode and a surface of the second electrode opposing the anode, a distance from the surface of the first electrode opposing the anode to the anode is longer than that from the surface of the electron-emitting film opposing the anode to the anode, and a distance from the surface of the electron-emitting film opposing the anode to the anode is longer than that from the surface of the second electrode opposing the anode to the anode. That is the electron-emitting device is characterized in that it has a step-like construction.

As is apparent from this, the electron-emitting device to which the present invention is applied can be constructed merely by laminating the components. This means that the electron-emitting device is easy to be manufactured and the construction thereof is easy to be controlled. As a result, the uniformity of the electron-emitting characteristics of the electron-emitting device is increased.

Also, the electron-emitting device to which the present invention is applied is characterized in that it is a triode device where the emission of electrons from the electron-emitting film is cause by the anode to which a given voltage is applied and the emitted electrons are controlled by the first electrode functioning as a modulation electrode.

In the electron-emitting device to which the present invention is applied, the first electrode on the substrate functions as a modulation electrode. This makes it possible to apply a high voltage to the anode, so that emitted electrons strike a phosphor with energy that is enough to have the phosphor emit light. As a result, light having sufficient brightness is emitted from the phosphor.

Also, by applying a voltage, which is lower than that applied to the electron-emitting film, to the electrode used as a modulation electrode, the strength of an electric filed applied to an electron-emitting region of the electron-emitting film can be decreased without difficulty. This makes it possible to drive the electron-emitting device, to which the present invention is applied, at low voltage.

Figure 2:
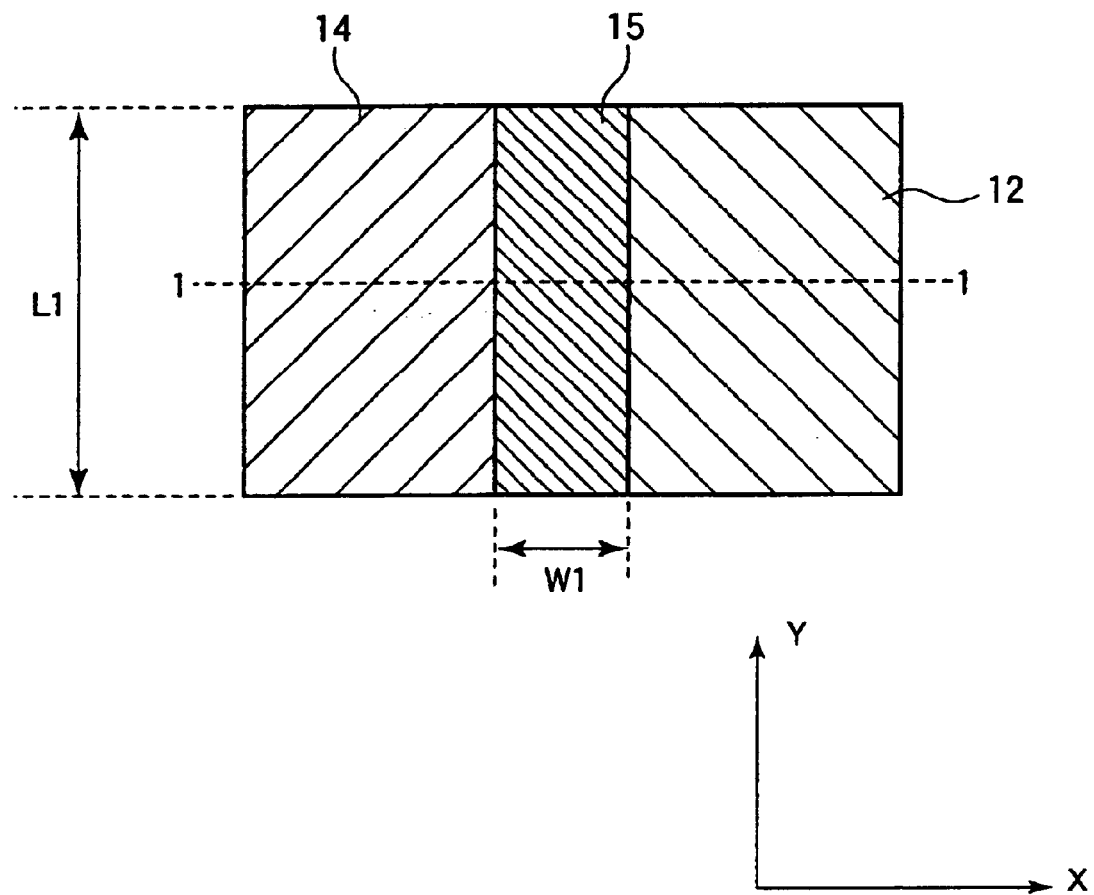
FIG. 2 is a schematic plain view showing the construction of the electron-emitting device to which the present invention is applied.
Figure 4:
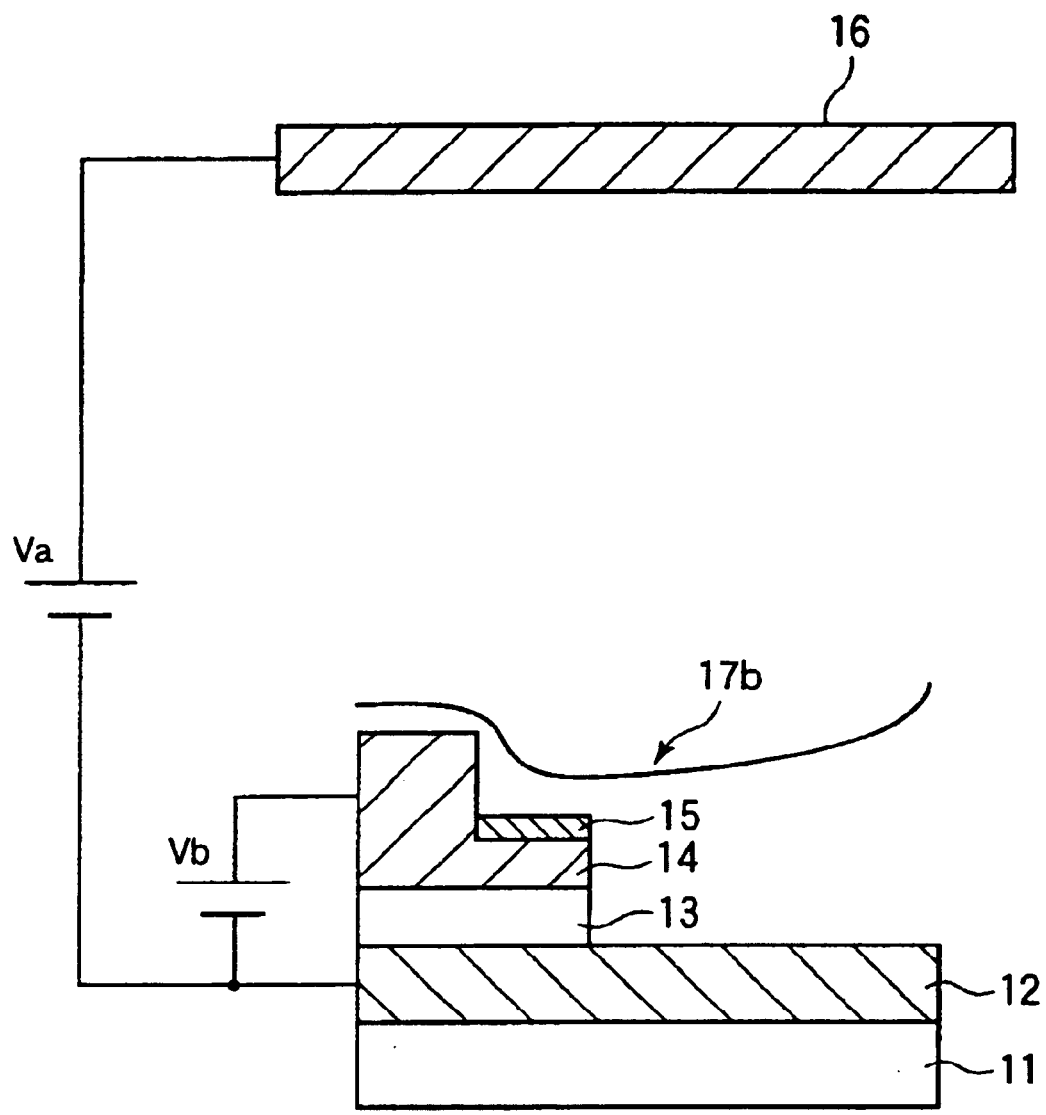
FIG. 4 is a schematic cross-sectional view showing a state where the emission of electrons from the electron-emitting device, to which the present invention is applied is prohibited.
Figure 3:
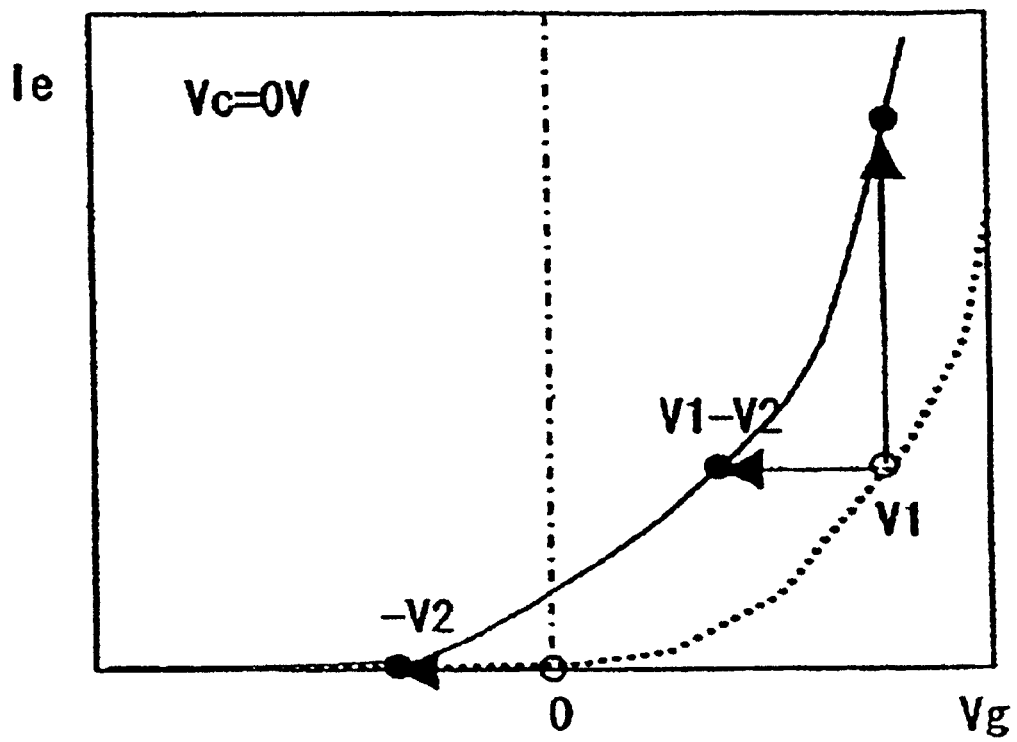
FIG. 3 is a schematic cross-sectional view showing a state where electrons are emitted from the electron-emitting device to which the present invention is applied.

FIG. 2 is a schematic plain view showing the construction of the electron-emitting device according to an embodiment of the present invention, while FIG. 1 is a schematic diagram of an electron-emitting apparatus in which an anode is disposed so as to oppose the electron-emitting device. Here, FIG. 1 is a schematic cross-sectional view taken along the line 1—1 in FIG. 2. Also, FIG. 3 is a schematic cross-sectional view showing a state where electrons are emitted from the electron-emitting film in the electron-emitting apparatus. Further, FIG. 4 is a schematic cross-sectional view showing a state where the emission of electrons from the electron-emitting film is prohibited in the electron-emitting apparatus.

In FIGS. 1 and 2, reference numeral 11 represents a substrate; numeral 12, a first electrode; numeral 13, an insulating layer; numeral 14, a second electrode; numeral 15, an electron-emitting film that is a conductive film; numeral 16, an anode; symbol W1, the width of the step of the second electrode; and symbol L1, an electrode length.

The width W1 of the step of the second electrode is appropriately set according to the materials and resistance of the components, the work function and driving voltage of the material of the second electrode 14, and the required shape of the electron beam to be emitted. The width W1 is usually set in a range of several nm to several hundred μm, and preferably in a range of several ten nm to several μm. Also, the electron length L1 is appropriately set according to the materials and resistance value of the components and the position of the electron-emitting device. The electrode length L1 is usually set in a range of several hundred nm to several mm, and preferably in a range from several nm to several hundred μm.

Symbol Va denotes a voltage applied to the anode 16, which is a positive electrode, by a first voltage applying means. The potential applied to the anode 16 is higher than those applied to the first electrode 12 and the second electrode 14. Symbol Vb represents a voltage applied between the first electrode 12 and the second electrode 14 by a second voltage applying means. In more detail, Vb[V]= potential[V] of the first electrode 12-potential[V] of the second electrode 14. The electric field applied to the electron-emitting film 15 is formed by the voltages Va and Vb.

FIG. 3 is a schematic cross-sectional view showing an example driving method where electrons are emitted from the electron-emitting device according to this embodiment. In this drawing, reference numeral 17a represents an equipotential surface formed in the vicinity of the electron-emitting film 15 during the electron emission. This drawing relates to a case where the voltage Vb is set at 0V during the electron emission. The shape of the equipotential surface 17a is determined by the magnitude of the voltage Va and the thickness and width of each component of the electron-emitting device. However, the electric field applied to the end portion of the electron-emitting film 15 is greater than those applied to other portions thereof, so that electrons are emitted only from the end portion. As a result, the beam diameter of the emitted electrons becomes small. In particular, the electric field applied to a portion of the electron-emitting film 15 in the vicinity of the step portion of the second electrode is extremely small. Also, the thickness and width of each component of the electron-emitting devices may be freely set at values suitable for the application purpose.

Also, if the voltage Vb is set at 0V, there may be cases where no electrons are emitted, depending on respective parameters such as the material of the electron-emitting film 15, the shape of the second electrode 14, the distance between the anode 16 and the electron-emitting film 15, and the potential applied to the anode 16. Therefore, with the construction of the electron-emitting device according to this embodiment, the strength of the electric field applied to the end portion of the electron-emitting film 15 is increased not by setting the voltage Vb at 0V but by setting the potential of the first electrode 112 at a value higher than that of the potential of the second electrode 14. This relaxes the requirements that need to be satisfied by the foregoing parameters.

As a result, with the construction of the electron-emitting device of the present invention, the voltage Vb is not limited to 0V. That is, when the electron-emitting device of the present invention is driven, it is preferable that the potential of the first electrode 12 is set at a value higher than that of the potential of the second electrode 14. As a result, during the driving of the electron-emitting device of the present invention, the voltage (Vb) applied between the first and second electrodes satisfies a condition "Vb≧0[V]", or preferably a condition "Vb>0[V]".

Also, FIG. 4 is a schematic cross-sectional view showing an example driving method where the electron emission from the electron-emitting device of the present invention is prohibited. In this drawing, reference numeral 17b represents an equipotential surface formed in the vicinity of the electron-emitting film 15. In this example, the potential applied to the second electrode 14 is higher than that applied to the first electrode 12 (Vb<0V). The shape of the equipotential surface 17b is determined by the magnitudes of the voltages Va and Vb, a distance D1, and the thickness and width of each component. Because the voltage applied to the second electrode 14 is higher than that applied to the first electrode 12 in this example, the equipotential surface in the vicinity of the end portion of the electron-emitting film 15 is lifted toward the anode 16 and the electric field applied to the end portion of the electron-emitting film 15 is weakened. As a result, no electrons are emitted from the electron-emitting film 15.

Also, a potential difference Vb required to prevent the electron emission from the electron-emitting film 15 is determined by the magnitude of the voltage Va, the distance D1, and the thickness of each component arranged between the substrate and the electron-emitting film 15. The potential difference can be reduced by freely selecting values that are suitable for an application purpose.

Also, in the foregoing electron-emitting device of the present invention, as described by referring to FIG. 3, a surface part (convex portion) of the second electrode 14, whose distance to the anode electrode 16 is shorter than the distance between the electron-emitting film 15 and the anode electrode 16, increases the strength of the electric field applied to the end portion of the electron-emitting film 15. Thus, the strength of the electric field applied thereto becomes greater than those of the electric fields applied to other portions of the electron-emitting film 15. Therefore, it is most preferable that the distance between the anode 16 and part of the surface of the second electrode 14 is shorter than the distance between the anode 16 and the surface of the end portion of the electron-emitting film 15.

Figure 18A:
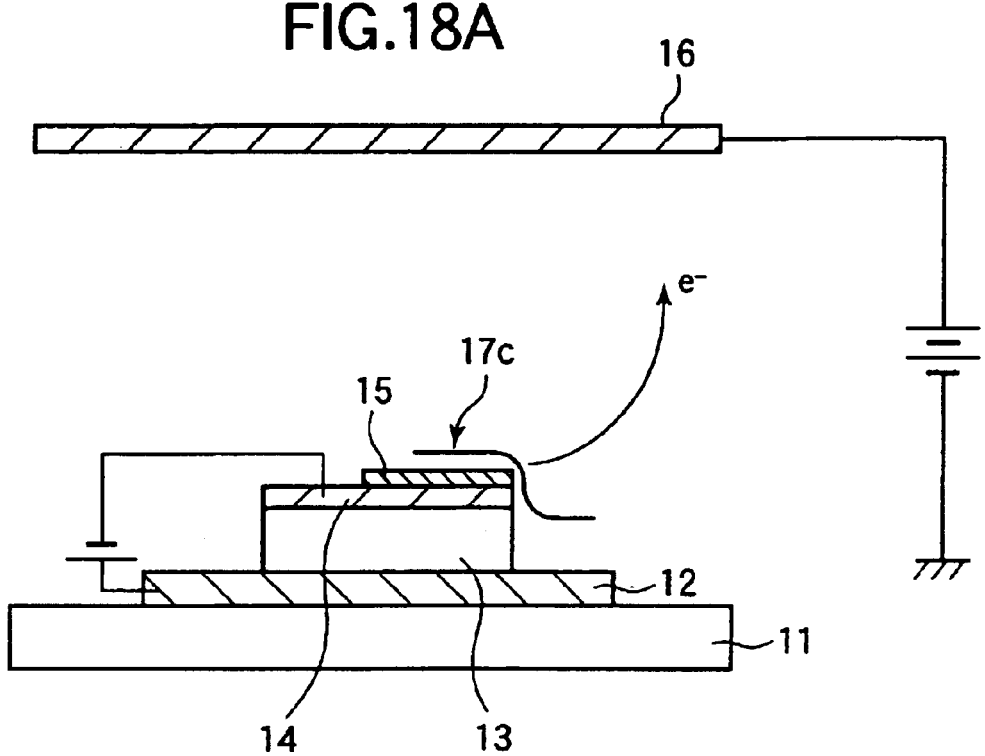
FIGS. 18A and 18B are schematic cross-sectional views used to explain the construction of the electron-emitting device of the present invention.

The electron-emitting device of the present invention, however, may have a construction where the distance between the second electrode 14 and the substrate 11 is shorter than that between the electron-emitting film 15 and the substrate 11 (the distance between the electron-emitting film 15 and the anode electrode 16 is shorter than that between the second electrode 14 and the anode electrode 16). That is, as shown in FIG. 18A, the electron-emitting device may have a construction where the first electrode 12 is arranged on the surface of the substrate 11, the insulating layer 13 is arranged on the first electrode 12, the second electrode 14 is arranged on the insulating film 13, and the electron-emitting film 15 is arranged on the second electrode 14. Note that symbol 17c in FIG. 18A denotes an equipotential surface formed in the vicinity of an electron-emitting portion. Similarly to the case of the electron-emitting device shown in FIG. 3, the driving voltage (voltage applied between the first electrode and the second electrode) Vb in FIG. 18A satisfies the condition "Vb≧0[V]", or preferably the condition "Vb>0[V]".

It should be noted here that in the case of the construction shown in FIG. 18A, like the construction shown in FIGS. 2 and 3, the electron-emitting film 15 is (eccentrically) arranged adjacent to one end portion of the second electrode 14. In other words, the electron-emitting film 15 is arranged so as to be shifted toward one of two side surfaces (edges) of the second electrode 14 that are opposite to each other in a direction substantially parallel to the surface of the substrate. Also, in other words, the electron-emitting film 15 is arranged so as to be shifted toward one of two end portions of the second electrode 14 that are opposite to each other in a direction substantially parallel to the surface of the substrate.

Figure 18B:
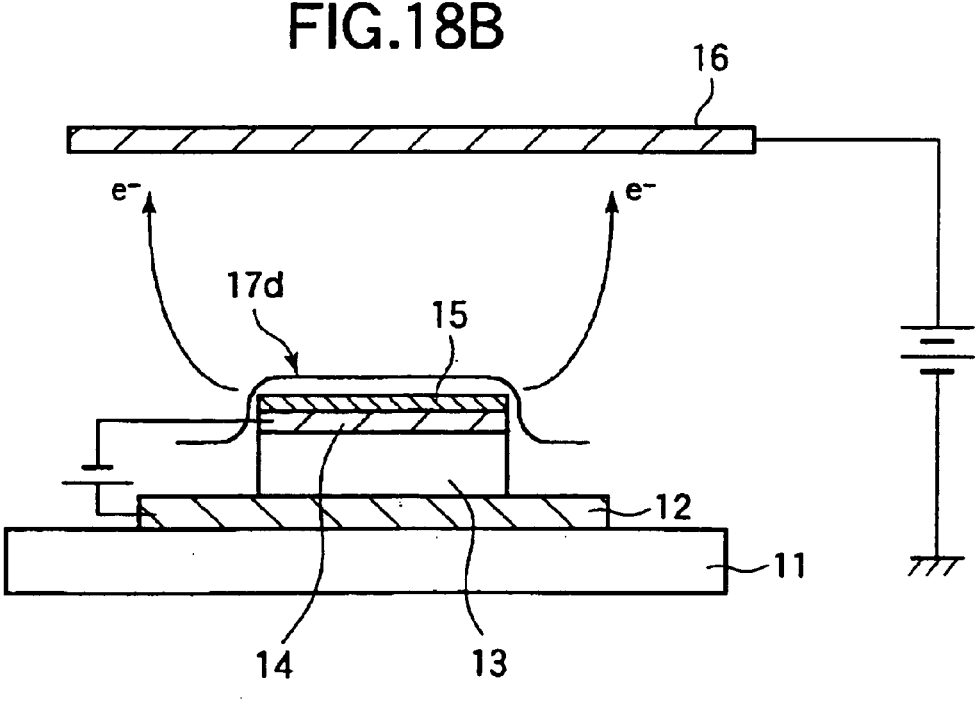

If the electron-emitting film 15 is arranged to entirely cover a surface of the second electrode 14 as shown in FIG. 18B, electrons are emitted from both ends of the electron-emitting film 15 and therefore the diameter of an electron beam is increased. Note that symbol 17d is FIG. 18B denotes an equipotential surface formed in the vicinity of an electron-emitting region.

An example method of manufacturing the foregoing electron-emitting device of the present invention is described below with reference to FIGS. 1 and 5A to 5G.

First, a lamination member is produced by sufficiently cleaning the surfaces of quartz glass, glass in which the amount of impurities, such as Na, is reduced, a soda lime glass, a silicon substrate, or the like, and then laminating $SiO_2$ film thereon with a sputtering method or the like. Alternatively, an insulating substrate is produced using ceramics such as alumina. The lamination member or the insulating substrate is used as the substrate 11. Then, the first electrode 12 is laminated on the substrate 11.

In general, the first electrode 12 has conductivity and is formed with a general vacuum layer formation technique, such as a vapor deposition method or a sputtering method, or a photolithography method. The material of the first electrode 12 is, for instance, appropriately selected from a group of carbon and a carbon compound consisting of metals (such as Be, Mg, Ti, Zr, Hf, V, Nb, Ta, Mo, W, Al, Cu, Ni, Cr, Au, Pt, and Pd), their alloys, a carbide (such as TiC, ZrC, HfC, TaC, SiC, and WC), a boride (such as $HfB_2$, $ZrB_2$, $LaB_6$, $CeB_6$, $YB_4$, and $GdB_4$), a nitride (such as TiN, ZrN, and HfN), a semiconductor (such as Si and Ge), an organic highpolymer material, an amorphous carbon, graphite, diamond like carbon, carbon in which diamond is dispersed, and a carbon compound. The thickness of the first electrode 12 is set in a range of several ten nm to several mm, and preferably in a range of several hundred nm to several $\mu$m.

Next, the insulating layer 13 is stacked on the first electrode 12. The insulating layer 13 is formed with a general vacuum layer formation technique, such as a sputtering method, a CVD method, or a vacuum evaporation method. The thickness of the insulating layer 13 is set in a range of several nm to several $\mu$m, and preferably in a range of several ten nm to several hundred nm. It is preferable that the insulating layer 13 is made of a material, such as $SiO_2$, SiN, $Al_2$, $O_3$, Caf, and undoped diamond, that has a high withstand voltage and is resistant to a high electric field.

Figure 5A:
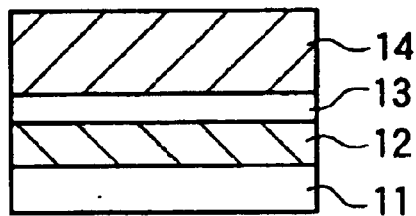
FIGS. 5A, 5B, 5C, 5D, 5E, 5F ad 5G show an example method of manufacturing the electron-emitting device to which the present invention is applied.

Further, as shown in FIG. 5A, the second electrode 14 is stacked on the insulating layer 13. Like the first electrode 12, the second electrode 14 has conductivity and is formed with a general vacuum layer formation technique, such as a vapor deposition method or a sputtering method, or a photolithography method. The material of the second electrode 14 is, for instance, appropriately selected from a group consisting of metals (such as Be, Mg, Ti, Zr, Hf, V, Nb, Ta, Mo, W, Al, Cu, Ni, Cr, Au, Pt, and Pd), their alloys, a carbide (such as TiC, ZrC, HfC, TaC, SiC, and WC), a boride (such as $HfB_2$, $ZrB_2$, $LaB_6$, $CeB_6$, $YB_4$, and $GdB_4$), a nitride (such as TiN, ZrN, and HfN), a semiconductor (such as Si and Ge), and an organic highpolymer material. The thickness of the second electrode 14 is set in a range of several nm to several ten $\mu$m, and preferably in a range of several ten nm to several $\mu$m.

It should be noted here that it does not matter whether the first and second electrodes 12 and 14 are made of the same material or different materials. Also, it does not matter whether these electrodes 12 and 12 are formed with the same method or different methods.

Figure 5B:
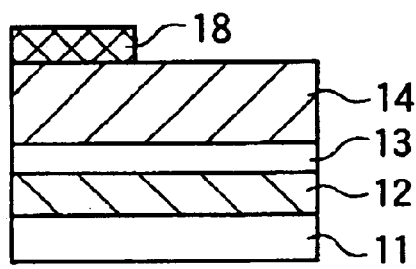

Next, as shown in FIG. 5B, a mask pattern 18 is formed using a photolithography technique.

Figure 5C:
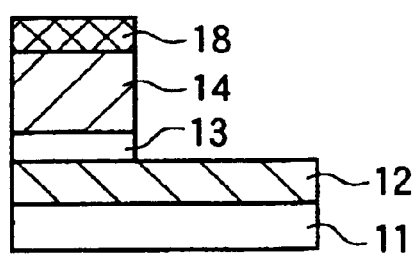

Following this, the lamination structure shown in FIG. 5C is obtained by partially removing the insulating layer 13 and the second electrode 14 from the lamination device including the first electrode 12. Note that it does not matter whether the etching operation is terminated before the first electrode 12 is etched or is continued until the first electrode 12 is partially etched. The etching method used in this etching step is appropriately selected according to the material of the insulating layer 13 and the second electrode 14.

Figure 5D:
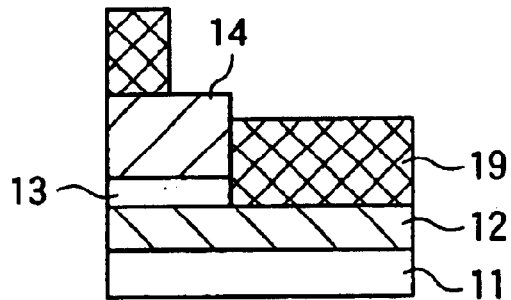

Next, the mask pattern 18 is peeled off and then another mask pattern 19 is formed using a photolithography technique as shown in FIG. 5D.

Figure 5E:
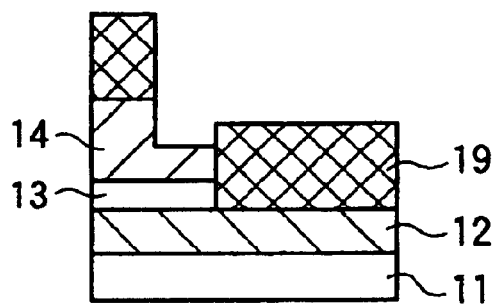

Then, a shown in FIG. 5E, a part of the second electrode 14 is removed to obtain a step-like shape of the second electrode 14. This etching step needs to be terminated before the second electrode 14 is completely etched from the top surface to the bottom surface.

Figure 5F:
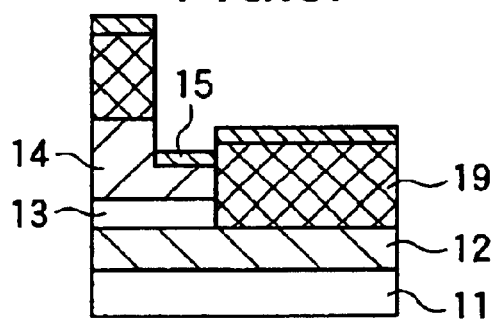

Following this, as shown in FIG. 5F, the electron-emitting film 15 is disposed using a general vacuum layer formation technique, such as a vapor deposition method or a sputtering method, or a photolithography method. The material of the electron-emitting film 15 is, for instance, appropriately selected from a group consisting of graphite, fullerene, carbon nanotubes, graphite nanofibers, diamond like carbon, carbon in which diamond is dispersed. It is preferable that the electron-emitting film 15 is made of a thin diamond film or diamond like carbon having a low work function. It is particularly preferable that the electron-emitting film 15 is made of fiber comprises carbon as a main ingredient (referred to as "fibrous carbon") that easily emit electrons in a low electric field, such as graphitic nanofibers or carbon nanotubes. The thickness of the electron-emitting film 15 is set in a range of several nm to several $\mu$m, and preferably in a range of several nm to several hundred nm.

If the fibers whose main ingredients are carbon are used as the material of the electron-emitting film 15, the electron-emitting film 15 becomes an aggregate of a plurality of fibers whose main ingredients are carbon.

Figure 19:
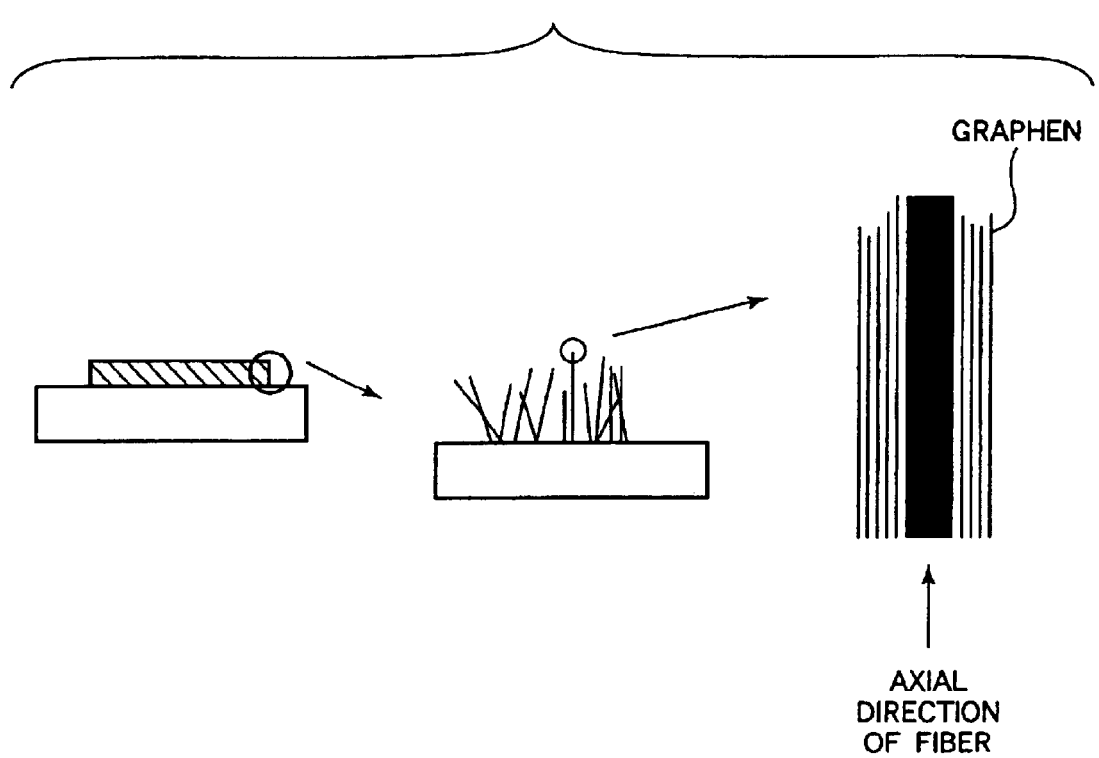
FIG. 19 is a schematic diagram illustrating a construction of a fiber whose main ingredient is carbon.
Figure 20:
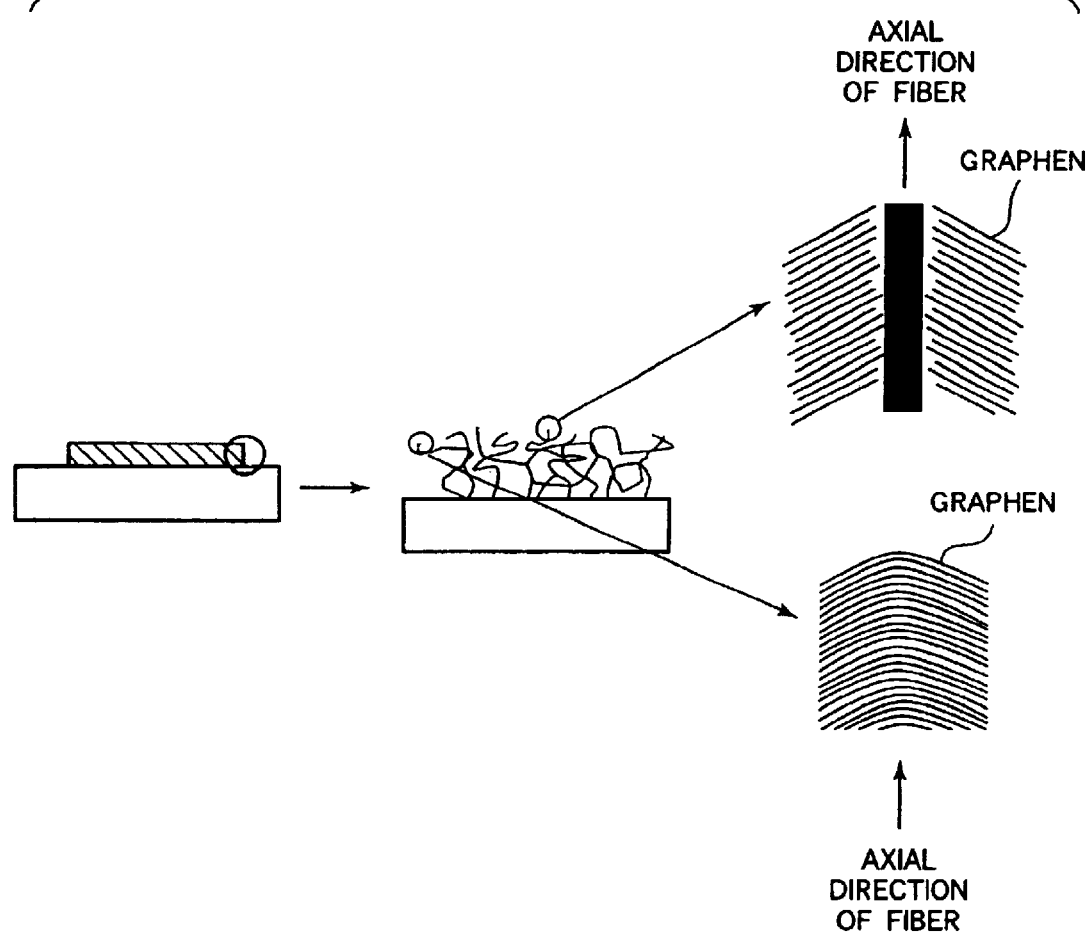
FIG. 20 is a schematic diagram illustrating another construction of the fiber whose main ingredient is carbon.

The fibers whose main ingredients are carbon has a threshold electric field of several V/$\mu$m. Examples of the aggregate of fibers whose main ingredients are carbon are shown in FIGS. 19 and 20. In each drawing, the carbon configuration captured at an optical microscope level (~1000× magnification) is schematically shown in the left area, the carbon configuration captured at a scanning electron microscope (SEM) level (~3000× magnification) is schematically shown in the center area, and the carbon configuration captured at a transmission electron microscope (TEM) level (~1000000× magnification) is schematically shown in the right area.

A graphene that has a cylindrical shape as shown in FIG. 19 is called a carbon nanotube (a cylindrical graphene having a multi-layered structure is called a multi-wall nanotube). In particular, in the case of a shape where the tip of the tube is expanded, the threshold value is reduced to a minimal level.

FIG. 20 shows a fiber that may be produced at a relatively low temperature to include carbon as its main ingredient. The fiber shown in FIG. 20 is a graphene layered product. Therefore, this fiber is called a "graphite nanofiber" in some cases, although the ratio of an amorphous structure increases depending on the temperature. In more detail, the graphite nanofiber is a fibrous substance in which graphens are layered (laminated) in the longitudinal direction thereof (in the axial direction of the fiber). In other words, as shown in FIG. 20, the graphite nanofiber is a fibrous substance in which plurality of graphenes are layered (laminated) so as not be parallel to the fiber axis.

On the other hand, the carbon nanotube is a fibrous substance in which graphens are arranged (in cylindrical shape) around the longitudinal direction of the fiber (the axial direction of the fiber). In other words, the carbon nanotube is a fibrous substance in which graphenes are arranged substantially parallel to the fiber axis.

It should be noted here that a single plane of graphite is referred to as a "graphene" or a "graphene sheet". In more detail, the graphite has a construction where regular hexagons formed by carbon atoms having covalent bonds attributed to $sp^2$ hybrid orbital are arranged to form a carbon plane and a plurality of carbon planes having such a construction are laminated with a distance of 3.354Å therebetween. Each of these carbon planes is referred to as a "graphene" or a "graphene sheet".

In either case of these fibers whose main ingredients are carbon, the threshold value concerning electron emission is around $1V-10/\mu m$. Therefore, these fibers are both suitable as the material of the electron-emitting film 15 of the present invention.

In particular, an electron-emitting device using an aggregate of graphite nanofibers causes electron emission in a low electric field, achieves large emission current, is easy to be manufactured, and has a stable electron-emitting characteristic. Also, in an electron-emitting apparatus, light-emitting apparatus, and image display apparatus using the graphite nanofibers, stable electron emission is performed without maintaining the inside of these apparatuses in a ultra-high vacuum state, unlike conventional electron-emitting devices. Also, electrons are emitted in a low electric field, so that an apparatus with a high degree of reliability is manufactured without difficulty.

The stated fibers whose main ingredients are carbon can be produced by dissolving a hydrocarbon gas using a catalyst (a material promoting the deposition or carbon). The carbon nanotube differs from the graphite nanofiber in the type of a catalyst and the dissolving temperature.

As to the material of the catalyst, a material such as Fe, Co, Pd, or Ni, or an alloy of materials selected therefrom may be used as a nucleus for forming a fiber whose main ingredient is carbon.

In particular, in the case of Pd or Ni, it is possible to produce a graphite nanofiber at a low temperature (400° C. or higher). If a carbon nanotube is produced using Fe or Co, however, the temperature needs to be increased to 800° C. or higher. Because the production of a graphite nanofiber using Pd or Ni is possible at a low temperature, these materials are preferable in terms of the effects on other components and the manufacturing cost.

Further, by utilizing a characteristic that oxides are reduced by hydrogen at a low temperature (room temperature) in the case of Pd, the nucleus may be formed using palladium oxide.

If the palladium oxide is subjected to a hydrogen reduction process, it becomes possible to form an initial aggregation nucleus at a relatively low temperature (200° C. or lower) without using a conventional nucleus formation technique, such as the heat aggregation of a thin metal film or the generation and vapor deposition of ultra-fine particles.

As the hydrocarbon gas described above, there may be used a hydrocarbon gas (such as ethylene, methane, propane, or propylene), CO gas, $CO_2$ gas, or a steam of an organic solvent (such as ethanol or acetone), for instance.

Figure 5G:
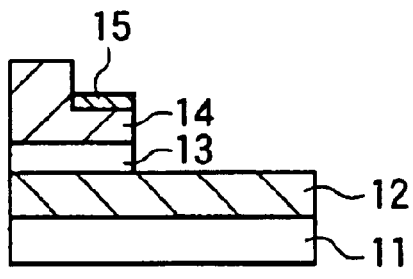

Finally, the mask pattern 19 is peeled off as shown in FIG. 5G. In this manner, the electron-emitting device of the present invention is manufactured.

The electron-emitting device shown in FIG. 1 that has been described above as an example of the present invention has a construction where the first electrode 12 is disposed on the substrate 11 and a convex portion composed of the insulating layer 13, the second electrode 14, and the electron-emitting film 15 is formed on a part of the surface of the first electrode 12. Also, a part of the second electrode 14 has a step-like shape and the electron-emitting film 15 is disposed on the lower surface of the second electrode 14. However, the electron-emitting device of the present invention is not limited to this construction and the second electrode 14 may be composed of a plurality of layers. Also, so long as the layers are electrically connected and have the same potential, it is not required that these layers are successively laminated on each other. That is, at least one different component, such as the electron-emitting film 15 or the insulating layer 13, may be inserted between the second electrode layers. Further, the first electrode 12 may be disposed only in an area of the substrate 11 in which the convex portion is not formed. Also, the surface of the electron-emitting film 15 may have any one of a polygon shape, a slit shape, at least one part of a circle shape, and at least one part of an ellipse shape.

Example applications of the electron-emitting device of the present invention are described below.

For instance, an electron source or an image-forming apparatus may be constructed by arranging a plurality of the electron-emitting devices of the present invention on a substrate.

An electron source produced by arranging a plurality of the electron-emitting devices of the present invention is described below with reference to FIG. 6. In this drawing, symbol 121 denotes an electron source substrate, numeral 122 X-directional wiring, numeral 123 Y-directional wiring, numeral 124 the electron-emitting devices according to the present invention, and numeral 125 connection wiring.

There are m X-directional wiring 122 (Dx1, Dx2, . . . , Dxm) that are made of a conductive metal or the like using a vacuum evaporation method, a printing method, a sputtering method, or the like. The material, thickness, and width of each wire is determined as appropriate. There are n Y-directional wiring 123 (Dy1, Dy2, . . . , Dyn) that are produced in the same manner as the X-directional wiring 122. An interlayer insulating layer (not shown) is provided between the m X-directional wiring 122 and the n Y-directional wiring 123 so as to electrically insulate these wiring. Here, m and n are each a positive integer.

The interlayer insulating layer (not shown) is made of $SiO_2$ or the like using a vacuum evaporation method, a printing method, a sputtering method, or the like. For instance, the interlayer insulating layer having a desired shape is produced to cover the entire or a part of the surface of the electron source substrate 121 on which the X-directional wiring 122 have been formed. In particular, the thickness, material, and production method of the interlayer insulating layer are determined as appropriate so that the interlayer insulating layer is resistant to potential differences at the intersections of the X-directional wiring 122 and the Y-directional wiring 123. The X-directional wiring 122 and the Y-directional wiring 123 are extended to the outside as external terminals.

A pair of electrode layers (not shown) constituting the electron-emitting device 124 are electrically connected to the m X-directional wiring 122 and the n Y-directional wiring 123 by the connection wiring 125 made of a conductive metal or the like.

The X-directional wiring 122, the Y-directional wiring 123, the connection wiring 125, and the pair of device electrodes may be made of partially or completely the same component devices or made of different devices. The foregoing wiring are made of materials appropriately selected from the foregoing materials of the first electrode 12 and the second electrode 14 that are the device electrodes. If the same material is used to produce the device electrodes and the wiring, the wiring connected to the device electrodes may also be called device electrodes. Also, the device electrodes may be used as wiring electrodes.

To select the rows of the electron-emitting device 124 arranged in the X-direction, a scanning signal applying means (not shown) for applying a scanning signal is connected to the X-directional wiring 122. On the other hand, to modulate each column of the electron-emitting device 124 arranged in the Y-direction according to an input signal, a modulation signal generating means (not shown) is connected to the Y-directional wiring 123. The driving voltage applied to each electron-emitting device is supplied as the difference voltage between the scanning signal and the modulation signal applied to the electron-emitting device.

The above-mentioned construction makes it possible to select respective electron-emitting devices and independently drive the selected electron-emitting devices using a passive matrix wiring. An image-forming apparatus formed using an electron source having the foregoing passive matrix configuration is described below with reference to FIG. 7. This drawing is a schematic diagram showing an example of a display panel of the image-forming apparatus.

Figure 7:
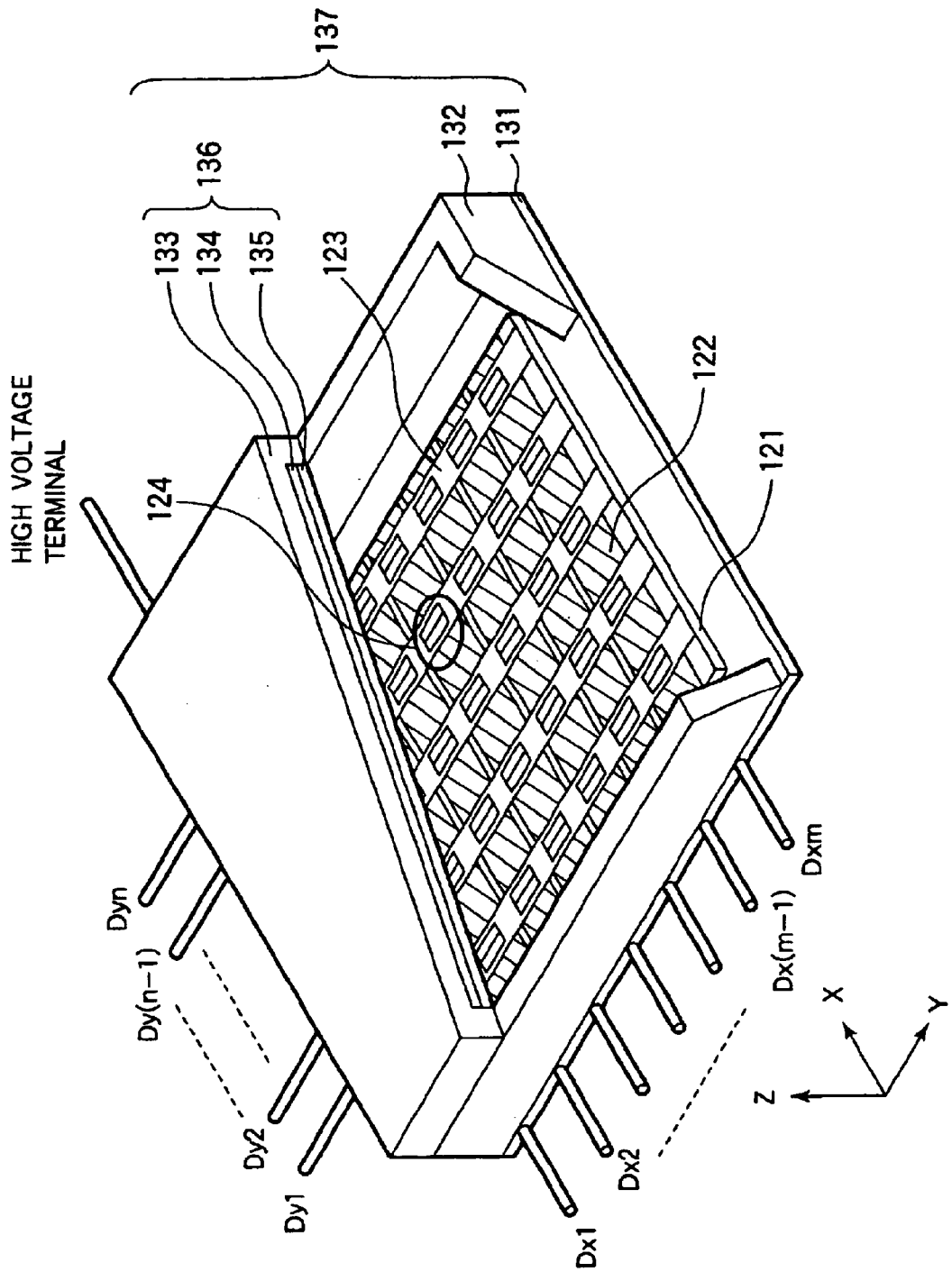
FIG. 7 is a schematic view showing the construction of an image-forming apparatus that uses the electron source having the passive matrix configuration according to the embodiment of the present invention.

Referring to FIG. 7, reference numeral 121 represents a substrate of the electron source on which a plurality of the electron-emitting devices 124 of the present invention are arranged in the manner described above, numeral 131 a rear plate to which the electron source substrate 121 is secured, numeral 136 a face plate having a construction where a fluorescent film 134 (a phosphor), a metal back 135, and the like serving as image forming members are formed on the internal surface of a glass substrate 133, and numeral 132 a support frame. An envelope 137 is formed using the rear plate 131, the support frame 132, and the face plate 136 by applying frit glass or the like to their connection portions and then baking, in the air or a nitrogen atmosphere, the foregoing components at 400° C. to 500° C. for 10 minutes or longer to seal the components.

The envelope 137 is, as described above, formed by the face plate 136, the support frame 132, and the rear plate 131. Because the rear plate 131 is provided to mainly reinforce the strength of the electron source substrate 121, the rear plate 131 is not required if the electron source substrate 121 itself has sufficient strength. In this case, the support frame 132 may be directly sealed to the electron source substrate 121 to form the envelope 137 using the face plate 136, the support frame 132, and the electron source substrate 121. Also, by inserting a support member called a spacer (not shown) between the face plate 136 and the rear plate 131, the envelope 137 may be made to be sufficiently strong against the atmospheric pressure.

Figure 8A:
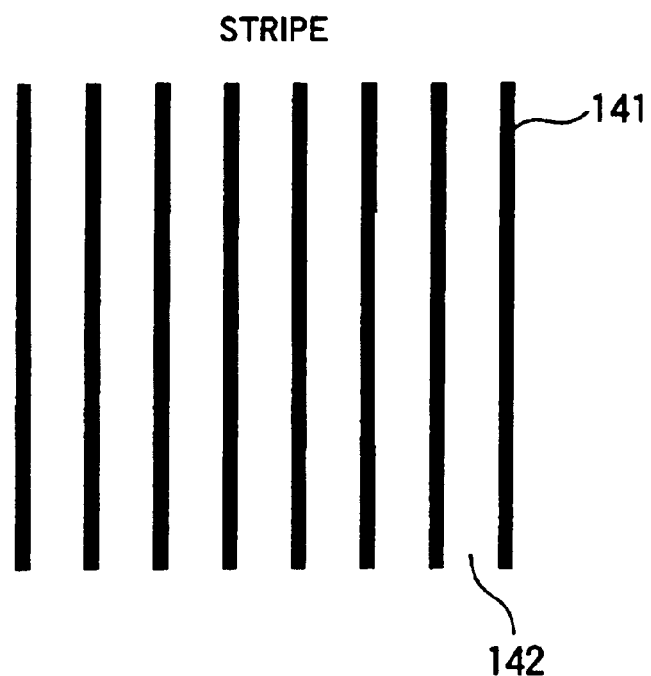
FIGS. 8A and 8B each sow a fluorescent film in the image-forming apparatus according to the embodiment of the present invention.
Figure 8B:
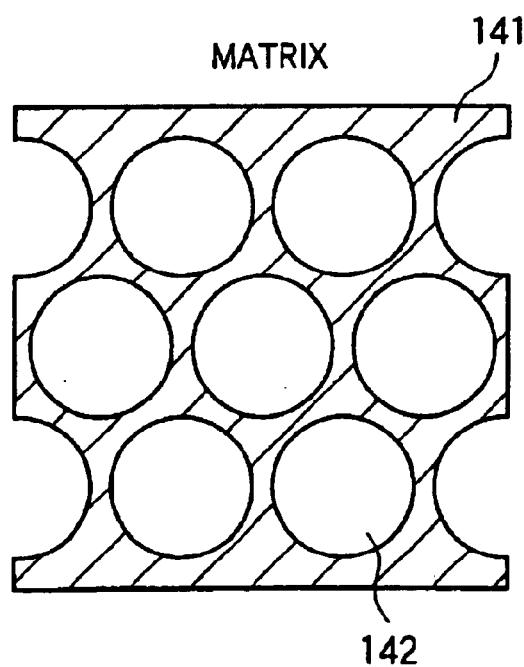

It should be noted here that in the image-forming apparatus using the electron-emitting devices according to the present invention, a phosphor (the fluorescent film 134) is arranged in alignment over the electron-emitting devices 124 in consideration of the trajectory of emitted electrons. FIGS. 8A and 8B are each a schematic diagram of the fluorescent film 134 used in the panel. In the case where the fluorescent film 134 is a color fluorescent film, the fluorescent film 134 is composed of phosphors 142 and black conductive members 141 that are called a black stripe (see FIG. 8A) or a black matrix (see FIG. 8B) depending on the arrangement style of the phosphors.

The image-forming apparatus according to the present invention may be used as a display apparatus for television broadcasting, a display apparatus for a video conference system, a computer or the like. Furthermore, the image-forming apparatus according to the present invention may be used as an image-forming apparatus for a laser printer comprising a photosensitive drum or the like.

<Embodiments>

Embodiments of the present invention are described in detail below.

<First Embodiment>

FIG. 2 is a plan view of the electron-emitting apparatus of the first embodiment, FIG. 1 is a cross sectional view of the electron-emitting apparatus, and FIGS. 5A to 5G show a method of manufacturing the electron-emitting apparatus. The method of manufacturing the electron-emitting apparatus of this embodiment is described in detail below.

(Step 1)

First, as shown in FIG. 5A, with a sputtering method, the first electrode 12 that is an Al film having a thickness of 300 nm, the insulating layer 13 that is an $SiO_2$ film having a thickness of 100 nm, and the second electrode 14 that is a Ta film having a thickness of 400 nm are stacked in this order on the substrate 11 that is a sufficiently cleaned quartz glass.

(Step 2)

Next, as shown in FIG. 5B, a photomask pattern of a positive photoresist (AZ1500 manufactured by Clariant) is formed by spin coating, and is exposed to light and developed with a photolithography method to obtain a mask pattern 18. Then, as shown in FIG. 5C, dry etching is performed using $CF_4$ gas from above of the mask pattern 18 functioning as a mask, so that the insulating layer 13 and the second electrode 14 are etched. This etching operation is terminated before the first electrode 12 is also processed.

(Step 3)

Following this, the mask pattern 18 is peeled off. Then, as shown in FIG. 5D, a photomask pattern of a positive photoresist (AZ1500 manufactured by Clariant) is formed by spin coating, and is exposed to light and developed with a photolithography method to obtain a mask pattern 19. Then, dry etching is performed using $CF_4$ gas from above of the mask pattern 19 functioning as a mask to obtain the step-like shape of the second electrode 14 shown in FIG. 5E. The difference in height between the upper surface and lower surface of the second electrode 14 is set at 300 nm, the electrode length L1 is set at 100 $\mu$m, and the width of the lower surface is set at 0.5 $\mu$m.

(Step 4)

Next as shown in FIG. 5F, a diamond like carbon film having a thickness of 100 nm is formed as the electron-emitting film 15 using a CVD (chemical vapor deposition) method.

Finally, the mask pattern 19 used as a mask is completely removed to obtain the electron-emitting device of this embodiment shown in FIG. 5G.

Electron emission is performed by arranging the thus-manufactured electron-emitting device in the manner shown in FIG 3. The applied voltage Va is set at 10 kV and the distance D1 between the electron-emitting film 15 and the anode 16 is set at 12 mm. Here, an electrode formed by applying a phosphor is used as the anode 16. Under these condition, electron emission is performed and the electron beam diameter is observed. The term "electron beam diameter" refers to a size of a beam area in which is observed at least 10% of the peak brightness of the light emitted from the phosphor. The electron beam diameter becomes 80 $\mu$m/200 $\mu$m (x/y) in this embodiment.

Also, when voltages are applied so that the potential of the second electrode 14 becomes higher than that of the first electrode 12 and the difference between these voltages becomes 4V (which is to say Vb=4V), the electron-emitting device of this embodiment does not emit any electrons, as shown in FIG. 4. As is apparent for this, it is possible to drive the electron-emitting device of this embodiment at a very low voltage.

<Second Embodiment>

A schematic cross-sectional view of the electron-emitting device manufactured in the second embodiment is shown in FIG. 1. In this embodiment, the second electrode layer 14 of the first embodiment is produced by laminating a Ta film and an Al film to prevent the unevenness of the lower surface of the second electrode layer 14 having a step-like shape due to the device. The following description centers on the characteristic points of this embodiment and therefore the same points as in the first embodiment are omitted.

Similarly to the first embodiment, after the first electrode 12 and the insulating layer 13 are laminated on the substrate 11, an Al film having a thickness of 100 nm and a Ta film having a thickness of 300 nm are stacked in this order as the second electrode 14.

Following this, like in the first embodiment, a mask pattern 18 is formed, the Ta film of the second electrode 14 and the insulating layer 13 are dry etched using $CF_4$ gas, and the Al film of the second electrode 14 is dry etched using $Cl_2$ gas. This etching operation is terminated before the first electrode 12 is also processed.

Then, like in the first embodiment, the mask pattern 18 is peeled off, another mask pattern 19 is formed, and the second electrode 14 is processed using $CF_4$ gas to obtain the step-like shape of the second electrode 14. It is impossible to remove the Al film using $CF_4$ gas, so that the thickness of each film of the second electrode 14 becomes even and the unevenness of the lower surface of the second electrode 14 is prevented.

Other aspects of this embodiment are the same as those of the first embodiment and so are omitted <Third Embodiment>

A schematic cross-sectional view of the electron-emitting device manufactured in the third embodiment is shown in FIG. 1. In this embodiment, the applied voltage Va is increased so as to improve the current amounts of emitted electrons. The following description centers on the characteristics points of this embodiment and therefore the same points as in the aforementioned embodiments are omitted.

In this embodiment, the voltage Va applied to drive the electron-emitting device of the first embodiment is set at 15 kV and the distance D1 between the electron-emitting film 15 and the anode 16 is set at 2 mm.

The electron-emitting device performs electron emission by means of the electric field formed by the anode voltage, so that the increased anode voltage improves the current amounts of the emitted electrons in this embodiment. At the same time, however, the area from which electrons are emitted is also extended and therefore the beam diameter of the emitted electrons is increased.

<Fourth Embodiment>

Figure 9:
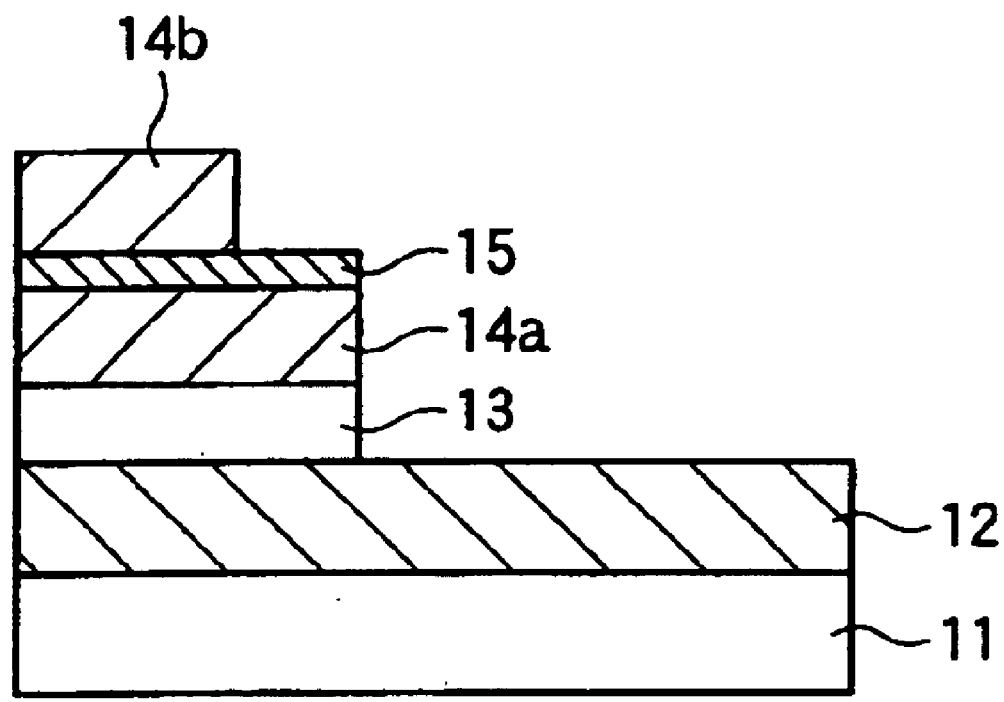
FIG. 9 is a schematic cross-sectional view of an electron-emitting device according to a fourth embodiment.

FIG. 9 is a schematic cross-sectional view of the electron-emitting device manufactured in this embodiment, and FIGS. 10A to 10F show a method of manufacturing the same. In this embodiment, the electron-emitting film 15 is sandwiched between layers of the second electrode 14. The electron-emitting device having this construction can be manufactured more easily. The method of manufacturing the electron-emitting device of this embodiment is described in detail below.

(Step 1)

Figure 10A:
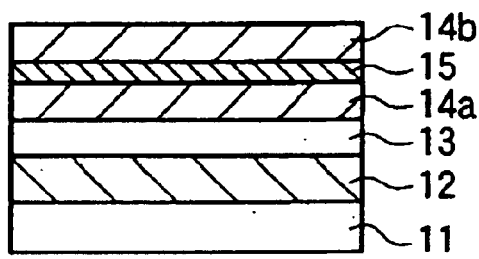
FIGS. 10A, 10B, 10C, 10D, 10E and 10F show an example method of manufacturing the electron-emitting device according to the fourth embodiment.

First, as shown in FIG. 10A, the substrate 11 is prepared by sufficiently cleaning a quartz glass. Following this, with a sputtering method, the first electrode 12 that is an Al film having a thickness of 300 nm, the insulating layer 13 that is an $SiO_2$ film having a thickness of 100 nm, a second electrode layer 14a that is a Ta film having a thickness of 100 nm, the electron-emitting film 15 that is a diamond like carbon film having a thickness of 100 nm, and a second electrode layer 14b that is a Ta film having a thickness of 200 nm are stacked onto the substrate 11 in this order.

(Step 2)

Figure 10B:
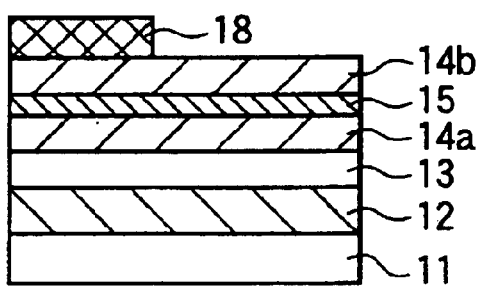
Figure 10C:
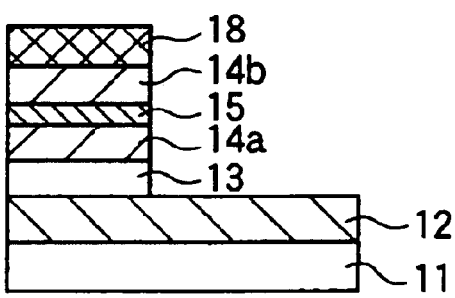

Next, as shown in FIG. 10B, a photomask pattern of a positive photoresist (AZ1500 manufactured by Clariant) is formed by spin coating, and is exposed to light and developed with a photolithography method to obtain a mask pattern 18. Then, as shown in FIG. 10C, dry etching is performed using $CF_4$ gas from above of the mask pattern 18 functioning as a mask, so that the insulating layer 13, the second electrode layer 14a, the electron-emitting film 15, and the second electrode layer 14b are etched. This etching operation is terminated before the first electrode 12 is also processed.

(Step 3)

Figure 10D:
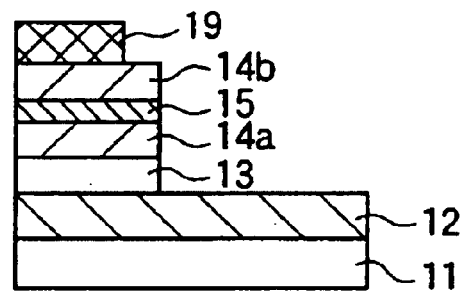
Figure 10E:
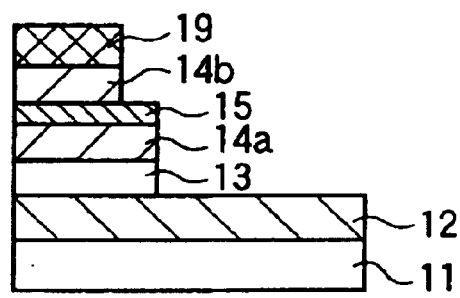

Following this, the mask pattern 18 is peeled off. Then, as shown in FIG. 10D, a photomask pattern of a positive photoresist (AZ1500 manufactured by Clariant) is formed by spin coating, and is exposed to light and developed with a photolithography method to obtain a mask pattern 19. Then, dry etching is performed using $CF_4$ gas from above of the mask pattern 19 functioning as a mask, so that the second electrode layer 14b is etched and the electron-emitting film 15 obtains an exposed portion as shown in FIG. 10E.

(Step 4)

Figure 10F:
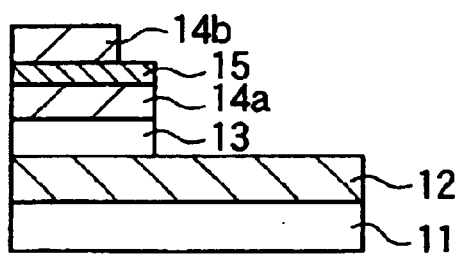

Finally, the mask pattern 19 used as a mask is completely removed to obtain the electron-emitting device of this embodiment shown in FIG. 10F. Similarly to the case of the electron-emitting device of the first embodiment, the electrode length L1 of this electron-emitting device is set to 100 $\mu$m.

The thus-manufactured electron-emitting device is driven under a condition where Va=10 kV, Vb=0 V, and D1=2 mm. The electron emission performed in this case achieves an electron-emitting characteristic that is almost the same as in the case of the electron-emitting device of the first embodiment.

<Fifth Embodiment>

Figure 11:
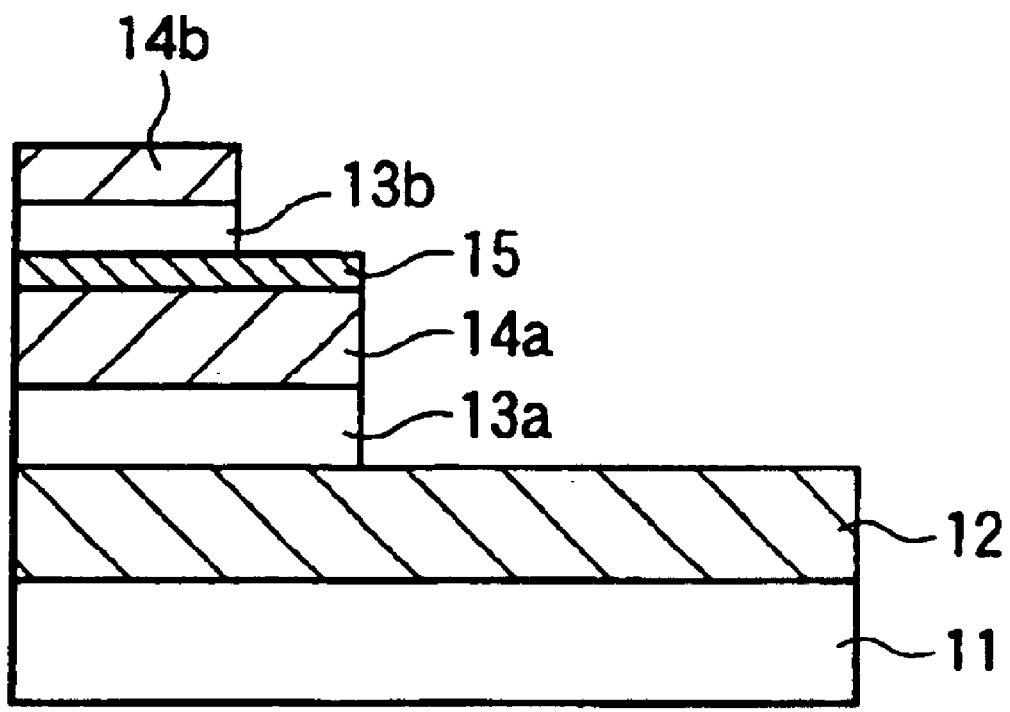
FIG. 11 is a schematic cross-sectional view of an electron-emitting device according to a fifth embodiment.

FIG. 11 is a schematic cross-sectional view of the electron-emitting device manufactured in this embodiment. This embodiment relates to a construction where an insulating layer 13b is inserted between the electron-emitting film 15 and the second electrode layer 14b of the electron-emitting device of the fourth embodiment. It will become apparent from this embodiment that there occurs no change in the characteristics of the electron-emitting device even with the construction where the insulating layer 13b is sandwiched between the components. The following description centers on the characteristics points of this embodiment and therefore the same points as in the above-mentioned embodiments are omitted.

Similarly to the fourth embodiment, the first electrode 12, the insulating layer 13a, the second electrode layer 14a, and the electron-emitting film 15 are laminated on the substrate 11. Then, the insulating layer 13b that is an $SiO_2$ film having a thickness of 100 nm and the second electrode layer 14b that is a Ta film having a thickness of 100 nm are stacked in this order onto the electron-emitting film 15.

Following this, like in the fourth embodiment, the mask pattern 18 is formed and dry etching is performed for the insulating layer 13a, the second electrode layer 14a, the electron-emitting film 15, the insulating layer 13b, and the second electrode layer 14b. This etching operation is terminated before the first electrode layer 12 is also processed.

Then, like in the fourth embodiment, the mask pattern 18 is peeled off, another mask pattern 19 is formed, and the second electrode layer 14b and the insulating layer 13b are subjected to dry etching to obtain an exposed portion of the electron-emitting film 15.

Other aspects of this embodiment are the same as those of the third embodiment and so are omitted.

To drive the electron-emitting device of this embodiment, the second electrode layer 14a and the second electrode layer 14b are connected to each other to have the same potential outside the electron-emitting device.

The thus-manufactured electron-emitting device is driven under a condition where Va=10 kV, Vb=0 V, and D1=2 mm. The electron emission performed in this case achieves an electron-emitting characteristic that is almost the same as in the case of the electron-emitting device of the first embodiment.

<Sixth Embodiment>

Figure 12:
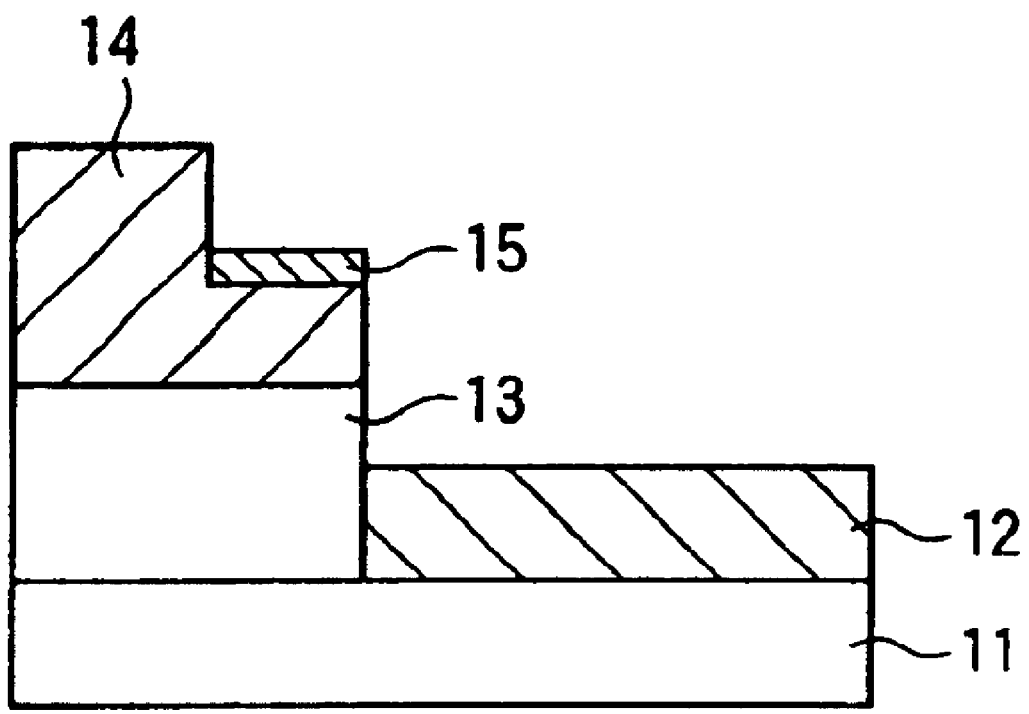
FIG. 12 is a schematic cross-sectional view of an electron-emitting device according to a sixth embodiment.

FIG. 2 is a schematic plan view of the electron-emitting device manufactured in this embodiment. FIG. 12 is a schematic cross-sectional view of the electron-emitting device, and FIGS. 13A to 13H show a method of manufacturing the electron-emitting device. In this embodiment, the first electrode 12 is stacked only in an area of the substrate 11 in which a convex portion composed of the insulating layer 13, the second electrode 14, and the electron-emitting film 15 is not formed. The method of manufacturing the electron-emitting device of this embodiment is described in detail below.

(Step 1)

Figure 13A:
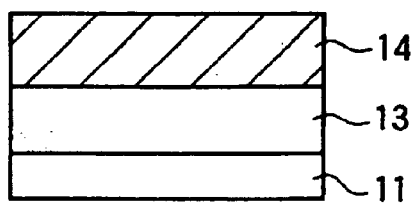
FIGS. 13A, 13B, 13C, 13D, 13E, 13F, 13G and 13H show an example method of manufacturing the electron-emitting device according to the sixth embodiment.

First, as shown in FIG. 13A, the substrate 11 is prepared by sufficiently cleaning a quartz glass. Following this, with a sputtering method, the insulating layer 13 that is an $SiO_2$ film having a thickness of 300 nm and the second electrode 14 that is a Ta film having a thickness of 400 nm are stacked in this order onto the substrate 11.

(Step 2)

Figure 13B:
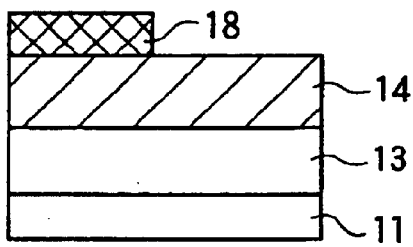
Figure 13C:
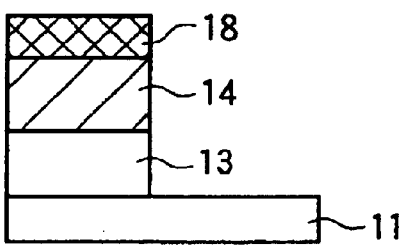
Figure 13D:
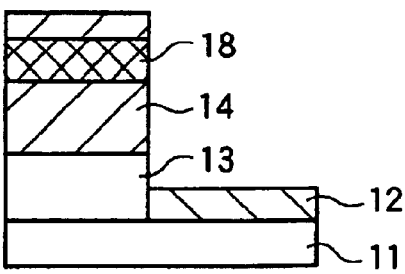

Next, as shown in FIG. 13B, a photomask pattern of a positive photoresist (AZ1500 manufactured by Clariant) is formed by spin coating, and is exposed to light and developed with a photolithography method to obtain a mask pattern 18. Then, as shown in FIG. 13C, dry etching is performed using $CF_4$ gas from above of the mask pattern 18 functioning as a mask, so that the insulating layer 13 and the second electrode 14 are etched. This etching operation is terminated before the substrate 11 is also processed. Following this, as shown in FIG. 13D, an Al film having a thickness of 200 nm is stacked as the first electrode 12.

(Step 3)

Figure 13E:
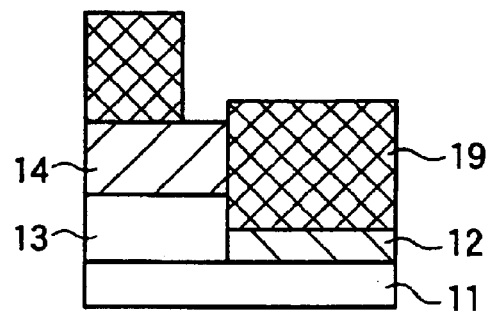
Figure 13F:
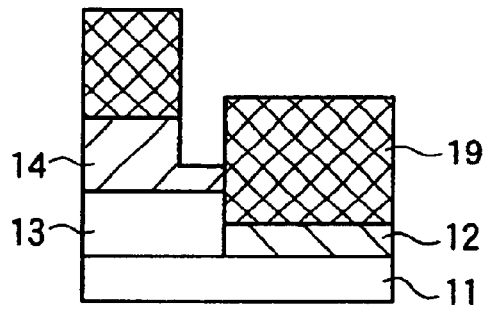

Next, the mask pattern 18 is peeled off. Then, as shown in FIG. 13E, a photomask pattern of a positive photoresist (AZ1500 manufactured by Clariant) is formed by spin coating, and is exposed to light and developed with a photolithography method to obtain a mask pattern 19. Then, dry etching is performed using $CF_4$ gas from above of the mask pattern 19 functioning as a mask, thereby obtaining a step-like shape of the second electrode 14 shown in FIG. 13F. The difference in height between the upper surface and the lower surface of the second electrode 14 is set to 300 nm, the electrode length L1 is set at 100 $\mu$m, and the width of the lower surface is set to 0.5 $\mu$m.

(Step 4)

Figure 13G:
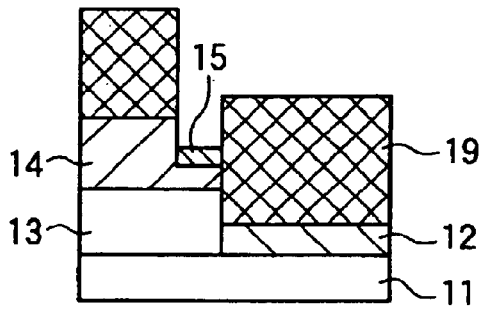

Following this, as shown in FIG. 13G, a diamond film having a thickness of 100 nm is stacked as the electron-emitting film 15 with a CVD method.

Figure 13H:
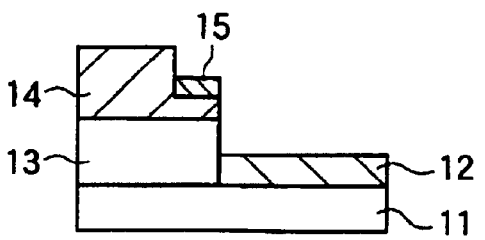

Finally, the mask pattern 19 used as a mask is completely removed to obtain the electron-emitting device of this embodiment shown in FIG. 13H.

The thus-manufactured electron-emitting device is driven under a condition where Va=10 kV, Vb=0 V, and D1=2 mm. The electron emission performed in this case achieves an electron-emitting characteristic that is almost the same as in the case of the electron-emitting device of the first embodiment.

<Seventh Embodiment>

The electron-emitting device of this embodiment has a construction where electron-emitting devices whose constructions are based on the first-sixth embodiments are arranged to oppose each other. In this embodiment, electron-emitting devices having a construction based on the first example are arranged to oppose each other. With this construction, the intensity of light emitted by a phosphor is increased.

Figure 14:
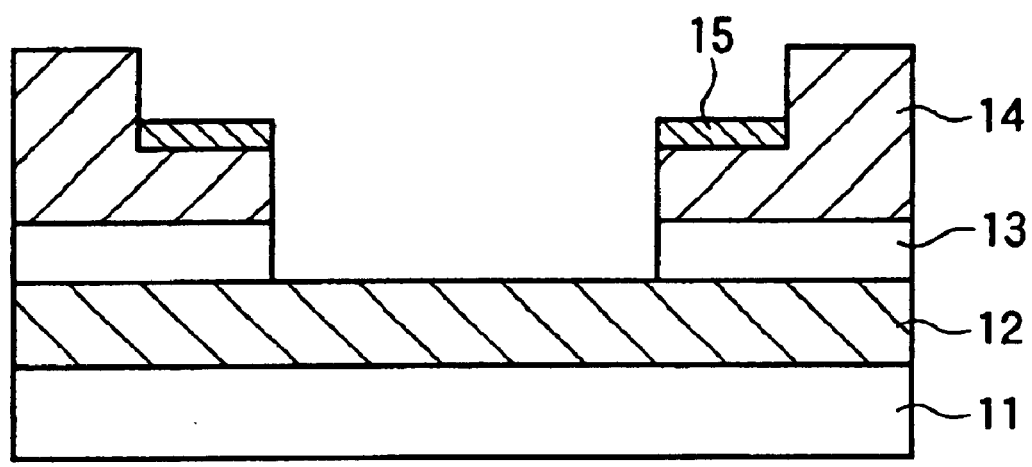
FIG. 14 is a schematic cross-sectional view of an electron-emitting device according to the seventh embodiment.
Figure 15:
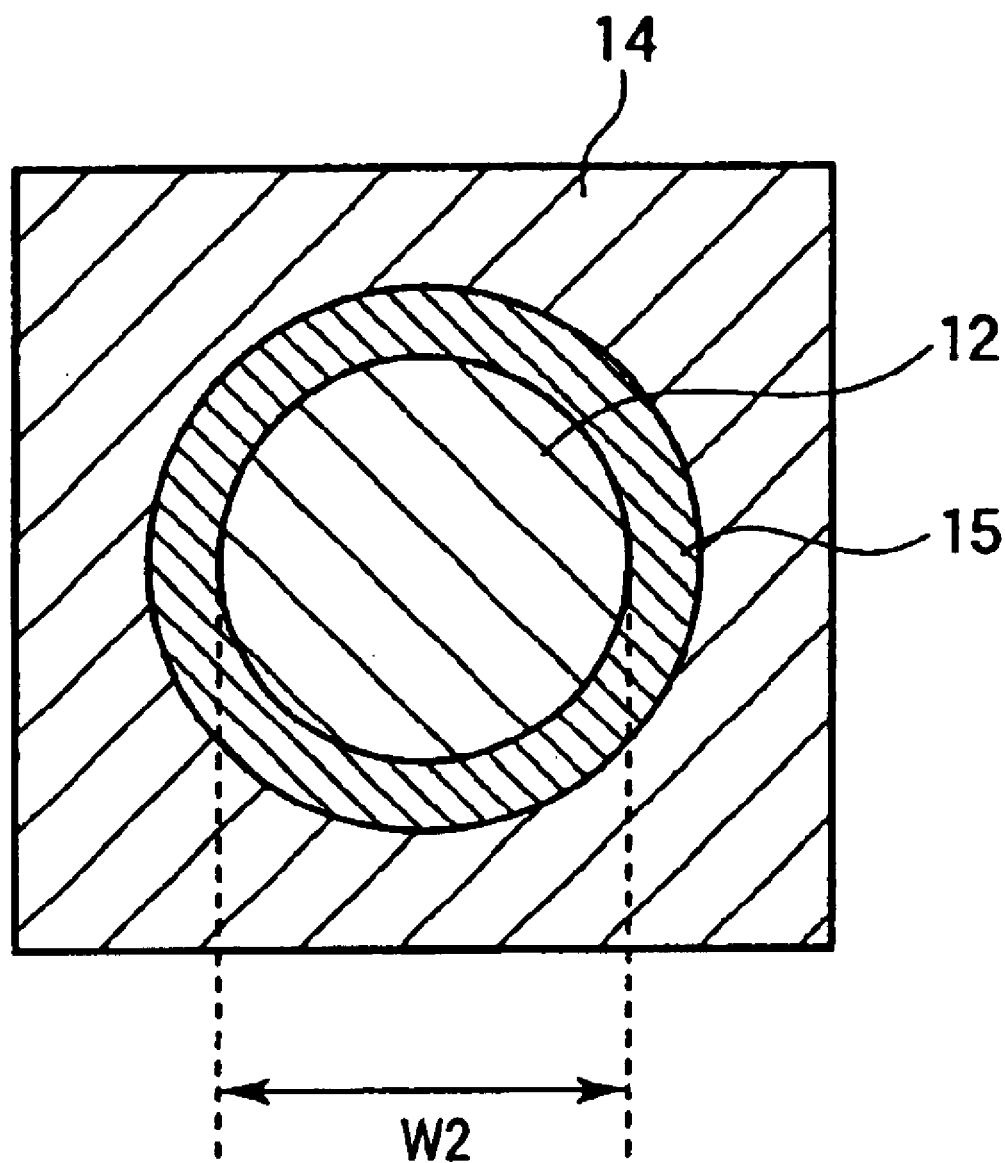
FIG. 15 is a schematic plan view of the electron-emitting device according to the seventh embodiment.
Figure 16:
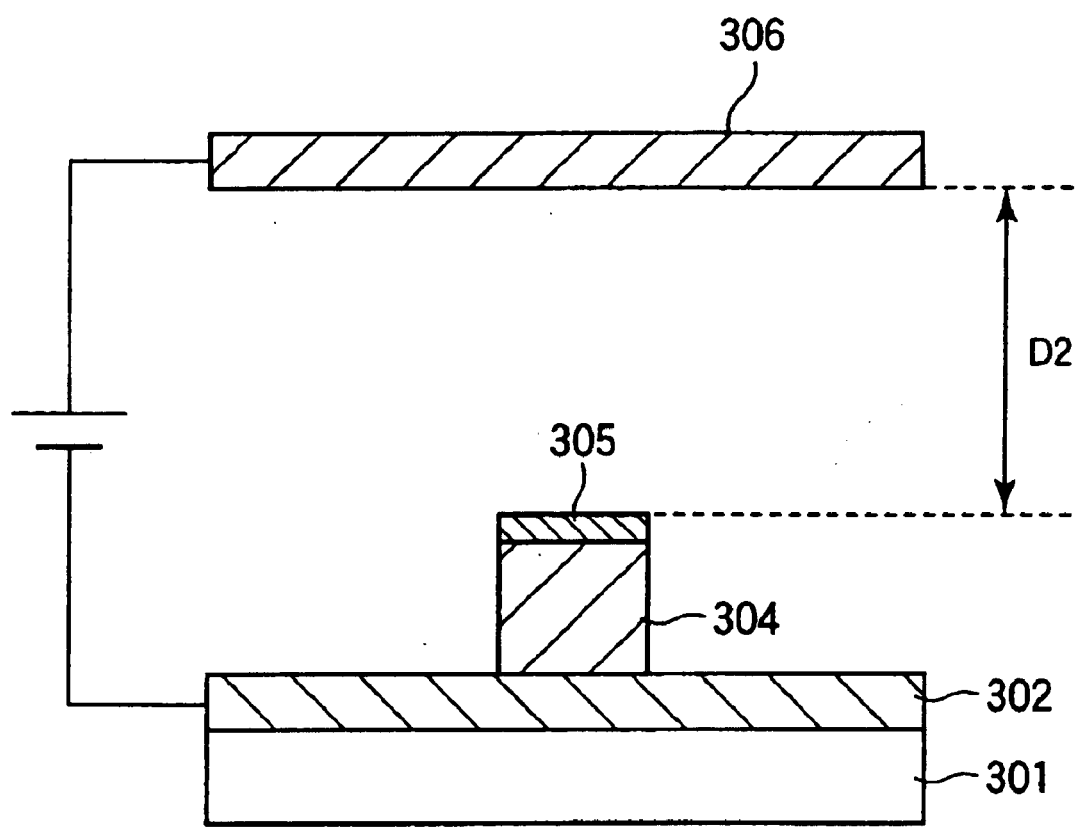
FIG. 16 is a schematic cross-sectional view of a diode type electron-emitting device among FE type electron-emitting devices.

FIG. 14 is a schematic cross-sectional view of the electron-emitting device of this embodiment, while FIG. 15 is a schematic plain view of the same.

The following description centers on the characteristic points of this embodiment and therefore the same points as in the aforementioned embodiments are omitted.

The electron-emitting device of this embodiment is manufactured in the same manner as in the first embodiment.

As to the size of the electron-emitting device, the thickness thereof is set at the same value as in the first embodiment, although the hole diameter W2 shown in FIG. 15 is set at 84 $\mu$m.

When the electron-emitting device of this embodiment is driven under a condition where Va=10 kV, Vb=0 V, and D1=2 mm, electrons emitted from the electron-emitting film 15 gather at almost the center of the hole shown in FIG. 15 and the intensity of light emitted from the phosphor is remarkably increased.

<Eighth Embodiment>

In this embodiment, the electron-emitting device having the construction shown in FIG. 18A is manufactured. The following description concerns a method of manufacturing the electron-emitting device of this embodiment.

(Step 1)

The substrate 11 is prepared by sufficiently cleaning a quartz glass. Following this, with a sputtering method, the first electrode 12 that is an Ti layer having a thickness of 5 nm (not shown), the insulating layer 13 that is an $SiO_2$ layer, and the second electrode 14 that is a Ti layer are stacked on the substrate 11 in this order.

Next, a resist pattern is formed using a positive photoresist (AZ1500 manufactured by Clariant) in a photolithography step.

Then, dry etching is performed from above of the patterned photoresist functioning as a mask to obtain the shapes of the first electrode 12, the insulating layer 13, and the second electrode 14 shown in FIG. 18A.

(Step 2)

Following this, a mask is formed to cover only a surface area of the second electrode in which the electron-emitting film 15 shown in FIG. 18A is not to be arranged.

(Step 3)

Next, a complex solution where isopropyl alcohol or the like is added to a Pd complex is applied to the surface area of the second electrode that is not covered with the mask.

After the application, heat treatment is performed in the air at 300° C. to convert the applied complex solution into a palladium oxide film.

(Step 4)

The substrate is then heated to 200° C., the air is exhausted, and heat treatment is performed in a 2% hydrogen stream diluted by nitrogen. As a result of this step, a large number of Pd particles are formed on the surface of the second electrode 14.

(Step 5)

Following this, heat treatment is performed at 500° C. for ten minutes in a 0.1% ethylene stream diluted by nitrogen to obtain the electron-emitting film 15. Then, the mask on the second electrode 14 is removed to obtain the electron-emitting device of this embodiment.

By observing the electron-emitting film 15 manufactured in this example using a scanning electron microscope, it is found that a large number of fibrous carbons.

This device is placed in an vacuum apparatus and the air inside the apparatus is sufficiently reduced to a degree of vacuum of $1 \times 10^{-5}$ Pa. Then, an anode voltage Va=10 KV is applied to the anode electrode 16 whose distance H to the device is 2 mm, and a pulse voltage of 15 V is applied to the device as the driving voltage Vb. An electron emission current Ie is measured under this condition.

The Ie characteristic of the electron-emitting device of this example is such that Ie is dramatically increased from around half of the applied voltage (Vb) and, when Vb=15 V, an electron emission current Ie of around 1 $\mu$A is measured.

The beam obtained in this example has a shape close to a rectangle that is long in the Y direction and is short in the X direction. Also, a superfine beam is obtained and the current Ie stays stable for a long time period.

By observing the fibrous carbons of this electron-emitting device using a transmission electron microscope, it is found that the so-called graphite nanofiber structure is obtained where graphenes are laminated in the axial direction of each fiber as shown in the right area of FIG. 20.

<Ninth Embodiment>

An electron source and an image-forming apparatus are produced using the electron-emitting devices of the first-eighth examples.

The electron-emitting devices are arranged in a form of a 10 by 10 MTX. Wiring are connected in the manner shown in FIG. 6, where the X-directional wiring are connected to the second electrode layer and the Y-directional wiring are connected to the first electrode layer. The horizontal intervals and the vertical intervals between the devices are 150 $\mu$m and 300 $\mu$m, respectively. A phosphor is arranged over the devices so that a distance of 2 mm is maintained therebetween. A voltage of 10 kV is applied to the phosphor.

In this manner, an image-forming apparatus and an electron source are achieved which are capable of performing matrix driving and high definition operations, having uniform electron-emitting characteristics, and remaining stable for a long time period.

As described above, the present invention realizes an electron-emitting device that has a uniform electron-emitting characteristic, emits an electron beam whose diameter is small, has a simple construction, and is easy to be manufactured.

Also, the first voltage applying means is used to applying a certain voltage to an anode. As a result, if the electron-emitting device of the present invention is applied to an image-forming apparatus, an emission current is obtained through which has a phosphor emit light having sufficient brightness.

Further, the electron-emitting device of the present invention realizes a high-performance electron source and image-forming apparatus.

What is claimed is:

1. A method of driving an image-forming apparatus, the image-forming apparatus comprising (i) a first substrate having arranged thereon (a) a plurality of scanning wirings, (b) a plurality of signal wirings which intersect with the plurality of scanning wirings, (c) a plurality of electron-emitting devices each of which includes (c1) a cathode electrode connected to one of the scanning wirings, (c2) a gate electrode being arranged over the cathode electrode and connected to one of the signal wirings (c3) an insulating layer being arranged between the cathode electrode and the gate electrode, (c4) a hole, penetrating the gate electrode and the insulating layer, having a wide w1 and a depth h1 which is not larger than w1 and (c5) an electron-emitting film being arranged on the cathode electrode and arranged within the hole, and (ii) a second substrate, which is arranged at a distance not less than 1 mm from the first substrate, and having arranged thereon (d) a light-emitting film including a phosphor and (e) an anode electrode, made of aluminum, covering the light-emitting film, and facing the plurality of electron-emitting devices, said method comprising the steps of:

applying a voltage not less than 10 kV between the anode electrode and the cathode electrode;

applying a scanning pulse sequentially to the plurality of scanning wirings; and applying signal pulses to the plurality of signal wirings, so that at least some of the plurality of electron-emitting devices connected to those scanning wirings are driven, wherein if a voltage of the scanning pulse is referred to as Vc and a voltage of each signal pulse is referred to as Vg, a voltage that satisfies the condition of (Vg−Vc)>0 is applied to each electron-emitting device to be driven, and a voltage that satisfies the condition of (Vg−Vc)>0 is applied to each electron-emitting device other than the electron-emitting devices to be driven.

2. A method according to claim 1, wherein if (i) the anode voltage applied to the anode electrode is referred to as Va, a distance between the cathode electrode and the anode electrode is referred to as H, and a distance between the cathode electrode and the gate electrode is referred to as h, (ii) an average strength of an electric field, which is applied between the cathode electrode and the gate electrode to cause electron emission from an electron-emitting device, is set to Eg=(Vg−Vc)/h, and (iii) an average strength of an electric field applied between the electron-emitting device and the anode electrode is set to Ea=Va/H, the condition of Eg/Ea≦100 is satisfied.

3. A method according to claim 1, wherein if (i) the anode voltage applied to the anode electrode is referred to as Va, a distance between the cathode electrode and the anode electrode is referred to as H, and a distance between the cathode electrode and the gate electrode is referred to as h, (ii) an average strength of an electric field, which is applied between the cathode electrode and the gate electrode to cause electron emission from an electron-emitting device, is set to Eg=(Vg−Vc)/h, and (iii) an average strength of an electric field applied between the electron-emitting device and the anode electrode is set to Ea=Va/H, the condition of Eg/Ea≦10 is satisfied.

4. A method according to claim 1, wherein the electron-emitting film is substantially flat, and the electron-emitting film is arranged substantially parallel to the anode electrode.

5. A method according to claim 1, wherein an electric field that is necessary for electron emission from the electron-emitting film is equal to or lower than $5 \times 10^7$ V/m, and if an anode voltage applied to the anode electrode is referred to as Va and a distance between the cathode electrode and the anode electrode is referred to as H, Ea=Va/H is equal to or greater than $5 \times 10^6$ V/m.

6. A method according to any one of claims 1, 2 and 3, wherein the electron-emitting film is a film made of one of diamond, diamond like carbon, and a carbon fiber.

7. A method according to any one of claims 1, 2, and 3, wherein the plurality of electron-emitting devices are wired in a matrix manner.

8. An image-forming apparatus comprising:

(i) a first substrate having arranged thereon (a) a plurality of scanning wirings, (b) a plurality of signal wirings which intersect with the plurality of scanning wirings, (c) a plurality of electron-emitting devices each of which includes (c1) a cathode electrode connected to one of the scanning wirings, (c2) a gate electrode being arranged over the cathode electrode and connected to one of the signal wirings, (c3) an insulating layer being arranged between the cathode electrode and the gate electrode, (c4) a hole, penetrating the gate electrode and the insulating layer, having a width w1 and a depth h1 which is not larger than w1 and (c5) an electron-emitting film arranged on the cathode electrode and arranged within the hole, and (ii) a second substrate, which is arranged at a distance not less than 1 mm from the first substrate, and having arranged thereon (d) an image forming member, (e) an anode electrode, made of aluminum, covering the image forming member and facing the plurality of electron-emitting devices, and (f) a driver for applying a voltage not less than 10 kV between the anode electrode and the cathode electrode, for applying a scanning pulse sequentially to a plurality of scanning wirings and for applying signal pulses to the plurality of signal wirings, so that at least some of the plurality of electron-emitting devices connected to those scanning wirings are driven, wherein if a voltage of the scanning pulse is referred to as Vc and a voltage of each signal pulse is referred to as Vg, a voltage that satisfies the condition of (Vg−Vc)>0 is applied to each electron-emitting device to be driven, and a voltage that satisfies the condition of (Vg−Vc)<0 is applied to each electron-emitting device other than the electron-emitting devices to be driven.

9. An image-forming apparatus according to claim 8, wherein the image-forming member is a phosphor.

10. A method of driving an image-forming apparatus according to claim 1, wherein an outer edge of the electron-emitting film is arranged inside of an outer edge of the cathode electrode.

11. An image-forming apparatus according to claim 9, wherein the gate electrode is arranged on the first substrate and the cathode electrode is arranged on the gate electrode with an insulating layer therebetween.

12. An image-forming apparatus according to claim 9, wherein an outer edge of the electron-emitting film is arranged inside of an outer edged of the cathode electrode.

* * * * *

UNITED STATES PATENT AND TRADEMARK OFFICE
CERTIFICATE OF CORRECTION

| | | |
|---|---|---|
| PATENT NO. | : 6,975,288 B2 | |
| APPLICATION NO. | : 09/956305 | |
| DATED | : December 13, 2005 | |
| INVENTOR(S) | : Michiyo Nishimura et al. | |

It is certified that error appears in the above-identified patent and that said Letters Patent is hereby corrected as shown below:

Delete patent 6,975,288 in its entirety and insert patent 6,975,288 in its entirety as attached.

Signed and Sealed this
Seventh Day of February, 2012

David J. Kappos
*Director of the United States Patent and Trademark Office*

(12) United States Patent
Nishimura et al.

(10) Patent No.: US 6,975,288 B2
(45) Date of Patent: Dec. 13, 2005

(54) METHOD OF DRIVING IMAGE-FORMING APPARATUS AND APPARATUS THEREOF

(75) Inventors: Michiyo Nishimura, Kanagawa (JP); Daisuke Sasaguri, Kanagawa (JP); Kazushi Nomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 09/956,305

(22) Filed: Sep. 20, 2001

(65) Prior Publication Data

US 2002/0036599 A1 Mar. 28, 2002

(30) Foreign Application Priority Data

Sep. 22, 2000 (JP) .................................... 2000/289185
Sep. 18, 2001 (JP) .................................... 2001/283052

(51) Int. Cl.$^7$ ................................................ G09G 3/22
(52) U.S. Cl. .............. 345/74.1; 345/75.2; 345/208; 315/169.1; 315/169.3
(58) Field of Search ............... 345/74.1, 75.1, 345/75.2, 204, 208, 209, 216; 315/169.1, 315/169.3, 161.9; 313/495, 292, 305–310, 313/74, 336–337

(56) References Cited

U.S. PATENT DOCUMENTS

| | | | |
|---|---|---|---|
| 3,681,650 A | 8/1972 | Koll | 315/30 |
| 4,084,259 A | 4/1978 | Cahill et al. | 364/900 |
| 4,313,124 A | 1/1982 | Hara | 346/140 |
| 4,345,262 A | 8/1982 | Shirato et al. | 346/140 |
| 4,449,150 A | 5/1984 | Kato | 358/283 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,578,714 A | 3/1986 | Sugiura et al. | 358/283 |
| 4,608,577 A | 8/1986 | Hori | 346/140 |
| 4,660,077 A | 4/1987 | Kawamura et al. | 358/75 |

(Continued)

FOREIGN PATENT DOCUMENTS

| | | |
|---|---|---|
| EP | 0036296 A2 | 9/1981 |
| EP | 0291300 A2 | 11/1988 |

(Continued)

OTHER PUBLICATIONS

US 6,028,575, 2/2000, Todokoro et al. (withdrawn)
M.I. Elinson et al., *The Emission of Hot Electrons and the Field Emission of Electrons from Tin Oxide*, Radio Eng. And Electron Phys., (1965) pp. 1290–1296.
Hisashi Araki et al., *Electroforming and Electron Emission of Carbon Thin Films*, Journal of the Vacuum Society of Japan, vol. 26, No. 1, (1981) pp. 22–29 (English Abstract on p. 22).

(Continued)

*Primary Examiner*—Lun-yi Lao
(74) *Attorney, Agent, or Firm*—Fitzpatrick, Cella, Harper & Scinto

(57) ABSTRACT

Disclosed are methods for driving an electron-emitting device, an electron source, and an image-forming apparatus, driving circuits for an electron source and an image-forming apparatus, and an electron source and an image-forming apparatus, with each of which electron emission is effectively halted. A voltage (Vg−Vc)>0 is applied to an electron-emitting device placed in a driving state in which electrons should be emitted, thereby having the electron-emitting device emit electrons. A voltage (Vg−Vc)<0 is applied to an electron-emitting device placed in a halt state in which no electrons should be emitted, thereby having the electron-emitting device halt electron emission. In this manner, an electric field that is formed between a cathode electrode and a gate electrode in the halt state becomes opposite to an electric field that is formed therebetween in the driving state, thereby easily weakening an electric field directed toward an anode electrode and effectively suppressing electron emission in the halt state.

12 Claims, 17 Drawing Sheets

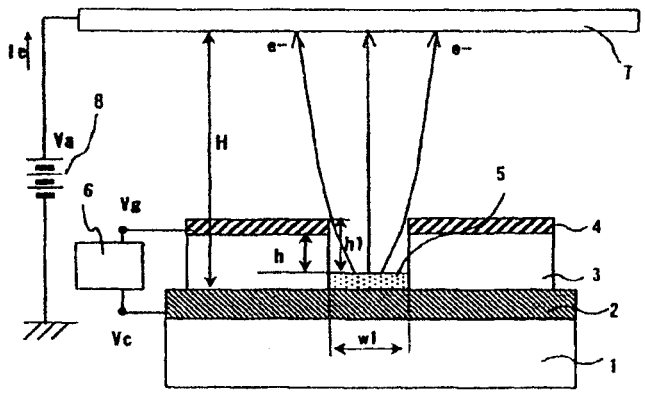

U.S. PATENT DOCUMENTS

| | | | |
|---|---|---|---|
| 4,680,596 A | 7/1987 | Logan | 346/140 |
| 4,723,129 A | 2/1988 | Endo et al. | 346/1.1 |
| 4,725,849 A | 2/1988 | Koike et al. | 346/1.1 |
| 4,740,796 A | 4/1988 | Endo et al. | 346/1.1 |
| 4,860,026 A | 8/1989 | Matsumoto et al. | 346/1.1 |
| 4,939,583 A | 7/1990 | Tsuboi et al. | 358/261.1 |
| 4,951,157 A | 8/1990 | Koh et al. | 358/433 |
| 4,969,204 A | 11/1990 | Melnychuck et al. | 382/56 |
| 5,020,120 A | 5/1991 | Weldy | 382/56 |
| 5,048,111 A | 9/1991 | Jones et al. | 382/56 |
| 5,050,101 A | 9/1991 | Kiuchi et al. | 364/519 |
| 5,050,230 A | 9/1991 | Jones et al. | 382/56 |
| 5,060,285 A | 10/1991 | Dixit et al. | 382/56 |
| 5,086,487 A | 2/1992 | Katayama et al. | 382/56 |
| 5,111,302 A | 5/1992 | Chan et al. | 358/298 |
| 5,124,811 A | 6/1992 | Ohsawa | 358/448 |
| 5,136,396 A | 8/1992 | Kato | 358/426 |
| 5,138,672 A | 8/1992 | Hirabayashi et al. | 382/54 |
| 5,153,749 A | 10/1992 | Katayama | 358/448 |
| 5,159,468 A | 10/1992 | Yoshida et al. | 358/451 |
| 5,185,813 A | 2/1993 | Tsujimoto | 382/240 |
| 5,233,366 A | 8/1993 | Stephany | 347/15 |
| 5,270,738 A | 12/1993 | Takahashi et al. | 346/140 |
| 5,291,245 A | 3/1994 | Charnitski et al. | 355/208 |
| 5,327,254 A | 7/1994 | Daher | 358/261.1 |
| 5,430,469 A | 7/1995 | Shioya et al. | 347/15 |
| 5,521,717 A | 5/1996 | Maeda | 358/426 |
| 5,914,731 A | 6/1999 | Yano et al. | 347/9 |
| 5,939,823 A | 8/1999 | Kiyomiya et al. | 313/495 |
| 5,955,850 A * | 9/1999 | Yamaguchi et al. | 313/495 |
| 6,040,973 A * | 3/2000 | Okamoto et al. | 315/161.9 |
| 6,057,636 A | 5/2000 | Sakai et al. | 313/306 |
| 6,133,893 A * | 10/2000 | Maslennikov et al. | 345/74 |
| 6,169,528 B1 | 1/2001 | Oguchi et al. | 345/74 |
| 6,172,455 B1 | 1/2001 | Bancal et al. | 313/495 |
| 6,267,636 B1 | 7/2001 | Onishi et al. | 445/6 |
| 6,288,494 B1 | 9/2001 | Tsukamoto et al. | 315/169.1 |
| 6,339,414 B1 | 1/2002 | Todokoro et al. | 345/74.1 |
| 6,400,091 B1 | 6/2002 | Deguchi et al. | 315/169.1 |
| 6,437,503 B1 * | 8/2002 | Konuma | 313/495 |
| 6,445,367 B1 | 9/2002 | Suzuki et al. | 345/75.2 |
| 6,448,949 B1 | 9/2002 | Maslennikov et al. | 354/74 |
| 6,626,720 B1 * | 9/2003 | Howard et al. | 445/24 |

FOREIGN PATENT DOCUMENTS

| | | | |
|---|---|---|---|
| EP | 0392753 A3 | 10/1990 | |
| EP | 0526205 A2 | 2/1993 | |
| EP | 0526233 A2 | 2/1993 | |
| EP | 0558236 A2 | 9/1993 | |
| EP | 0 905 670 A1 | 3/1999 | |
| EP | 1 037 250 A1 | 9/2000 | |
| FR | 2497043 | 6/1982 | |
| GB | 2219114 A | 11/1989 | |
| JP | 54-56847 | 5/1979 | |
| JP | 55-28862 | 2/1980 | |
| JP | 57-2733 | 1/1982 | |
| JP | 59-123670 | 7/1984 | |
| JP | 59-138461 | 8/1984 | |
| JP | 60-49953 | 3/1985 | |
| JP | 60-71260 | 4/1985 | |
| JP | 61-228974 | 10/1986 | |
| JP | 63-98455 | 4/1988 | |
| JP | 1267048 | 10/1989 | |
| JP | 2187343 | 7/1990 | |
| JP | 3-46589 | 2/1991 | |
| JP | 4-18358 | 1/1992 | |
| JP | 5-169664 | 7/1993 | |
| JP | 5-212951 | 8/1993 | |
| JP | 8-96703 | 4/1996 | |
| JP | 08-096704 A | 4/1996 | |
| JP | 10-149778 | 6/1998 | |
| JP | 2000-251783 | 9/2000 | |
| JP | 2000-268706 | 9/2000 | |
| JP | 2002-063862 | 2/2002 | |

OTHER PUBLICATIONS

W.P. Dyke, et al., *Advances in Electronics and Electron Physics*, Academic Press Inc., (1956) pp. 90–184.

C.A. Mead, *Operation of Tunnel–Emission Devices*, Journal of Applied Physics, vol. 32 (1961) pp. 646–652.

C.A. Spindt et al., *Physical Properties of Thin–Film Field Emission Cathodes with Molybdenum Cones*, Journal of Applied Physics, vol. 47, No. 12 (1976) pp. 5248–5263.

G. Dittmer, *Electrical Conduction and Electron Emission of Discontinuous Thin Films*, Thin Solid Films—Elsevier Sequoia S.A. (1972), pp.317–328.

M. Hartwell et al., *Strong Electron Emission from Patterned Tin–Indium Oxide Thin Films*, Int'l Electron Devices Meeting (1975) pp. 519–521.

Toshiaki Kusunoki et al., *Fluctuation–Free Electron Emission from Non–Formed Metal–Insulator–Metal (MIM) Cathodes Fabricated by Low Current Anodic Oxidation*, Japanese J. Appl. Phys., vol. 32, No. 11B (1993) pp. 1695–1697.

* cited by examiner

METHOD OF DRIVING IMAGE-FORMING APPARATUS AND APPARATUS THEREOF

BACKGROUND OF THE INVENTION

1. Field of the Invention

The present invention relates to a method of driving an electron-emitting device, an electron source, and an image-forming apparatus.

2. Related Background Art

There have conventionally been known two types of electron-emitting devices, that is, thermionic electron sources and cold cathode electron sources. The cold cathode electron sources include devices of electric field emission type (hereinafter referred to as the FE type), devices of metal/insulating layer/metal type (hereinafter referred to as the MIM type), and surface conduction electron-emitting devices.

Examples of the FE type electron-emitting devices are disclosed by W. P. Dyke and W. W. Dolan, "Field Emission", Advances in Electronics and Physics, 8, 89 (1956) and C. A. Spindt, "Physical Properties of Thin-Film Field Emission Cathodes with Molybdenium Cones", J. Appl. Phys., 47, 5248 (1976).

Examples of the MIM type electron-emitting devices are disclosed in papers including C. A. Mead, "Operation of Tunnel-Emission Devices", J. Apply. Phys., 32, 646 (1961).

Also, recent examples are disclosed in papers including Toshiaki Kusunoki, "Fluctuation-Free Electron Emission from Non-Formed Metal-Insulator-Metal (MIM) Cathodes Fabricated by Low Current Anodic Oxidation", Jpn. J. Appl. Phys. vol. 32 (1993) pp. L1695, and Mutsumi Suzuki et al. "An MIM-Cathode Array for Cathode Luminescent Displays", IDW'96, (1996) pp. 529.

An example of the surface conduction electron-emitting devices is reported by M. I. Elinson, Radio Eng. Electron Phys., 10, (1965). The surface conduction electron-emitting device uses a phenomenon where electrons are emitted when an electric current is allowed to flow in parallel to the surface of a thin film having a small area and formed on a substrate.

While Elinson proposes the use of an $SnO_2$ thin film for a device of this type, the use of an Au thin film (G. Dittmer, Thin Solid Films, 9, 317 (1972)) and the use of $In_2O_3/SnO_2$ thin film (M. Hartwell and C. G. Fonstad, IEEE Trans. ED Conf., 519 (1983)) are also proposed.

SUMMARY OF THE INVENTION

The application of these electron-emitting devices to image-forming apparatuses, such as display apparatuses, necessitates enough emission currents to have phosphors emit light having sufficient brightness. Also, to achieve high-definition image-forming apparatuses, it is necessary that the diameters of electron beams irradiated onto phosphors are small. Further, it is important that the electron-emitting devices are easy to be manufactured.

An example of the conventional FE type electron-emitting devices is a Spindt type electron-emitting device. The Spindt type electron-emitting device generally has a construction where a microchip is formed as an emission point and electrons are emitted from the tip thereof.

With this construction, if an emission current density is increased to have a phosphor emit light, this causes a thermal destruction of an electron-emitting region of the microchip, which limits the life span of the electron-emitting device.

Also, the beam diameter of electrons emitted from the tip of the microchip tend to be increased by the electric field formed by a gate electrode, so that it is difficult to decrease the electron beam diameter.

Various techniques have been proposed in view of these disadvantages of the FE type electron-emitting devices.

With a technique, to prevent the increase of the electron beam diameter, a focusing electrode is arranged over an electron-emitting region. With this construction, the beam diameter of emitted electrons is decreased by the negative potential of the focusing electrode. This technique is general but the manufacturing process becomes complex and therefore the manufacturing cost is increased.

With another technique, an electron beam diameter is decreased by eliminating the microchip of the Spindt type electron-emitting device. Examples of this technique are described in Japanese Patent Application Laid-open No. Hei 8-096703 and Japanese Patent Application Laid-open No. Hei 8-096704.

With this technique, electrons are emitted from a thin film arranged in a hole. In this case, a flat equipotential surface is formed on an electron-emitting surface of the thin film, so that the electron beam diameter is decreased.

Also, by using a construction material having a low work function as an electron-emitting substance, electron emission becomes possible even without forming a microchip. As a result, a driving voltage can be lowered and an electron-emitting device can be manufactured with relative ease.

Further, electron emission is performed in a plane area, so that excessive concentrations of electric field do not occur in a specific area. As a result, a destruction of the thin film does not occur and a long life span of the electron-emitting device is ensured.

In such an FE type electron-emitting device, an electric field (conventionally, $1 \times 10^8$ V/m to $1 \times 10^{10}$ V/m in cases of the Spindt type) that is necessary for electron emission is applied to an electron-emitting substance, which is usually connected to a cathode electrode, by a gate electrode arranged close to the electron-emitting substance. In this manner, electron emission is performed in the FE type electron-emitting device.

Also, in general, electrons emitted from an electron-emitting device are accelerated by an electric field formed between the electron-emitting device and an anode electrode which is applied an anode voltage to and is arranged over the electron-emitting device. In this manner, sufficient energy is given to the emitted electrons. The electrons that reach the anode electrode are captured by the anode electrode to be converted into an emission current.

During this operation, in general, a modulation voltage applied to the gate electrode is set in a range of several ten V to several hundred V, while a voltage applied to the anode electrode is set in a range of several hundred V to several ten kV. That is, the anode voltage is several ten to several hundred times as high as the modulation voltage applied to the gate electrode.

Accordingly, ON/OFF control of electron emission by the electron-emitting device is generally performed by modulating the voltage between the cathode electrode and the gate electrode to which low modulation voltages are applied.

An example method of controlling an electron-emitting device is disclosed in Japanese Patent Application Laid-open No. Hei. 8-096703. This method is shown in FIG. 17.

Figure 17:
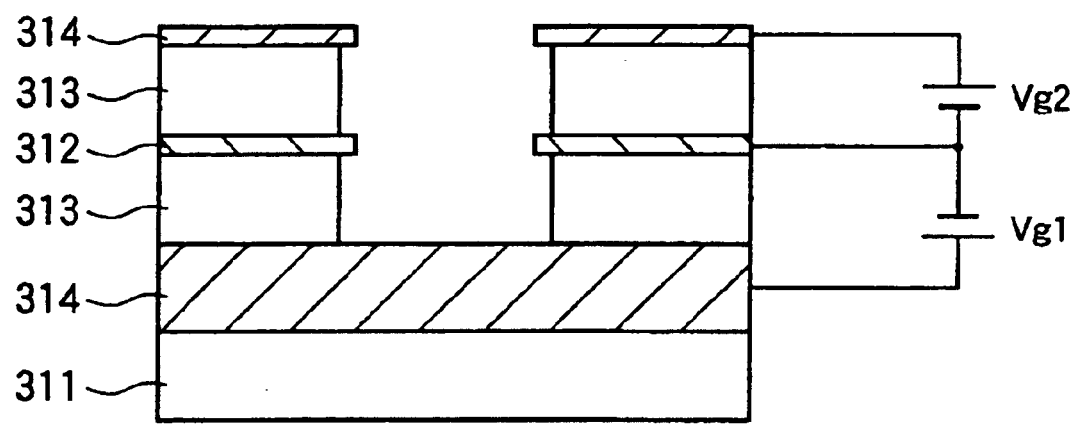
FIG. 17 is a schematic cross-sectional view of an edge emitter type electron-emitting device among the FE type electron-emitting devices.

With the control method shown in FIG. 17, anode voltages Va for RGB are modulated in a time-division manner to display color images. Fundamentally, however, the voltage applied to an anode electrode is maintained at a constant magnitude (500 V) and the cathode voltage Vc applied to a cathode electrode and the gate voltage Vg applied to a gate electrode are modulated (20 V) to obtain a signal for image display. Also, during an OFF period in which electron emission by the device should be halted, both of the voltages applied to the cathode electrode and the gate electrode, which have the same potential, are set to 0V. Further, the distance between the cathode electrode and the anode electrode is set to 300 μm.

It should be noted here that in an image-forming apparatus in which a phosphor that is an image-forming member is formed at an anode electrode, it is expected that the light emission efficiency is improved and the brightness of an image-forming apparatus is increased in accordance with the increase in the anode voltage Va. Thus, it is more preferable that the anode voltage Va is set in a range of several kV to several ten kV.

Also, in the case where the anode voltage Va is maintained at a constant value, it is preferable that the distance between the cathode electrode and the anode electrode is reduced to decrease the electron beam diameter. However, the indiscriminate reduction of the distance should be avoided in order to obtain a vacuum atmosphere in the apparatus without difficulty and to circumvent discharges.

Accordingly, the magnitude of the anode voltage Va and the distance between the cathode electrode and the anode electrode are both important aspects for the realization of a high-definition image-forming apparatus.

Also, in addition to the example disclosed in Japanese Patent Application Laid-open No. Hei. 8-096703, power consumption of an image-forming apparatus is recently reduced by forming an electron-emitting region with an electron-emitting material having a low work function to lower a driving voltage.

Thus, the electric field that is necessary for electron emission is reduced to $5 \times 10^7$ V/m or lower.

If the anode voltage is increased, the electric field applied between the anode electrode and the electron-emitting device is strengthened. As a result, electron-emitting characteristics may be adversely affected in some cases.

In the case of the example disclosed in Japanese Patent Application Laid-open No. Hei 8-096703 described above, the average strength Ea of the electric field applied between the anode electrode and the device becomes $2 \times 10^6$ V/m at a rough estimate where the anode voltage is divided by the distance between the cathode electrode and the anode electrode. This strength approaches the strength ($2 \times 10^7$ V/m or lower) of an electric field that is required for electron emission, with a difference therebetween being just over one digit or more of magnitude.

Accordingly, in the case where a high voltage is applied to the anode electrode or the distance between the cathode electrode and the anode electrode is reduced, the electric field formed by the device and the anode electrode is strengthened and affects the electron emission.

In the case where the electric field formed by the device and the anode electrode is strengthened, even if the same potential is applied to the cathode electrode and the gate electrode to halt electron emission during an OFF period in which electron emission should not be performed, the electron emission is not totally suppressed and electrons are emitted in some cases.

This problem becomes more serious depending on the configuration and manufacturing method of an electron-emitting device.

If an image-forming apparatus is constructed using such a device where electrons are emitted even during an OFF period, pixels that should be placed in an OFF state (dark state) are placed in an ON state (light emission state) during the OFF period, so that the contrast of an image formed by the apparatus is lowered.

The present invention has been made in the light of the above-mentioned problems of the conventional techniques, and an object of the present invention is to provide methods of driving an electron-emitting device, an electron source, and an image-forming apparatus, with which electron emission is effectively halted. The object of the present invention is also to provide driving circuits for an electron source and an image-forming apparatus, with which such driving methods are realized. The object of the present invention is further to provide an electron source and an image-forming apparatus that include such driving circuits.

The present invention, which has been made in order to attain the above-mentioned objects, relates to a method of driving an electron source that is arranged so as to oppose an anode electrode, characterized in that: the method comprises:

the electron source including a plurality of electron-emitting devices each include a cathode electrode, a gate electrode, and an electron-emitting film arranged on the cathode electrode; and that:
if a cathode voltage applied to the cathode electrode is referred to as Vc and a gate voltage applied to the gate electrode is referred to as Vg;
a voltage that satisfies the condition of (Vg−Vc)>0 is applied to each electron-emitting device, out of the plurality of electron-emitting devices, that should emit electrons; and
a voltage that satisfies the condition of (Vg−Vc)<0 is applied to each electron-emitting device other than the electron-emitting devices that should emit electrons.

Further, the present invention relates to a method of driving an electron-emitting device that is arranged so as to oppose an anode electrode, characterized in that: the method comprises:

the electron-emitting device including a gate electrode that is arranged on a cathode electrode with an insulating layer therebetween, and an electron-emitting film that is arranged on a surface area of the cathode electrode, the surface area being within a hole formed by the insulating layer and the gate electrode; and that:
if a cathode voltage applied to the cathode electrode is referred to as Vc and a gate voltage applied to the gate electrode is referred to as Vg;
a voltage that satisfies the condition of (Vg−Vc)>0 is applied to the electron-emitting device to cause electron emission; and
a voltage that satisfies the condition of (Vg−Vc)<0 is applied to the electron-emitting device to halt the electron emission.

Further, the present invention relates to a method of driving an electron-emitting device that is arranged so as to oppose an anode electrode, characterized in that: the method comprises:

the electron-emitting device including a cathode electrode, a gate electrode, and an electron-emitting film that is arranged on the cathode electrode; and that:
if a cathode voltage applied to the cathode electrode is referred to as Vc, a gate voltage applied to the gate electrode is referred to as Vg, an anode voltage applied to the anode electrode is referred to as Va, a distance between the gate electrode and the cathode electrode is referred to as h, and a distance between the anode electrode and the electron-emitting device is referred to as H;

the condition of $\{(Vg-Vc/h)\}/(Va/H) \leq 100$ is satisfied, a voltage that satisfies the condition of $(Vg-Vc)>0$ is applied to the electron-emitting device to cause electron emission; and a voltage that satisfies the condition of $(Vg-Vc)<0$ is applied to the electron-emitting device to halt the electron emission.

Further, the present invention relates to a method of driving an electron-emitting device that is arranged so as to oppose an anode electrode, characterized in that: the method comprises:

the electron-emitting device including a cathode electrode that is arranged on a gate electrode with an insulating layer therebetween, and an electron-emitting film that is arranged on the cathode electrode; and that:

if a cathode voltage applied to the cathode electrode is referred to as Vc and a gate voltage applied to the gate electrode is referred to as Vg;

a voltage that satisfies the condition of $(Vg-Vc)>0$ is applied to the electron-emitting device to cause electron emission; and a voltage that satisfies the condition of $(Vg-Vc)<0$ is applied to the electron-emitting device to halt the electron emission.

Further, the present invention relates to a driving circuit for driving an electron source that is arranged so as to oppose an anode electrode, characterized in that: the driving circuit comprises:

the electron source including a plurality of electron-emitting devices each include a cathode electrode, a gate electrode, and an electron-emitting film arranged on the cathode electrode, and the driving circuit comprising means for applying a voltage Vc to the cathode electrode and applying a voltage Vg to the gate electrode; and that:

a voltage that satisfies the condition of $(Vg-Vc)>0$ is applied to each electron-emitting device, out of the plurality of electron-emitting devices, that should emit electrons; and a voltage that satisfies the condition of $(Vg-Vc)<0$ is applied to each electron-emitting device other than the electron-emitting device that should emit electrons.

Further, the present invention relates to an electron source that is arranged so as to oppose an anode electrode, characterized in comprising the driving circuit of the above electron source.

Further, the present invention relates to a driving circuit for driving an image-forming apparatus that includes an anode electrode and an electron source arranged so as to oppose the anode electrode, characterized in that: the driving circuit comprises:

the electron source including a plurality of electron-emitting devices each include a cathode electrode, a gate electrode, and an electron-emitting film arranged on the cathode electrode;

means for applying a voltage Vc to the cathode electrode and applying a voltage Vg to the gate electrode; and means for applying a voltage Va to the anode electrode; and that:

a voltage that satisfies the condition of $(Vg-Vc)>0$ is applied to each electron-emitting device, out of the plurality of electron-emitting devices, that should emit electrons; and a voltage that satisfies the condition of $(Vg-Vc)<0$ is applied to each electron-emitting device other than the electron-emitting devices that should emit electrons.

Further, the present invention relates to an image-forming apparatus, characterized by comprising: an anode electrode; an electron source that is arranged so as to oppose the anode electrode; and a driving circuit according to the above image-forming apparatus.

Further, the present invention relates to a method of manufacturing an image forming apparatus comprising an anode electrode and an electron source that is arranged so as to oppose the anode electrode, characterized in that: the method comprising the steps of:

preparing a rear plate on which a plurality of electron-emitting device each including a cathode electrode, a gate electrode, and an electron-emitting film arranged on the cathode electrode are arranged;

preparing a face plate including the anode electrode and a light-emitting member;

connecting the face plate and the rear plate so as to form a space between the face plate and the rear plate, and maintaining vacuum of the space between the face plate and the rear plate; and electrically connecting a driving circuit to the plurality of electron-emitting device, wherein if a cathode voltage applied to the cathode electrode is referred to as Vc and a gate voltage applied to the gate electrode is referred to as Vg, a voltage that satisfies the condition of $(Vg-Vc)>0$ is applied to each electron-emitting device, out of the plurality of electron-emitting devices, that should emit electrons, and a voltage that satisfies the condition of $(Vg-Vc)<0$ is applied to each electron-emitting device other than the electron-emitting devices that should emit electrons.

With the driving methods of the present invention, an electric field that is formed between a cathode electrode and a gate electrode in a halt state becomes opposite to an electric field that is formed therebetween in a driving state, thereby easily weakening an electric field directed toward an anode electrode and effectively suppressing electron emission in the halt state.

Accordingly, an electron-emitting device may be appropriately controlled even if a high anode voltage is applied thereto and a distance between the cathode electrode and the anode electrode is reduced, which is to say even if the average strength Ea of the electric field applied by the anode electrode to the electron-emitting device approaches the average strength Eg of the electric field applied between the cathode electrode and the gate electrode.

In the electron source of the present invention, electron emission by every electron-emitting device placed in a halt state is suppressed, thereby achieving high performance.

In the image-forming apparatus of the present invention, electron emission by each electron-emitting device placed in a halt state is suppressed, so that a situation is prevented where pixels that should be placed in an OFF (dark) state are placed in an ON (light emission) state. This prevents the lowering of a contrast and realizes high-quality image formation.

BRIEF DESCRIPTION OF THE DRAWINGS

Figure 1A:
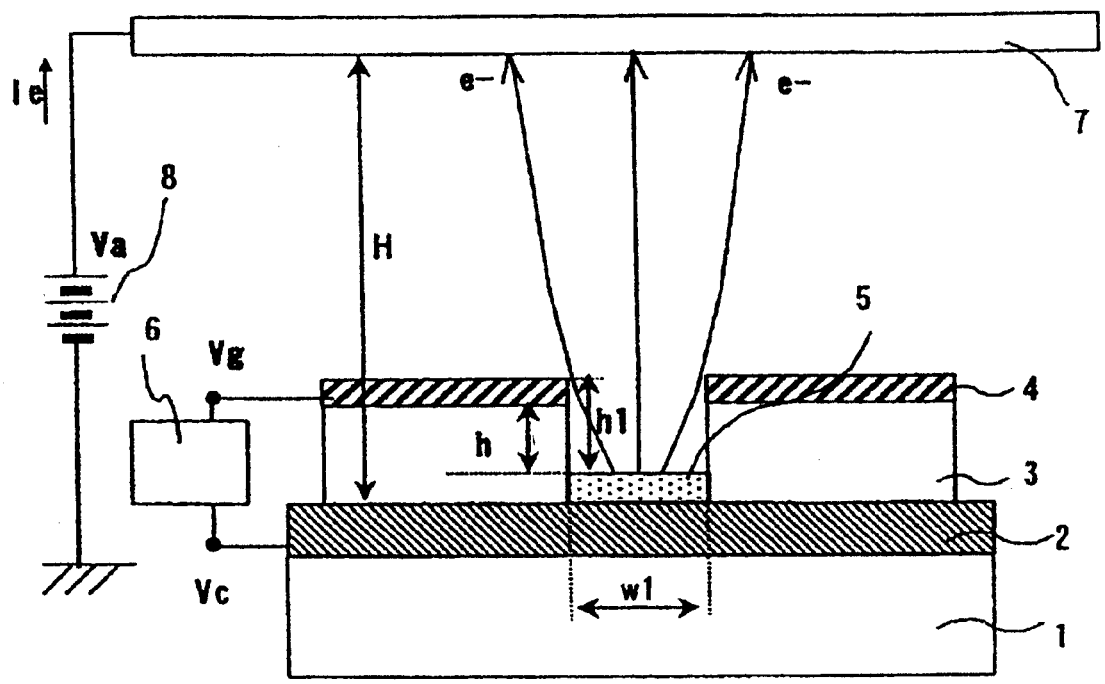
FIG. 1 is a schematic cross-sectional view showing the construction of an electron-emitting device to which the present invention is applied.
Figure 1B:
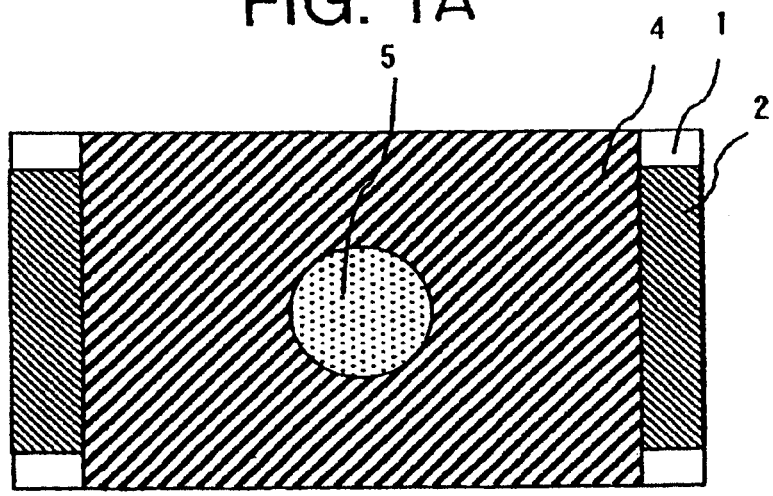
Figure 2A:
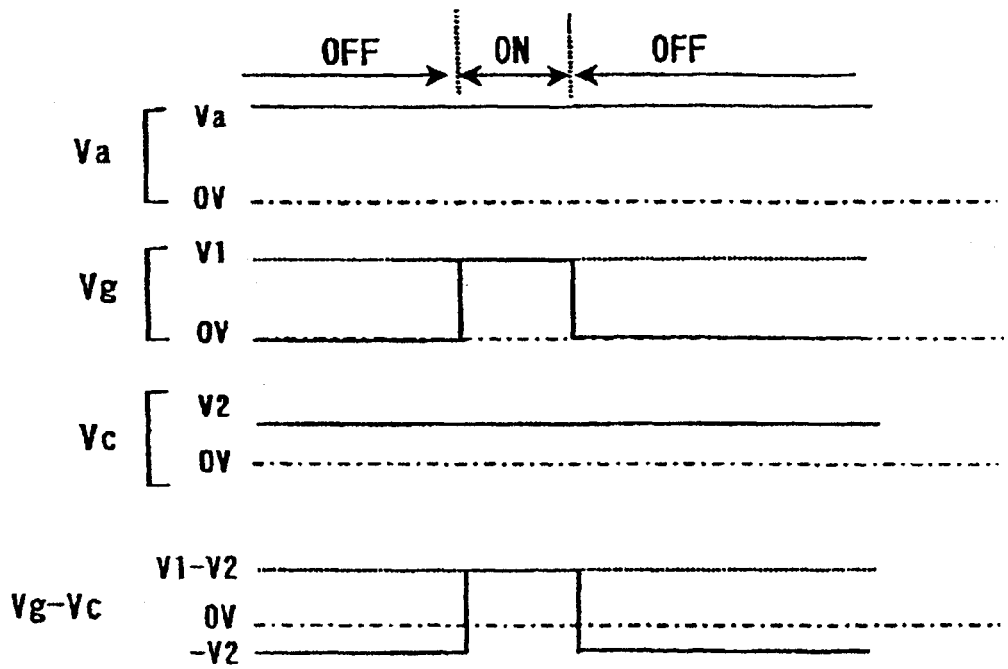
Figure 2B:
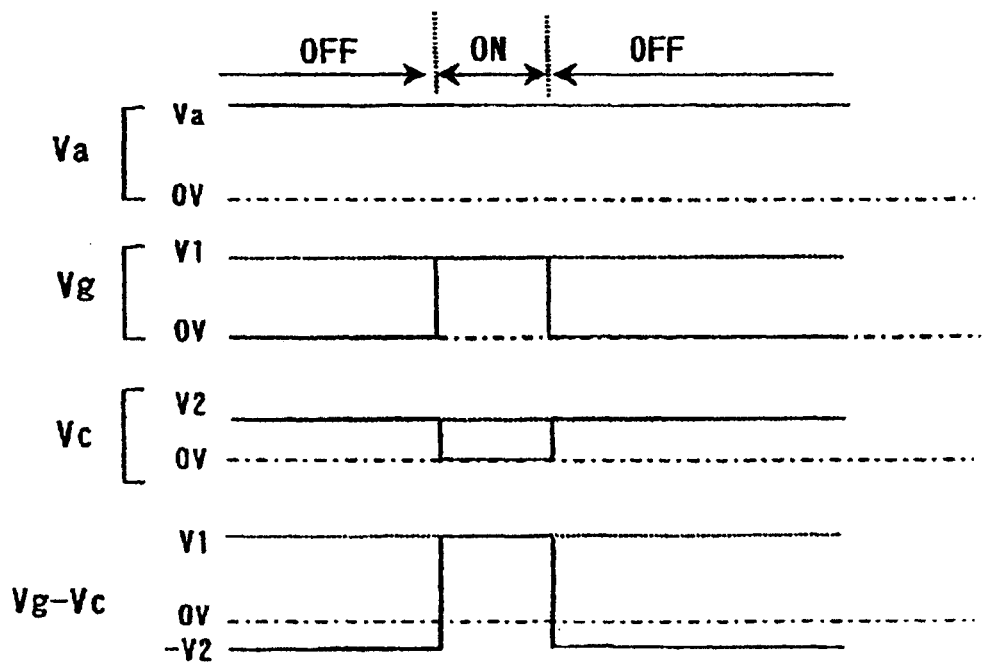
Figure 4A:
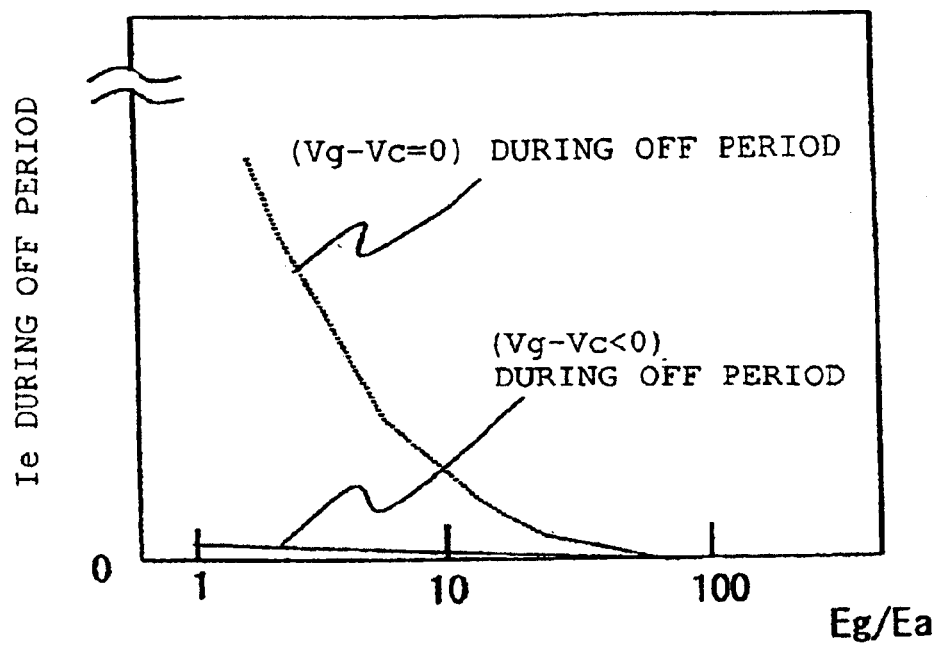
Figure 4B:
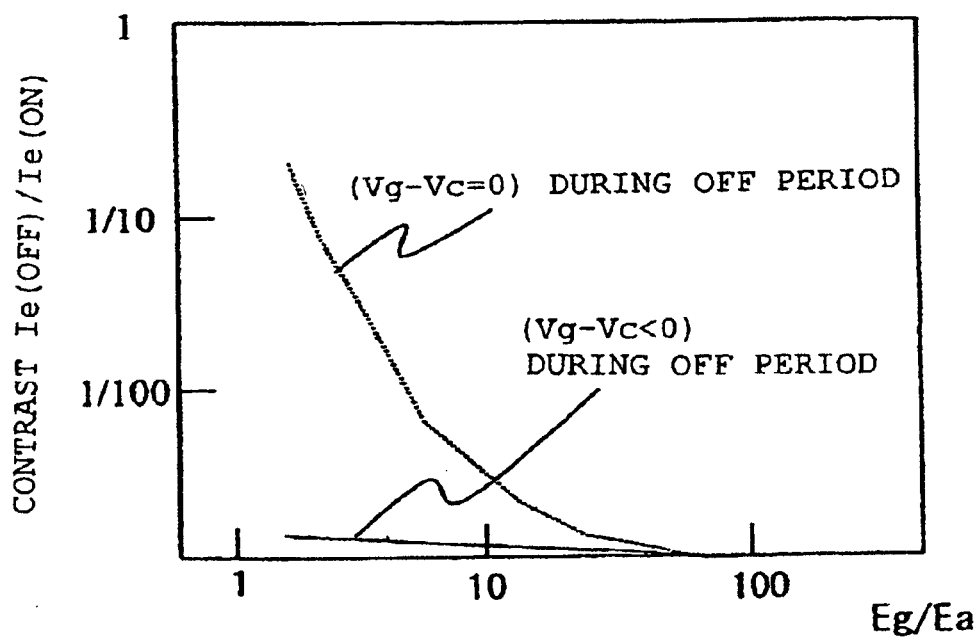
Figure 5A:
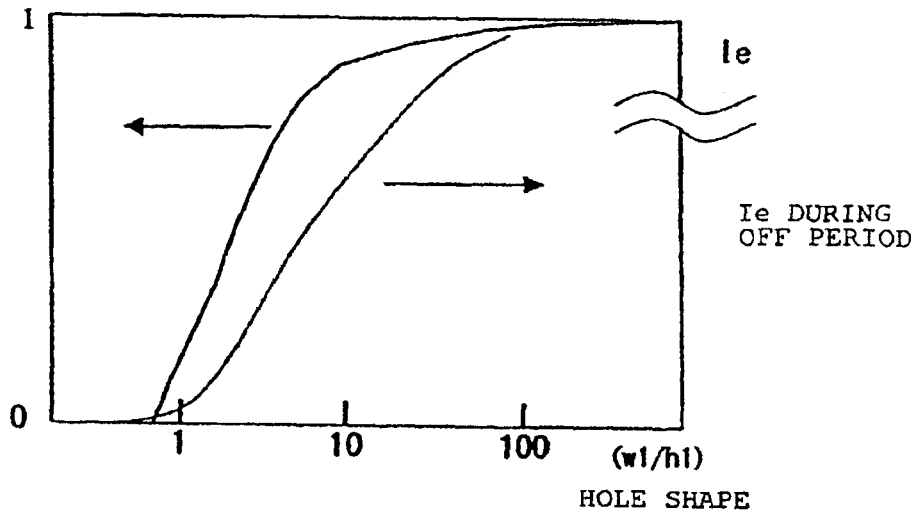
Figure 5B:
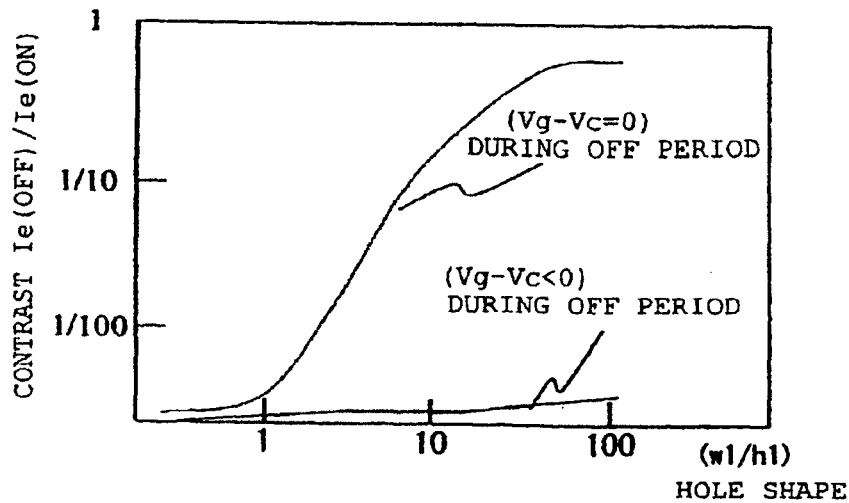
Figure 8:
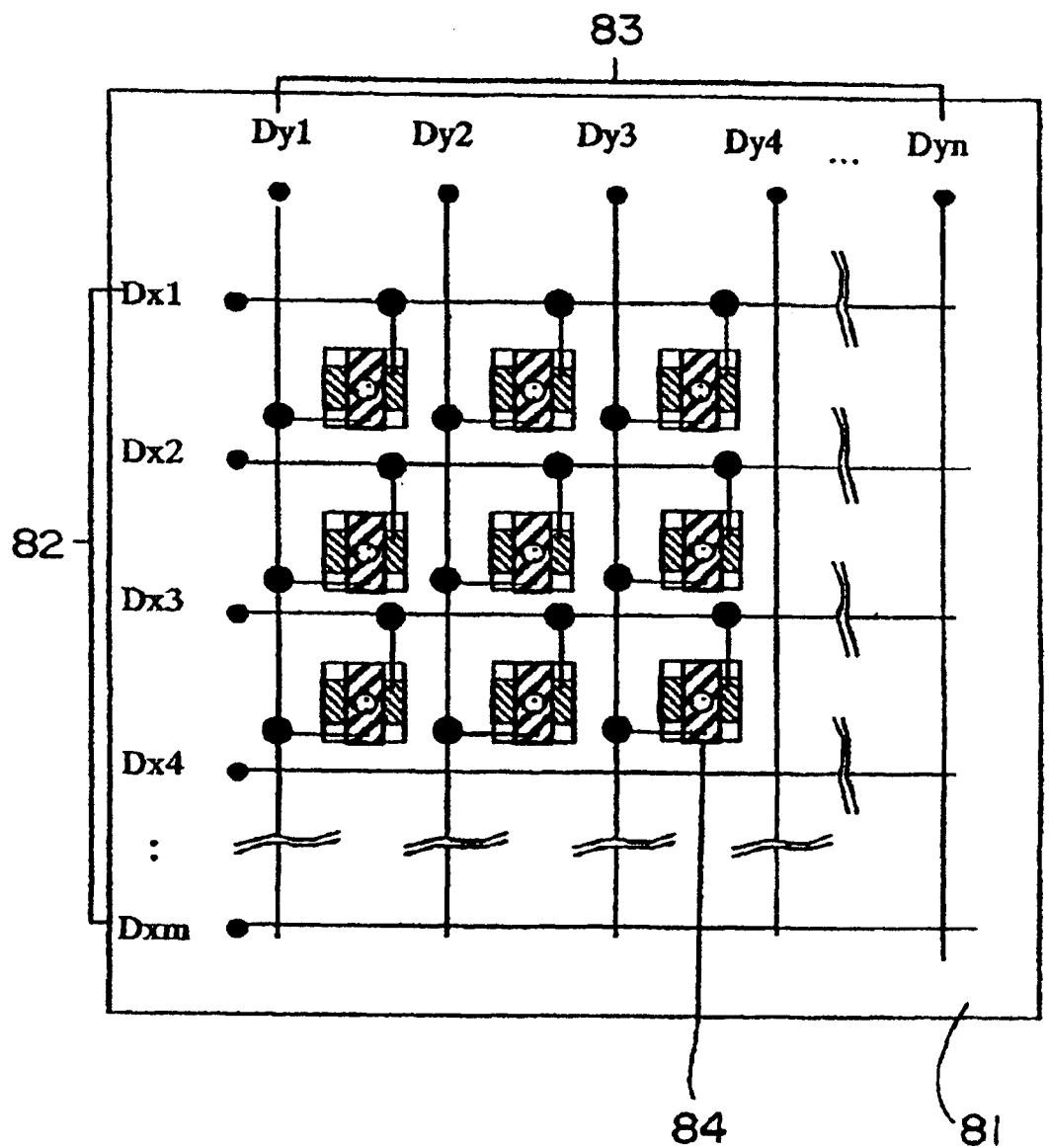
Figure 9:
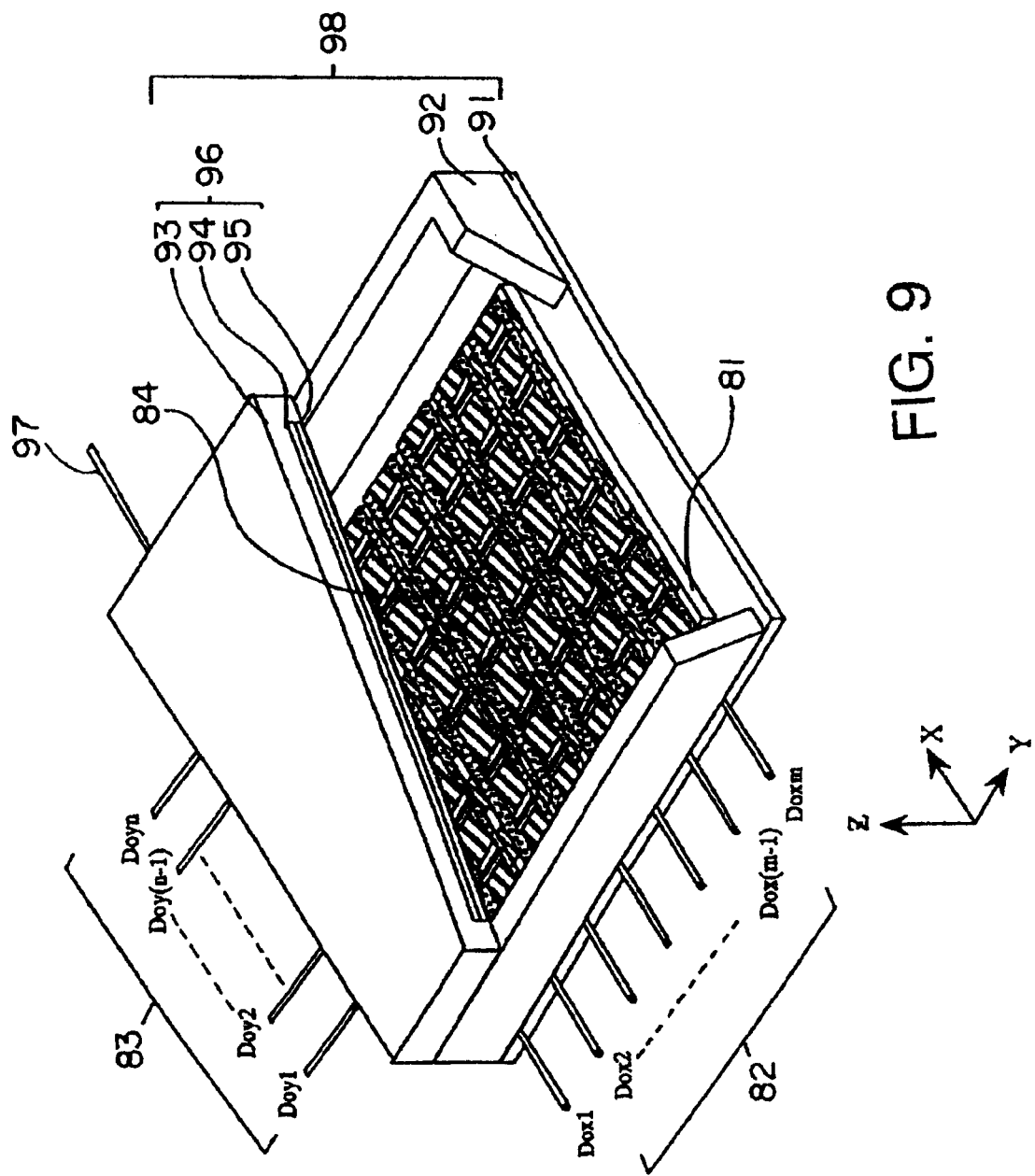
Figure 10A:
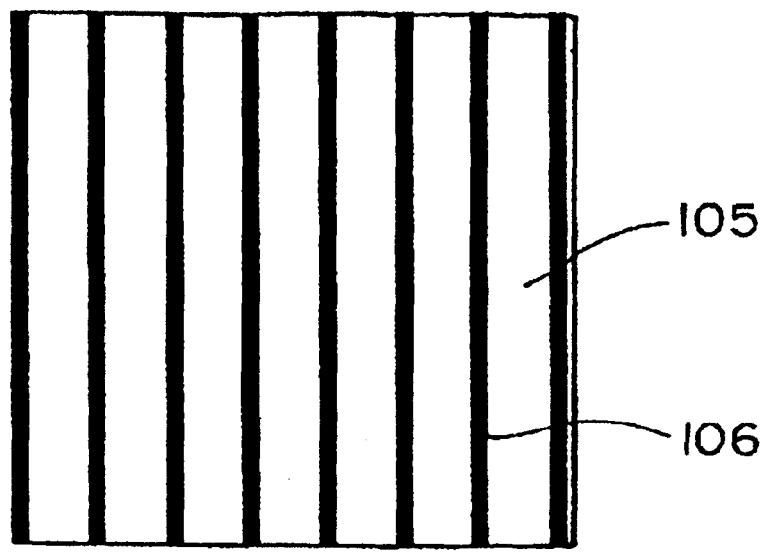
Figure 10B:
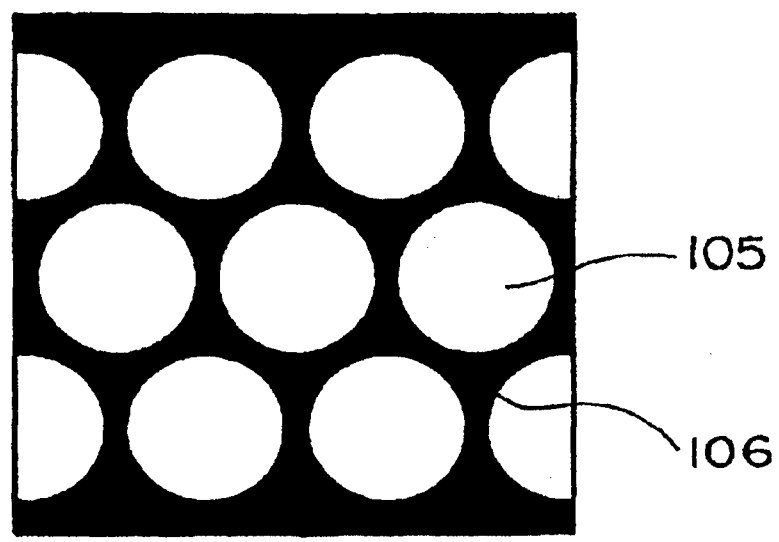
Figure 11:
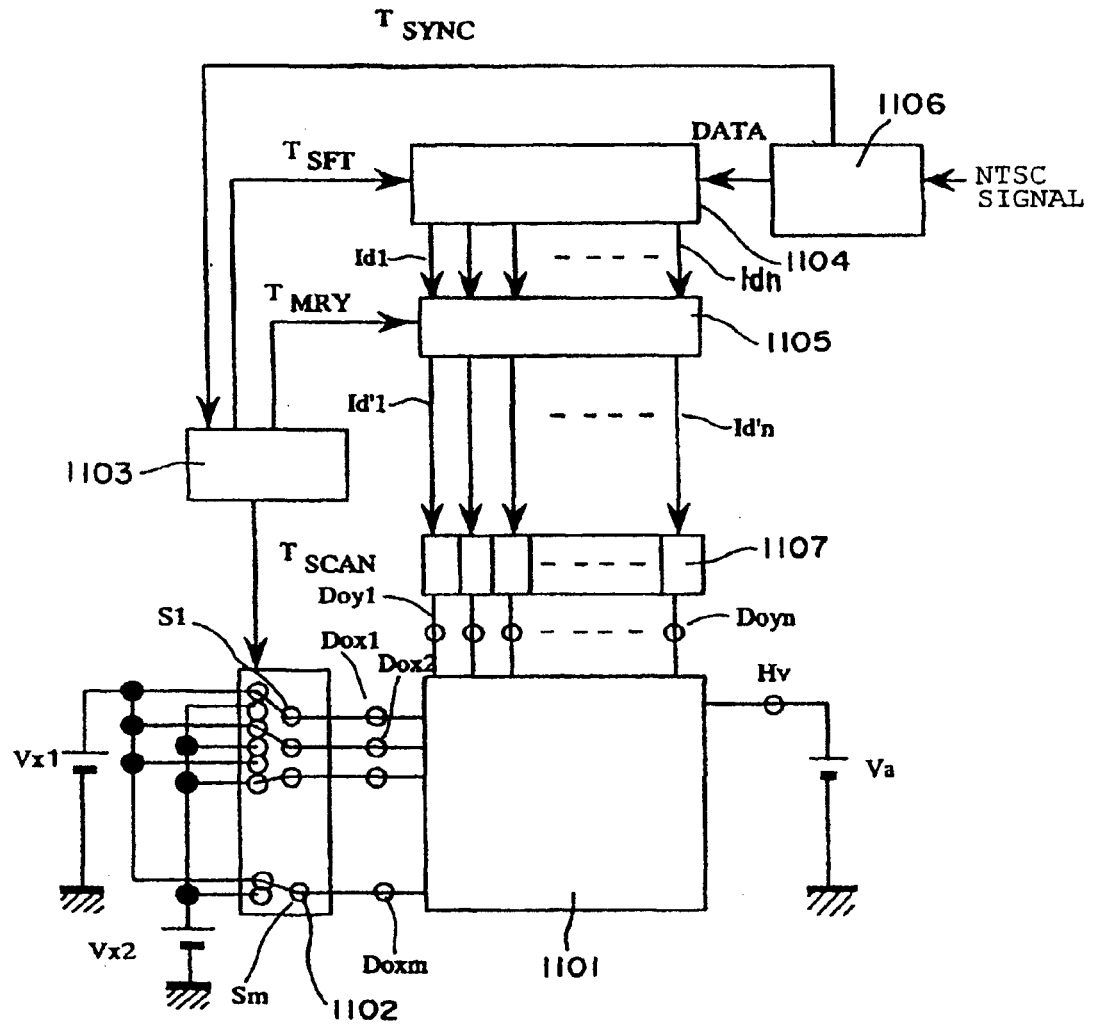
Figure 12A:
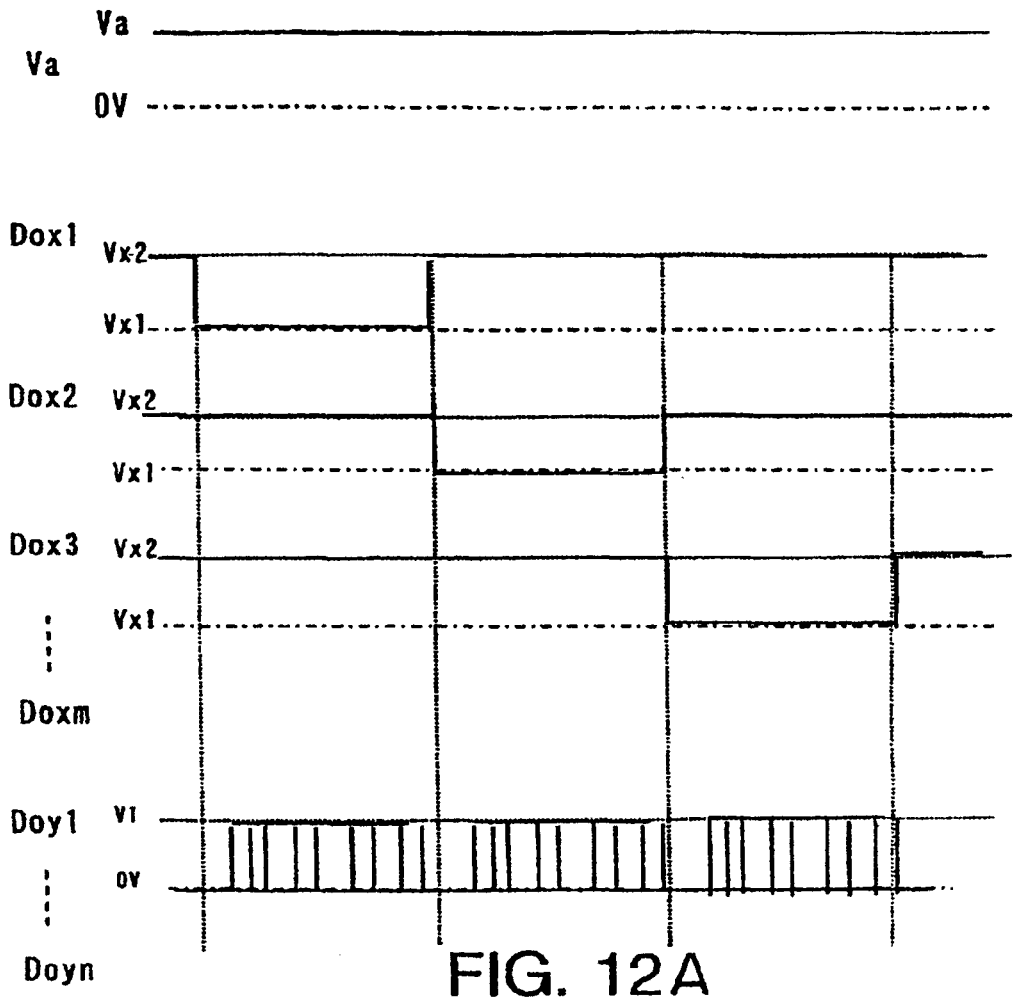
Figure 12B:
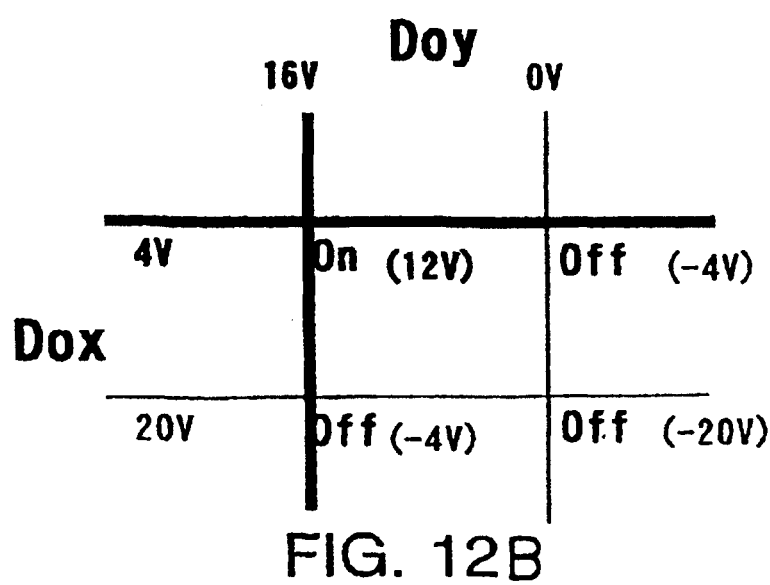
Figure 13A:
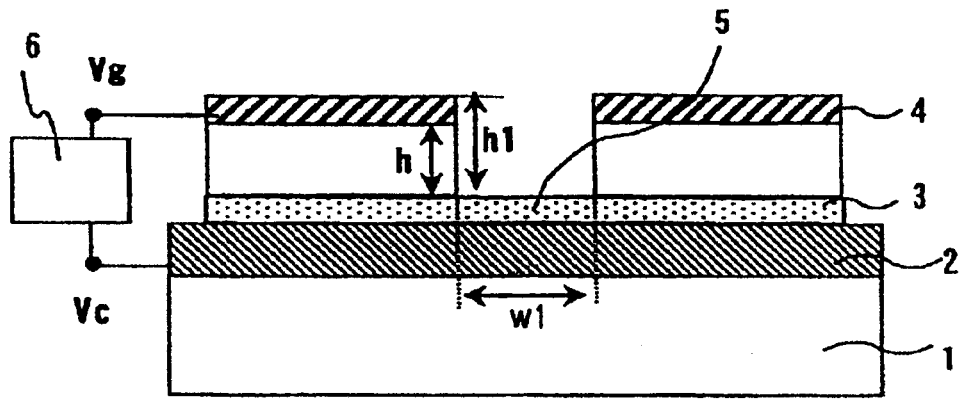
Figure 13B:
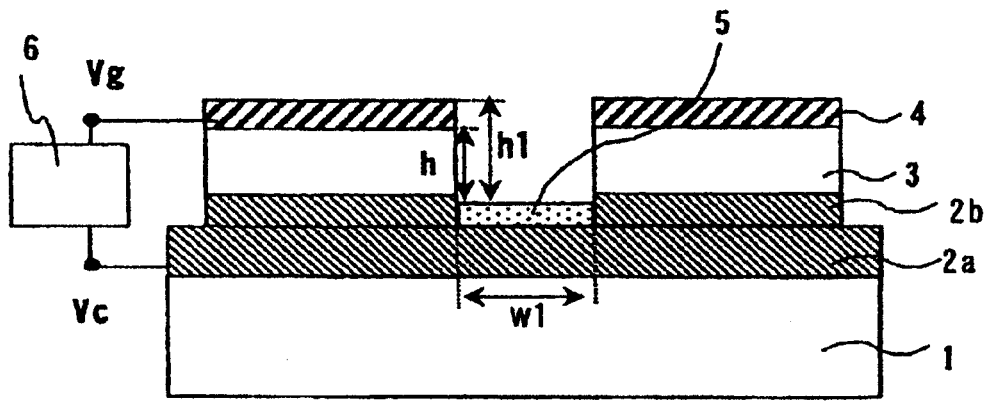
Figure 13C:
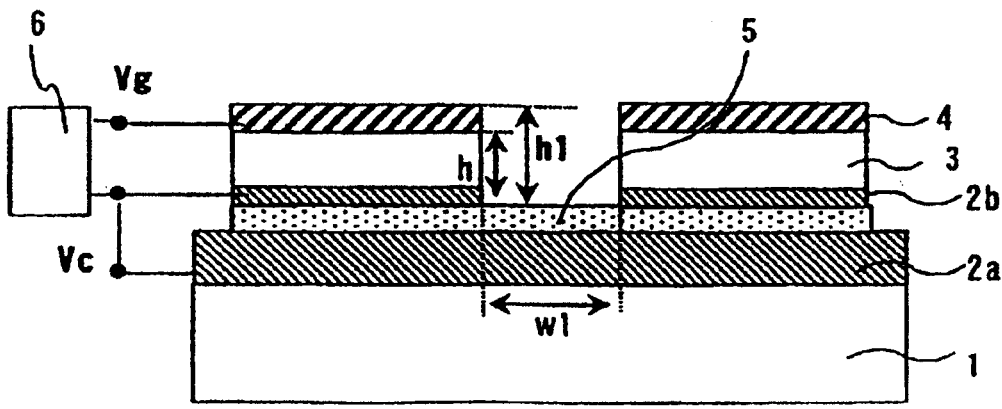
Figure 14A:
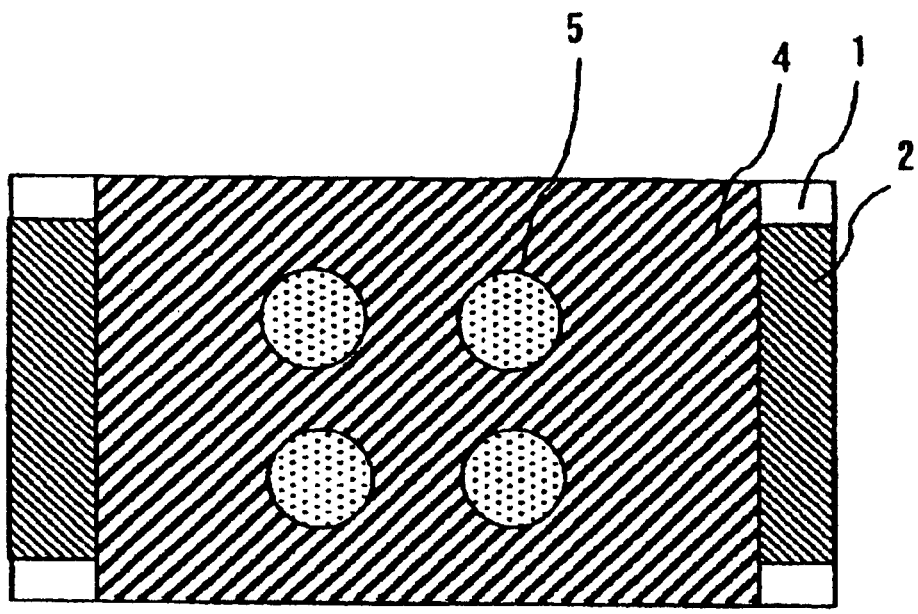
Figure 14B:
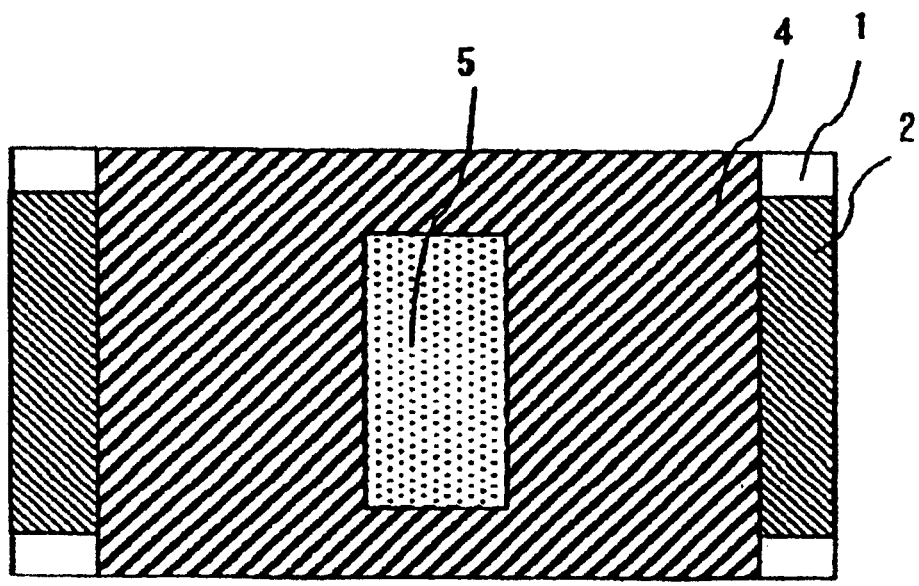
Figure 15A:
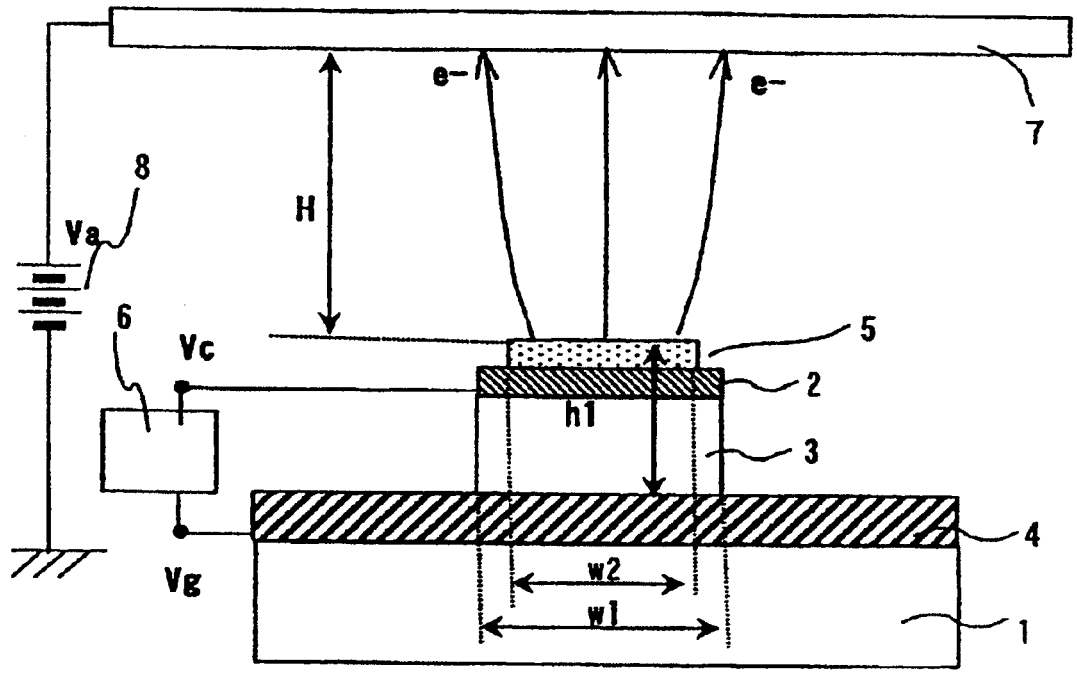
Figure 15B:
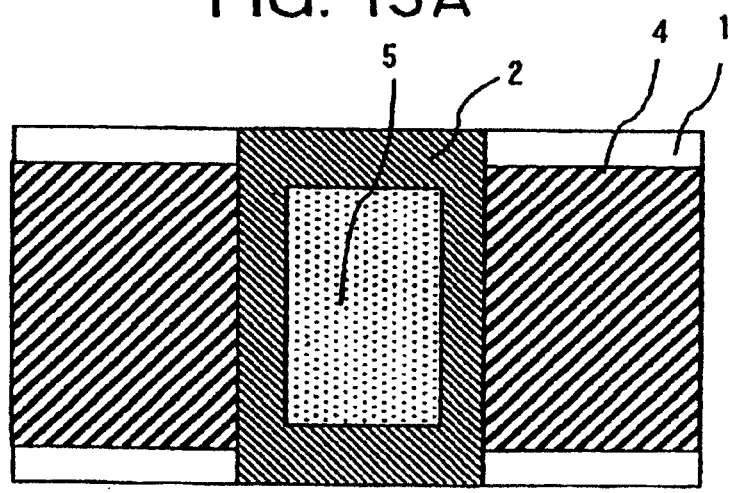
Figure 16A:
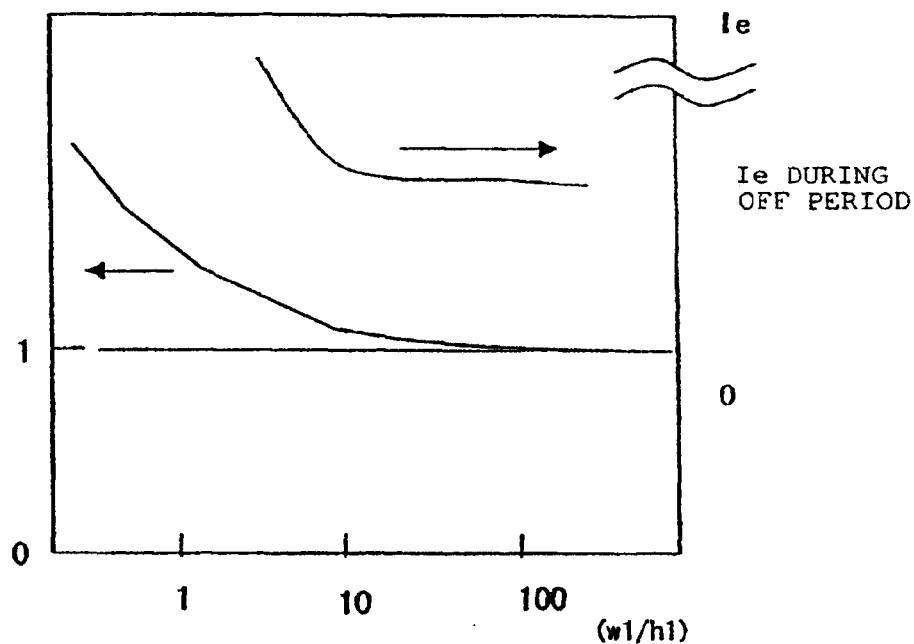
Figure 16B:
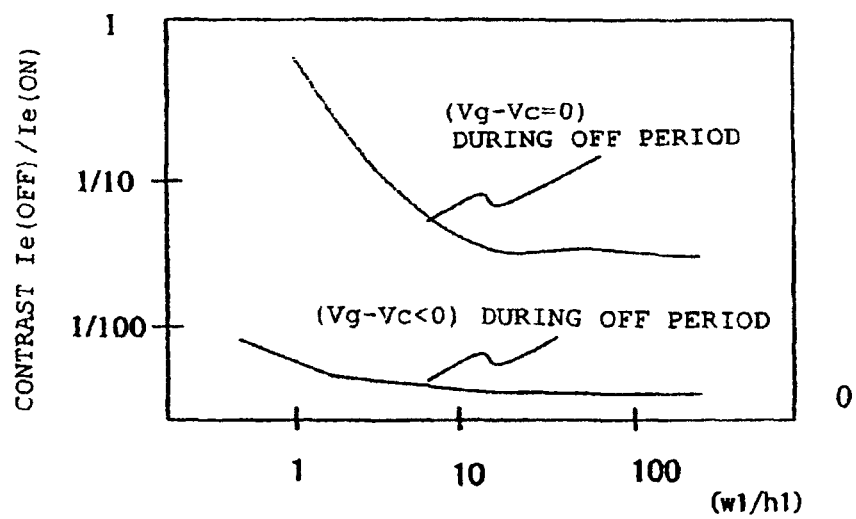
Figure 17:
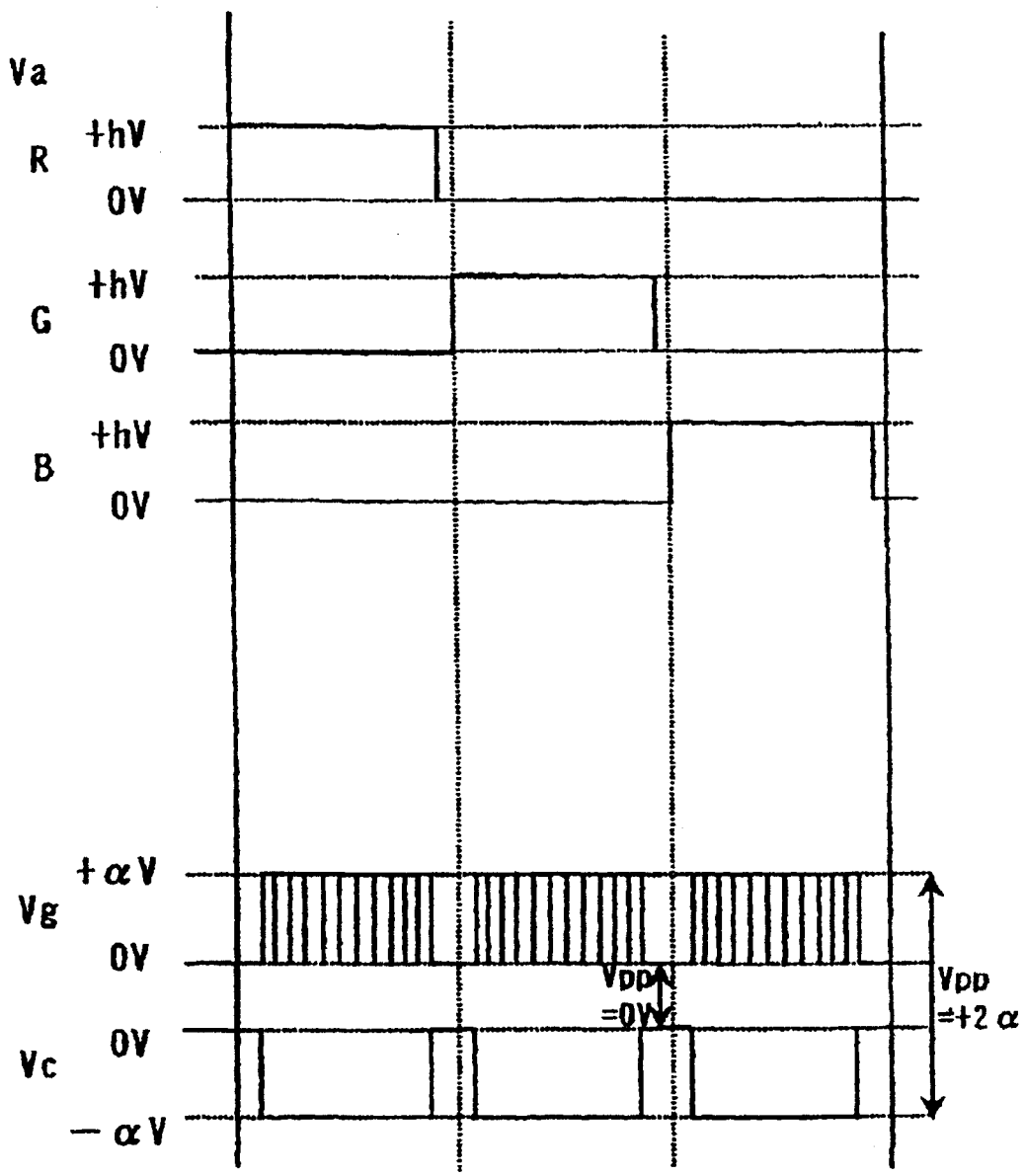

In the accompanying drawings:

FIGS. 1A and 1B show the structure of an electron-emitting device in accordance with an embodiment of the present invention;

FIGS. 2A and 2B show an electron-emitting device driving method in accordance with the embodiment of the present invention;

FIG. 3 illustrates a driving condition of the electron-emitting device in accordance with the embodiment of the present invention;

FIGS. 4A and 4B illustrate another driving condition of the electron-emitting device in accordance with the embodiment of the present invention;

FIGS. 5A and 5B illustrate still another driving condition of the electron-emitting device in accordance with the embodiment of the present invention;

FIGS. 6A to 6F show an example method of manufacturing the electron-emitting device in accordance with the embodiment of the present invention;

FIG. 7 shows an example of an electron source in accordance with the embodiment of the present invention;

FIG. 8 schematically shows the construction of the electron source in accordance with the embodiment of the present invention that has a passive matrix configuration;

FIG. 9 schematically shows the construction of an image-forming apparatus in accordance with the embodiment of the present invention that uses the electron source having the passive matrix configuration;

FIGS. 10A and 10B each show a fluorescent film provided in the image-forming apparatus in accordance with the embodiment of the present invention;

FIG. 11 is a block diagram showing an example of a driving circuit for the image-forming apparatus in accordance with the embodiment of the present invention;

FIG. 12A is an example timing chart showing a control operation in accordance with the embodiment of the present invention and FIG. 12B shows an example of a driving voltage applied;

FIGS. 13A to 13C show an electron-emitting device in accordance with a sixth embodiment;

FIGS. 14A and 14B show an electron-emitting device in accordance with a seventh embodiment;

FIGS. 15A and 15B show an electron-emitting device in accordance with an eighth embodiment;

FIGS. 16A and 16B illustrate the characteristics of the electron-emitting device in accordance with the eighth embodiment; and FIG. 17 schematically shows an example of a conventional method of controlling an image-forming apparatus.

DETAILED DESCRIPTION OF THE PREFERRED EMBODIMENTS

The preferred embodiments for carrying out the present invention are exemplarily described in detail below with reference to the drawings. Note that, unless otherwise specified, there is no intention to limit the scope of the present invention to the sizes, materials, shapes, relative positions, and other aspects of components described below. Also, unless otherwise specified, there is no intention to limit the scope of the present invention to conditions, such as a driving waveform and voltages applied to a cathode electrode, a gate electrode, and an anode electrode, that are to be described later. Note that in this specification, a voltage refers to a potential difference from a reference potential "0 V".

FIGS. 1A and 1B are schematic diagrams of an electron-emitting device having the most basic construction, out of devices that are controlled using the electron-emitting device controlling method according to the present invention. FIG. 1A is a cross-sectional view of the electron-emitting device, while FIG. 1B is a plan view seen from above of the electron-emitting device.

In FIGS. 1A and 1B, reference numeral 1 represents a substrate; numeral 2, a cathode electrode disposed on the substrate 1; numeral 3, an insulating layer sandwiched between the cathode electrode 2 and a gate electrode 4; and numeral 4, the gate electrode. Also, numeral 5 denotes an electron-emitting layer that functions as an electron-emitting portion which is provided on the bottom surface of a hole that has a circular opening shape and passes through the gate electrode 4 and the insulating layer 3.

The hole, on whose bottom surface is provided the electron-emitting layer (electron-emitting film) 5, has a opening width W1 and has a depth h1 between the surfaces of the gate electrode 4 and the electron-emitting layer 5. The electron-emitting device according to the present invention is constructed using these components.

With this construction, a cathode voltage Vc and a gate voltage Vg are modulated and applied to the cathode electrode 2 and the gate electrode 4, respectively, by a power supply 6. In this manner, a voltage (Vg−Vc) is applied as a driving voltage between the cathode electrode 2 and the gate electrode 4.

An anode electrode 7 is arranged over the electron-emitting device and an anode voltage Va is applied to the anode electrode 7 by a high voltage power supply 8. The anode electrode 7 captures electrons emitted from the electron-emitting device and detects an electron emission current Ie.

There is a distance H between the anode electrode 7 and the electron-emitting device. In general, the distance H between the anode electrode 7 and the device is determined with reference to the position of the cathode electrode 2. Therefore, if the average strength of an electric field applied between the electron-emitting device and the anode electrode during driving is referred to as Ea, an equation "Ea=Va/H" is obtained.

While the electron-emitting device is being driven, the cathode voltage Vc, the gate voltage Vg, and the anode voltage Va are applied and an electric field corresponding to these voltages is formed. The strength of an electric field that is necessary for the electron emission by the electron-emitting device is mainly determined by the voltage (Vg−Vc) applied between the cathode electrode 2 and the gate electrode 4 and the distance h between the cathode electrode 2 and the gate electrode 4. Therefore, when the average strength of an electric field applied to the electron-emitting device during the electron emission is referred to as Eg, an equation "Eg=(Vg−Vc)/h" is obtained.

Needless to say, the electric field that is actually applied to the electron-emitting layer 5 greatly varies depending on the shape of the electron-emitting device and therefore is shifted from the average electric field strength Eg. However, the cathode electrode 2, the electron-emitting layer 5, the gate electrode 4, and the anode electrode 7 are arranged almost parallel to each other in the electron-emitting device according to the present invention, so that the definition of the average electric field strength is an effective yardstick.

FIGS. 2A and 2B each show the waveform of a driving voltage applied when the state of this electron-emitting device is switched between an ON state (a driving state where electrons are emitted) and an OFF state (a halt state where electrons are not emitted). FIG. 2A concerns an example where the driving voltage is modulated only by the gate voltage Vg, while FIG. 2B concerns an example where the driving voltage is modulated by both of the gate voltage Vg and the cathode voltage Vc.

In one of cases shown in FIGS. 2A and 2B, the voltage (Vg–Vc) between the cathode electrode 2 and the gate electrode 4 is set so as to fall below "0" during an OFF period in which electron emission should be halted. This is a characteristic of the present invention. That is, in a driving state where electrons should be emitted, electron emission is performed by setting the voltage (Vg–Vc) so as to exceed "0". On the other hand, in a halt state where electrons should not be emitted, electron emission is halted by setting the voltage (Vg–Vc) so as to fall below "0".

FIG. 3 illustrates a driving condition and halt condition that are used to control the electron-emitting device in the manner shown in FIG. 2.

This drawing shows the change in emission current Ie due to the change in the gate voltage Vg under a condition where the cathode voltage Vc is set to 0V. A Vg–Ie characteristic in the case of a conventional control operation is shown using a broken line in FIG. 3.

In the case of the conventional control shown in FIG. 3 using the broken line, a characteristic curve is obtained where the emission current Ie markedly increases in accordance with the increase in the gate voltage Vg. Accordingly, the gate voltage Vg=V1 during an ON period, in which electrons are emitted from the device, is determined by selecting a required amount of the emission current Ie.

Also, in the case of the conventional Vg–Ie characteristic curve shown using the broken line, almost no electrons are emitted and the emission current Ie becomes "0" when the gate voltage Vg is set to 0V. Accordingly, by setting the gate voltage Vg at 0V (=cathode voltage Vc) during an OFF period in which the electron emission by the device should be halted, the modulation may be preferably effected.

Also, a solid line in FIG. 3 represents a Vg–Ie characteristic curve in the case where the anode voltage Va is increased under a situation where a constant distance H is maintained between the electron-emitting device and the anode electrode 7.

As is apparent by comparing the Vg–Ie characteristic curves indicated by the solid line and the broken line in FIG. 3, the gate voltage Vg applied to perform electron emission is decreased in accordance with the increase in the anode voltage Va.

Also, in the case of the Vg–Ie characteristic curve indicated by the solid line in FIG. 3, the emission current Ie does not become "0" and a certain amount of emission current is observed even if the gate voltage Vg becomes around 0 V. This is because even if the gate voltage Vg is set to 0 V, a strong electric field formed between the electron-emitting device and the anode electrode 7 cannot be canceled and an electric field that allows electron emission to be performed is applied to a part of the electron-emitting layer 5.

Here, in the case of the electron-emitting device shown in FIG. 1, the anode electrode 7, the gate electrode 4 in accordance with this embodiment, and the cathode electrode 2 (the electron emitting layer 5) are arranged almost parallel to each other in order to prevent the increase of the electron beam diameter. With this arrangement, their electric fields are formed parallel to each other, so that an electric field formed by the anode electrode 7 tends to directly affect the electron-emitting device.

If the gate voltage Vg applied to the electron-emitting device shown in FIG. 1 is set to 0 V under a situation where settings have been made so that the Vg–Ie characteristic curve indicated by the solid line in FIG. 3 is obtained, an electric field in a direction toward the anode electrode 7 remains in the center portion of the electron-emitting layer 5 formed on the bottom surface of the hole. As a result, electron emission is performed due to the electric field remaining in the portion.

On the other hand, if the gate voltage Vg applied to the electron-emitting device shown in FIG. 1 is set to a negative potential under a situation where settings have been made so that the Vg–Ie characteristic curve indicated by the solid line in FIG. 3 is similarly obtained, the amount of the emission current Ie is markedly reduced. This is because the relation between the voltages applied to the cathode electrode 2 and the gate electrode 4 is reversed, that is, a potential that is higher than that applied to the gate electrode 4 is applied to the cathode electrode 2 and therefore the direction of the electric field applied to the electron-emitting layer 5 is changed.

As described above, in the electron-emitting device in accordance with this embodiment, the anode electrode 7, the gate electrode 4, and the cathode electrode 2 (the electron-emitting layer 5) are arranged almost parallel to each other, so that these components tend to affect each other. Therefore, the electric field applied to the electron-emitting layer 5 is reversed by the reversal of the voltage applied between the gate electrode 4 and the cathode electrode 2. As a result, the strength of the electric field in a direction toward the anode electrode 7 is decreased without difficulty. This allows electron emission to be effectively suppressed during an OFF period.

Therefore, as can be seen from FIG. 3, to effectively control the electron-emitting device following the Vg–Ie characteristic curve indicated by the solid line in FIG. 3, the halt condition that should be satisfied by the device during an OFF period is shifted from "Vg=0 V" on the conventional Vg–Ie characteristic curve indicated by the broken line to a position where the emission current Ie becomes "0" on the Vg–Ie characteristic curve indicated by the solid line. That is, to halt electron emission during an OFF period, the gate voltage Vg is shifted to −V2 as indicated by an arrow. As a result, the amount of emission current Ie becomes almost zero in an OFF state.

Accordingly, during an OFF period in which the electron-emitting device should be placed in an OFF state, settings are newly made so that the emission current Ie becomes zero on the Vg–Ie characteristic curve indicated by the solid line in FIG. 3, that is, the cathode voltage Vc is set to zero and the gate voltage Vg is set to −V2 on the characteristic curve. Here, if the relative potential conditions of the cathode voltage Vc and the gate voltage Vg do not change, the strength of the electric field formed between the cathode electrode 2 and the gate electrode 4 does not change. Thus, the cathode voltage Vc may be set to V2 and the gate voltage Vg may be set to zero. That is, the emission current Ie in the electron-emitting device in an OFF state can be suppressed by satisfying a condition "Vc>Vg ((Vg−Vc)<0)".

The amount of emission current Ie in the electron-emitting device in an ON state, which is obtained by setting the voltage Vg at V1 (Vc=0) in the conventional case where a low anode voltage Va is applied, can be obtained in the case of the Vg–Ie characteristic curve indicated by the solid line in FIG. 3 by setting the gate voltage Vg at V1−V2, as indicated by an arrow in FIG. 3. Here, even if the cathode voltage Vc is set to V2 and the gate voltage Vg is set to V1, the relative potential conditions of the cathode voltage Vc and the gate voltage Vg do not change, as described above. Therefore, the same amount of emission current Ie as in the conventional case can be obtained.

FIG. 2A shows an example where the device is controlled according to the conditions described above. That is, the cathode voltage Vc is changed from 0V to V2 and is maintained at V2, and according to this change, the gate voltage Vg is modulated to be set to V1 during an ON period and is set to 0 V during an OFF period to control the device.

Also, FIG. 2B shows a device control operation performed according to different conditions. By the control operation shown in this drawing, the gate voltage Vg is modulated in the same manner as in the case shown in FIG. 2A, but the cathode voltage Vc is set to 0 V during an ON period and is set to V2 during an OFF period.

As shown in FIG. 3, if the cathode voltage Vc is set to 0V and the gate voltage Vg is set to V1 during an ON period of the device, the set point during the ON period is shifted from the position specified by a circle on the broken line to the position on the solid line along the vertical axis. With such a setting, the voltage (Vg–Vc) between the cathode electrode 2 and the gate electrode 4 during an ON period is set to V1. As a result, during an ON period, the voltage (Vg–Vc) between the cathode electrode 2 and the gate electrode 4 becomes higher than V1-V2 that is obtained under the control conditions shown in FIG. 2A. This means that the amount of emission current Ie during an ON period is increased. Note that, even in this case, the relative relation between the cathode voltage Vc and the gate voltage Vg becomes (Vg–Vc)<0 during an OFF period.

It should be noted here that the problem becomes acute in accordance with the increase in Ea. The resulting effect can be explained using the ratio between Ea and Eg.

The relation between Eg/Ea and Ie is shown in FIG. 4A.

As is apparent from the broken line in this drawing, if Eg/Ea>100, the (remaining) emission current Ie becomes almost zero during an OFF period even with a conventional driving method where the voltage Vg–Vc is set to zero during the OFF period. However, the emission current Ie during an OFF period increases in accordance with the decrease of the ratio Eg/Ea.

On the other hand, the voltage Vg–Vc is set so as to fall below zero with the method of the present invention, so that the emission current Ie during an OFF period is suppressed as indicated by the solid line.

The contrast between an ON period and an OFF period is shown in FIG. 4B.

In an electron-emitting device, the ratio (Ie (OFF)/Ie (ON)) between the emission currents Ie during an ON period and an OFF period should become around 1/100 or lower, or preferably around 1/1000. With the driving method of the present invention, even if the ratio Eg/Ea is decreased, the contrast (Ie (OFF)/Ie (ON)) can be maintained at a low level.

Accordingly, in the case of Eg/Ea≦100, the driving method of the present invention becomes more effective at suppressing the lowering of a contrast.

Also, the setting of the cathode voltage Vc at V2 depends on a configuration of the electron-emitting device. FIG. 5A shows the changes in the (remaining) electric field and the (remaining) emission current Ie during an OFF period according to the shape of the hole of the device. The largest remaining electric field is generated at the center of the hole and therefore this drawing shows the electric field observed at the center position.

In this drawing, the device shape is shown using the ratio between the opening width w1 and depth h1 of the hole. This is because the hole shape can almost be normalized using this ratio for consideration.

The emission current Ie during an OFF period is increased in accordance with the increase in the ratio w1/h1 with a conventional driving method where the voltage Vg–Vc becomes zero during the OFF period. On the other hand, even under ordinary driving conditions, the emission current Ie is not so increased if the ratio w1/h1 is below 1.

The contrast between an ON period and an OFF period is shown in FIG. 5B.

With the driving method of the present invention, it becomes possible to prevent the lowering of a contrast even in the case of a shape where the ratio w1/h1 is increased to a level, in which the contrast is lowered under the ordinary driving conditions where the voltage Vg–Vc is set to zero during an OFF period.

Also, the driving method of the present invention more effectively prevents the lowering of a contrast in the case of w1/h1≧1.

In the above description, the anode voltage Va is set to a high voltage, although the electric field between the device and the anode electrode 7 can be strengthened by reducing the distance H between the device and the anode electrode 7. The electron-emitting device driving method of the present invention is also effective in this case.

In the above-mentioned electron-emitting device in accordance with this embodiment, a flat electric field with less deformation is formed between the electron-emitting layer 5 and the anode electrode 7, so that the increase of an electron beam diameter is suppressed and therefore a small electron beam diameter is obtained. Also, by selecting a material having a low work function for the electron-emitting layer 5, it becomes possible to lower the driving voltage for the device.

Also, the electron-emitting device described above has a very simple construction where the lamination of a component is repeatedly performed during manufacturing. This means that the manufacturing process is simple and therefore yields thereof are improved.

FIGS. 6A to 6F shows a general method of manufacturing the electron-emitting device described above. An example method of manufacturing the electron-emitting device is described below with reference to FIGS. 6A to 6F.

Figure 6:
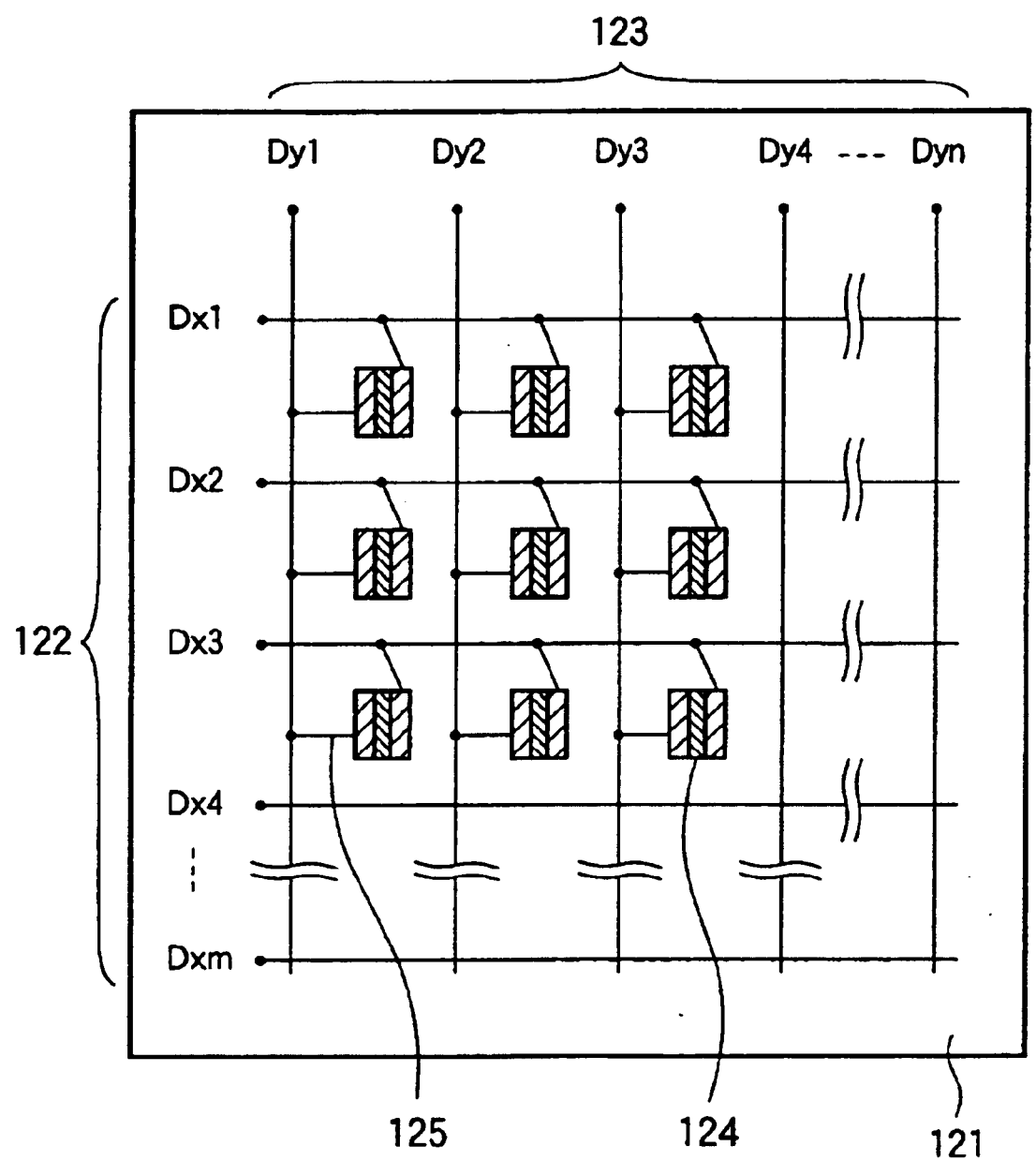
FIG. 6 is a schematic view showing the construction of an electron source having passive matrix configuration according to an embodiment of the present invention.
Figure 6A:

As shown in FIG. 6A, the cathode electrode 2 is laminated on the substrate 1. As the substrate 1, it is possible to use a substrate which has a sufficiently cleaned surface and is made of quartz glass, glass in which the amount of impurities, such as Na, is reduced, a soda lime glass, a silicon substrate, or the like, on which an $SiO_2$ layer is disposed with a sputtering method or the like or an insulating substrate made of ceramics such as alumina.

In general, the cathode electrode 2 has conductivity and is formed with a general vacuum deposition technique, such as a vapor deposition method or a sputtering method, or a photolithography technique. The material of the cathode electrode 2 is, for instance, appropriately selected from a group consisting of metals (such as Be, Mg, Ti, Zr, Hf, V, Nb, Ta, Mo, W, Al, Cu, Ni, Cr, Au, Pt, and Pd), their alloys, a carbide (such as TiC, ZrC, HfC, TaC, SiC, and WC), a boride (such as $HfB_2$, $ZrB_2$, $LaB_6$, $CeB_6$, $YB_4$, and $GdB_4$), a nitride (such as TiN, ZrN, and HfN), a semiconductor (such as Si and Ge), carbon in which diamond is dispersed, a carbon compound, a polymer material, an amorphous carbon, graphite, diamond like carbon, and a fiber whose main ingredient is carbon (such as a carbon nanotube and a graphitic nanofiber). The thickness of the cathode electrode 2 is set in a range of several ten nm to several mm, and preferably in a range of several hundred nm to several μm.

Figure 6B:
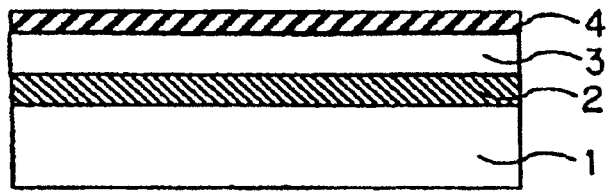

Next, as shown in FIG. 6B, the insulating layer 3 is disposed on the cathode electrode 2. The insulating layer 3 is formed with a general vacuum deposition method, such as a sputtering method, a CVD method, or a vacuum evaporation method. The thickness of the insulating layer 3 is set in a range of several nm to several μm, and preferably in a range of several ten nm to several hundred nm. It is preferable that the insulating layer 3 is made of a material, such as $SiO_2$, SiN, $Al_2O_3$, and Caf, that has a high resistance to a high electric field.

Further, the gate electrode 4 is disposed on the insulating layer 3. Like the cathode electrode 2, the gate electrode 4 has conductivity and is formed with a general vacuum layer formation technique, such as a vapor deposition method or a sputtering method, or a photolithography technique. The material of the gate electrode 4 is, for instance, appropriately selected from a group consisting of metals (such as Be, Mg, Ti, Zr, Hf, V, Nb, Ta, Mo, W, Al, Cu, Ni, Cr, Au, Pt, and Pd), their alloys, a carbide (such as TiC, ZrC, HfC, TaC, SiC, and WC), a boride (such as $HfB_2$, $ZrB_2$, $LaB_6$, $CeB_6$, $YB_4$, and $GdB_4$), a nitride (such as TiN, ZrN, and HfN), a semiconductor (such as Si and Ge), and an organic high-polymer material. The thickness of the gate electrode 4 is set in a range of several nm to several ten μm, and preferably in a range of several nm to several hundred nm.

It should be noted here that it does not matter whether the cathode electrode 2 and the gate electrode 4 are made of the same material or different materials. Also, it does not matter whether these electrodes 2 and 4 are formed with the same method or different methods.

Figure 6C:
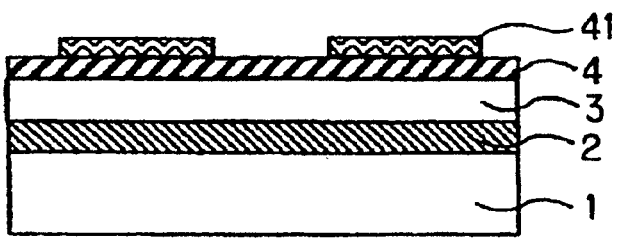

Next, as shown in FIG. 6C, a mask pattern 41 is formed using a photolithography technique.

Figure 6D:
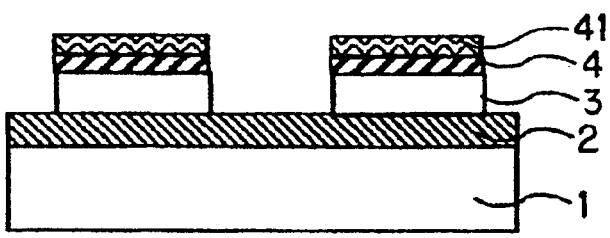

Following this, as shown in FIG. 6D, the lamination structure including a hole is obtained by partially removing the layers 3 and 4 from the lamination element including the cathode electrode 2. Note that it does not matter whether the etching operation is terminated before the cathode electrode 2 is etched or is continued until the cathode electrode 2 is partially etched.

The etching method used in this etching step is appropriately selected according to the materials of the layers 3, 4, and 41.

Figure 6E:
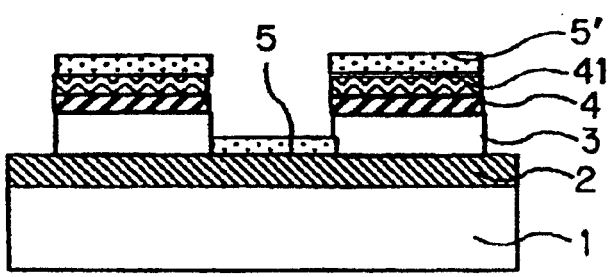

Next, as shown in FIG. 6E, a material of the electron-emitting layer 5 is stacked to coat the entire surface, thereby forming the electron-emitting layer 5 on the bottom surface of the hole. Reference numeral 5' denotes the material of the electron-emitting layer 5 stacked on the mask pattern 41.

The electron-emitting layer 5 is formed using a general layer formation technique, such as a vapor deposition method, a sputtering method, or a plasma CVD method. It is preferable that the electron-emitting layer 5 is formed using a material having a low work function. The material thereof is, for instance, appropriately selected from a group consisting of an amorphous carbon, graphite, diamond like carbon, carbon in which diamond is dispersed, and a carbon compound. It is preferable that the electron-emitting layer 5 is made of a thin diamond film or diamond like carbon having a lower work function. The thickness of the electron-emitting layer 5 is set in a range of several nm to several hundred nm, and preferably in a range of several nm to several ten nm.

If the strength of the electric field that is necessary for electron emission from the electron-emitting layer 5 is decreased as much as possible, it becomes possible to lower the driving voltage. If the electric field that is necessary for the electron emission from the electron-emitting layer 5 is equal to or lower than $5\times10^7$ V/m, the driving voltage is lowered to a preferable level that is around ten and several V.

Figure 6F:
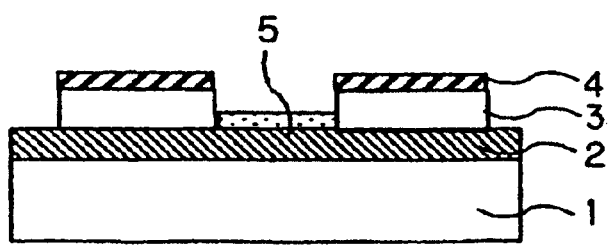
Figure 7:
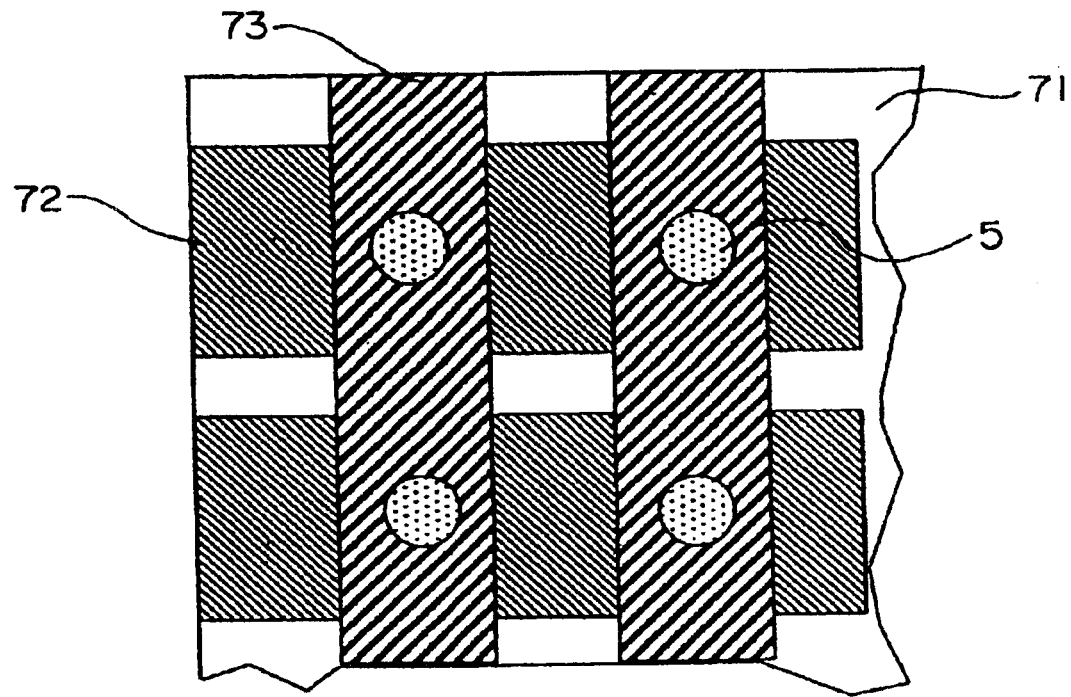

Finally, the mask pattern 41 is peeled off as shown in FIG. 6F. In this manner, the electron-emitting device shown in FIG. 1 is manufactured.

The opening width w1 of the hole formed in the device greatly depends on the electron-emitting characteristics of the device and therefore is appropriately determined according to the characteristics of the materials used to construct the device. In particular, the opening width w1 is determined according to the work function and thickness of the electron-emitting layer 5, the driving voltage of the device, and the required shape of the electron beam for driving the device. In general, the opening width w1 is set in a range of several hundred nm to several ten μm. Note that the shape of the hole is not limited to the round shape and therefore may be a rectangular shape.

The hole depth h1 is also the other factor which depends on the electron-emitting characteristics of the device. To apply an electric field that is necessary for electron emission, the depth h1 is appropriately determined according to the thicknesses of the insulating layer 3 and the electron-emitting layer 5. The depth h1 also relates to the shape of an electron beam to be emitted.

The absolute values of the opening width w1 and the depth h1 of the hole as well as the ratio w1/h1 are important aspects. Therefore, by adjusting the ratio w1/h1, the electron-emitting device driving method in accordance with this embodiment of the present invention becomes more effective. In particular, it is suitable that a condition $w1/h1 \geq 1$ is satisfied.

Also, the electron-emitting device in accordance with this embodiment may be manufactured by obtaining the pattern of the cathode electrode 2, forming the electron-emitting layer 5 on the entire surface, performing etching operation in an etching step, and terminating the etching operation before the electron-emitting layer 5 is also etched. Also, a thin diamond film or diamond like carbon may be selectively stacked at a desired position.

Further, aside from the hole structure, the electron-emitting device may conversely have a convex structure. An example of the convex structure is shown in FIGS. 15A and 15B. In these drawings, the gate electrode 4 is arranged on the substrate 1, the insulating layer 3 is arranged on the gate electrode 4, the cathode electrode 2 is arranged on the insulating layer 3, and the electron-emitting layer 5 is arranged on the cathode electrode 2. In the case of the example shown in FIGS. 15A and 15B, the electron-emitting layer 5 is arranged on the cathode electrode 2, although this construction may be changed so that the electron-emitting layer doubles as the cathode electrode if the electron-emitting layer 5 has a sufficiently low resistance. In the case of the convex structure, w1 represents the width of the insulating layer 3 in a direction substantially parallel to the surface of the substrate 1 and h1 corresponds to the distance from the surface of the gate electrode 4 to the surface of the electron-emitting layer. Even in the electron-emitting device having this construction, by setting the voltage Vg–Vc applied between the gate and cathode electrodes during an OFF period so as to be below 0 V, it becomes possible to suppress the emission current during the OFF period regardless of the ratio w1/h1, in comparison with the conventional case where the voltage (Vg–Vc) during an OFF period is set to 0 V. In particular, the driving method of the present invention preferably becomes more effective if a condition of $w1/h1 \leq 10$ is satisfied. It is more preferable that a condition of $w1/h1 \leq 1$ is satisfied.

Example applications of the electron-emitting device in accordance with this embodiment are described below. For instance, an electron source or an image-forming apparatus may be constructed by arranging a plurality of electron-emitting devices in accordance with this embodiment on a substrate.

The electron-emitting devices can be arranged in an electron source in various manners. For instance, a plurality of the electron-emitting devices are arranged in an X direction and a Y direction to form rows and columns. There may be used a matrix configuration where one end of the electrode of each electron-emitting device arranged on the same row is commonly connected to an X-directional wiring, while the other end of the electrode of each electron-emitting device arranged on the same column is commonly connected to a Y-directional wiring. This matrix configuration is described in detail below.

In FIGS. 7 and 8, each of reference numerals 71 and 81 denotes an electron source substrate, each of numerals 72 and 82 X-directional wirings, and each of numerals 73 and 83 Y-directional wirings. Also, numeral 84 in FIG. 8 represents the electron-emitting devices in accordance with this embodiment.

There are m X-directional wirings 82 (Dx1, Dx2, ..., Dxm) that are made of a conductive metal or the like using a vacuum evaporation method, a printing method, a sputtering method, or the like. The material, thickness, and width of each wiring are designed as appropriate. There are n Y-directional wirings 83 (Dy1, Dy2, ..., Dyn) that are produced in the same manner as the X-directional wirings 82. An interlayer insulating layer (not shown) is provided between the m X-directional wirings 82 and the n Y-directional wirings 83 so as to electrically insulate these wirings. Here, m and n are each a positive integer.

The interlayer insulating layer (not shown) is made of $SiO_2$ or the like using a vacuum evaporation method, a printing method, a sputtering method, or the like. For instance, the interlayer insulating layer having a desired shape is produced to cover the entire or a part of the surface of the substrate 81 on which the X-directional wirings 82 have been formed. In particular, the thickness, material, and production method of the interlayer insulating layer are designated as appropriate so that the interlayer insulating layer is resistant to potential differences at the intersections of the X-directional wirings 82 and the Y-directional wirings 83. The X-directional wirings 82 and the Y-directional wirings 83 are extended to the outside as terminals.

There may be a case where the m X-directional wirings 82 of the electron-emitting devices 84 each double as the cathode electrode 2. Also, there may be a case where the n Y-directional wirings 83 each double as the gate electrode 4. Further, there may be a case where the interlayer insulating layer doubles as the insulating layer 3.

To select the rows of the electron-emitting devices 84 arranged in the X-direction, a scanning signal applying means (not shown) for applying a scanning signal is connected to the X-directional wirings 82. On the other hand, to modulate each column of the electron-emitting device 84 arranged in the Y-direction according to an input signal, a modulation signal generating means (not shown) is connected to the Y-directional wirings 83. The driving voltage applied to each electron-emitting device is supplied as the difference voltage between the scanning signal and the modulation signal applied to the electron-emitting device.

In FIG. 8 described above, the electron-emitting devices 84 are connected to connection wirings extending from the X-directional wirings 82 and the Y-directional wirings 83. However, as shown in FIG. 7, the electron-emitting devices may have a construction where the X-directional wirings 82 each double as the cathode electrode 2, the Y-directional wirings 83 each double as the gate electrode 4, holes are formed at the intersections of the X-directional wirings 72 and the Y-directional wirings 73, and the electron-emitting layer 5 is formed on the bottom surface of each hole.

The above-mentioned construction of the electron source makes it possible to select respective electron-emitting devices and independently drive the selected electron-emitting devices using matrix wiring. An image-forming apparatus constructed using an electron source having the foregoing matrix configuration is described below with reference to FIG. 9. This drawing is a schematic diagram showing an example of the image-forming apparatus.

Referring to FIG. 9, reference numeral 84 represents an electron-emitting device, numeral 81 a substrate of the electron source on which a plurality of electron-emitting devices are arranged, numeral 91 a rear plate to which the electron source substrate 81 is secured, numeral 96 a face plate having a construction where a fluorescent film 94, a metal back 95, and the like are formed on the internal surface of a glass substrate 93, and numeral 92 a support frame. The rear plate 91 and the face plate 96 are connected to the support frame 92 using frit glass or the like.

As described above, an envelope (panel) 98 is formed by the face plate 96, the support frame 92, and the rear plate 91. Because the rear plate 91 is provided to mainly reinforce the strength of the electron source substrate 81, the rear plate 91 is not required if the electron source substrate 81 itself has sufficient strength. As a result, the electron source substrate 81 and the rear plate 91 may be formed as a single component.

The envelope 98 is formed in the manner described below. Frit glass is applied to the connection planes between the face plate 96, on whose internal surface have been provided the fluorescent film 94 and the metal back 95 of the support frame 92, the rear plate 91, and the support frame 92. Then, the face plate 96, the support frame 92, and the rear plate 91 are fixed so that these components are connected at predetermined positions. Finally, the components are baked and sealed.

The heating means for baking and sealing of the components may be performed using various heating means, such as an infrared ray lamp for performing lamp heating or a hot plate.

Various materials other than the frit glass may be used to bond the components of the envelope 98 so long as a sufficient vacuum atmosphere is obtained after the sealing step.

The above-mentioned construction of the envelope 98 is merely an embodiment of the present invention. Therefore, the present invention is not limited to this and various different envelopes may be adopted.

For instance, the support frame 92 may be directly sealed to the electron source substrate 81 to form the envelope 98 using the face plate 96, the support frame 92, and the electron source substrate 81. Also, by installing a support member called a spacer (not shown) between the face plate 96 and the rear plate 91, the envelope 98 may be made to be sufficiently strong against the atmospheric pressure.

FIGS. 10A and 10B are each a schematic diagram of the fluorescent film 94 formed on the face plate 96. The fluorescent film 94 is formed using only a phosphor 105 in the case of monochrome display. In the case where the fluorescent film 94 is a color fluorescent film, the fluorescent film 94 is composed of black conductive members 106 called a black stripe or a black matrix and the phosphors 105.

The black stripe or the black matrix are provided to blacken the boundary among the phosphors 105 for the three primary colors required to display a color image so as to prevent striking of color mixture or the like and to prevent lowering of the contrast due to reflection of external light by the fluorescent film 94. The material of the black stripe or the black matrix may be a material, whose main ingredient is graphite which is widely used, or any other material so long as the selected material has conductivity and is capable of preventing light penetration and reflection.

As a method of applying a phosphor to the glass substrate 93, a precipitation method or a printing method is employed regardless of the display being monochrome or color. The metal back 95 is usually provided for the internal surface of the fluorescent film 94.

The reason for providing the metal back 95 is to serve as a mirror surface to reflect a portion, which travels inward, out of light emitted by the phosphor 105 to the face plate 96 so as to improve the brightness, to act as an electrode for applying a voltage for accelerating electron beams, and to protect the phosphor 105 from being damaged due to collision of negative ions generated in the envelope 98.

The metal back 95 can be formed by subjecting the inner surface of the fluorescent film 94 to a smoothing process (usually called "filming") after the fluorescent film 94 has been formed, and by depositing Al by a vacuum evaporation method or the like.

The face plate 96 may have a transparent electrode (not shown) between the fluorescent film 94 and the glass substrate 93 to improve the conductivity of the fluorescent film 94.

In this embodiment, because the electron-emitting device 84 emits an electron beam upward at a right angle, the fluorescent film 94 is arranged at a position that is directly above the electron-emitting device 84.

The following is a description of the vacuum sealing step for exhausting the air in the envelope (panel) 98 that has been subjected to the sealing step.

In the vacuum sealing step, the envelope (panel) 98 is heated and the temperature thereof is maintained at 80 degrees centigrade to 250 degrees centigrade. Under this condition, air in the device is exhausted by an exhaust apparatus, such as an ion pump or a sorption pump, through an exhaust pipe (not shown) to obtain an atmosphere in which organic substances are sufficiently decreased. Then, the exhaust pipe is heated by a burner. As a result, the exhaust pipe is melted and sealed.

To maintain the degree of vacuum after the envelope 98 has been sealed, a getter process may be performed. The getter process is a process for forming an evaporated film by heating a getter (not shown) disposed at a predetermined position in the envelope 98 by resistance heating, high-frequency heating or the like performed immediately before or after the envelope 98 has been sealed. The getter is usually mainly made of Ba or the like to form the evaporated film which has sorption effect to maintain the atmosphere in the envelope 98.

In an image-forming apparatus constructed using the matrix configuration electron source manufactured in the manner described above, a voltage is applied to each electron-emitting device 84 via external terminals Dox1 to Doxm and Doy1 to Doyn (corresponding to the wirings Dx1 to Dxm and Dy1 to Dyn, respectively) that are formed by extending the X-directional wirings 82 and the Y-directional wirings 83. By this voltage application, electron emission is performed.

A high voltage is applied to the metal back 95 or the transparent electrode (not shown) via a high voltage terminal 97 to accelerate electron beams.

The accelerated electron beams collide against the fluorescent film 94. As a result, light is emitted and image formation is performed.

FIG. 11 is a block diagram showing an example of a driving circuit that has the image-forming apparatus performing a display operation according to an NTSC television signal.

A scanning circuit 1102 is described below. The scanning circuit 1102 includes m switching devices (S1 to Sm schematically shown in FIG. 11). Each of the switching devices S1 to Sm selects either of the output voltages from a DC voltage source Vx1 and from DC voltage source Vx2 and is electrically connected to the external terminals Dox1 to Doxm of a display panel 1101 that is the image-forming apparatus.

Each of the switching devices S1 to Sm operates according to a control signal Tscan transmitted from a control circuit 1103. For instance, the switching devices S1 to Sm can be formed by combining switching devices such as FETs.

In this embodiment, the DC voltage sources Vx1 and Vx2 are set according to the characteristics of the foregoing electron-emitting device of this embodiment.

The control circuit 1103 synchronizes the respective operations to cause an appropriate display to be performed according to an image signal supplied from the outside. According to a synchronizing signal Tsync supplied from a synchronizing-signal separation circuit 1106, the control circuit 1103 generates control signals Tscan, Tsft and Tmry and supplies the control signals to the respective portions.

The synchronizing-signal separation circuit 1106 is a circuit for separating an NTSC television signal supplied from the outside into a synchronizing signal component and a brightness signal component. The synchronizing-signal separation circuit 1106 can be formed using a general frequency separation circuit (a filter) or the like.

The synchronizing signal separated by the synchronizing-signal separation circuit 1106 consists of a vertical synchronizing signal and a horizontal synchronizing signal. To simplify the description, the synchronizing signal is expressed as a Tsync signal. On the other hand, the brightness signal of images separated from the television signal is expressed as a DATA signal for simplifying the description. The DATA signal is supplied to a shift register 1104.

The shift register 1104 serial/parallel-converts the DATA signal serially supplied in a time sequential manner for each line of an image, and operates according to the control signal Tsft supplied from the control circuit 1103. That is, the control signal Tsft may be regarded as a shift clock for the shift register 1104.

Data for one line of the image (corresponding to data for driving n electron-emitting devices), which has been serial/parallel converted, is transmitted from the shift register 1104 as n parallel signals Id1 to Idn.

A line memory 1105 is a storage unit for storing, for a predetermined time, data for one line of the image, the line memory 1105 appropriately storing contents of Id1 to Idn in accordance with the control signal Tmry supplied from the control circuit 1103. The stored contents are, as Id'1 to Id'n, supplied to a modulation signal generator 1107.

The modulation signal generator 1107 is a signal source for appropriately driving and modulating each of the electron-emitting devices in this embodiment in accordance with each of image data Id'1 to Id'n. Output signals from the modulation signal generator 1107 are, through the terminals Doy1 to Doyn, supplied to the electron-emitting devices in the display panel 1101.

When a pulse voltage lower than an electron emission threshold value is applied to an electron-emitting device, no electron is emitted. If a voltage higher than the threshold value is applied, electrons (an electron beam) are emitted. By changing the wave height Vm of the voltage pulse, the intensity of the electron beam to be emitted can be controlled. By changing the width Pw of the voltage pulse, the total quantity of the charges of the electron beam to be emitted can be controlled.

Accordingly, the electron-emitting device can be modulated in accordance with an input signal by a voltage modulation method, a pulse-width modulation method, or the like.

In the case where the voltage modulation method is employed, the modulation signal generator 1107 may be a circuit of a voltage modulation type that generates a voltage pulse having a predetermined length and appropriately modulates the wave height of the pulse in accordance with the supplied data.

In the case where the pulse-width modulation method is employed, the modulation signal generator 1107 may be a pulse-width modulation circuit that generates a voltage pulse having a predetermined wave height and appropriately modulates the width of the voltage pulse in accordance with the supplied data.

The shift register 1104 and line memory 1105 may be of a digital signal type or an analog signal type so long as each of these units is capable of serial/parallel converting and storing the image signal at a predetermined speed.

In the case where the digital signal type units are employed, the output signal DATA from the synchronizing-signal separation circuit 1106 must be digitized by providing an A/D converter for the output portion of the synchronizing-signal separation circuit 1106. In relation to the foregoing structure, the circuit to be provided for the modulation signal generator 1107 is somewhat varied according to whether the output signal from the line memory 1105 is a digital signal or an analog signal.

That is, in the case where the voltage modulation method employing the digital signal is employed, a known A/D conversion circuit is employed in the modulation signal generator 1107, and an amplifying circuit and the like are added as necessary. In the case where the pulse-width modulation method employing the digital signal is employed, the modulation signal generator 1107 is formed using a circuit formed by combining, for example, a high-speed oscillator, a counter for counting the number of waves transmitted by the oscillator, and a comparator for comparing an output value from the counter and an output value from the foregoing memory. As the need arises, an amplifier may be added which amplifies the voltage of the modulation signal, which has been transmitted from the comparator and the pulse width of which has been modulated, to the level of the voltage for driving the electron-emitting device of this embodiment.

In the case where the voltage modulation method employing an analog signal is employed, an amplifying circuit including an operational amplifier or the like may be employed as the modulation signal generator 1107. As the need arises, a level shift circuit or the like may be added. In the case where the pulse-width modulation method employing an analog signal is employed, a voltage controlled oscillation circuit (VCO) may be employed, for instance. As the need arises, an amplifier may be added which amplifies the voltage to the level of the voltage for driving the electron-emitting device of this embodiment.

FIG. 12A is an example timing chart in the case of the pulse-width modulation method.

In a driving state (ON state), the anode voltage Va is maintained at a certain level. The terminals Dox1 to Dxom are connected to the cathode electrodes, sequentially receive a signal as a scanning signal, and select one of the voltages from the DC voltage sources Vx1 and Vx2. Also, the terminals Doy1 to Doyn are connected to the gate electrodes, sequentially receive a modulation signal, and select one of the voltages from 0V and from the DC voltage source Vy1.

FIG. 12B shows an example of a driving voltage that is applied to each electron-emitting device according to matrix control.

As shown in this drawing, in all devices other than the devices that are selectively placed in ON states, which is to say all devices that are placed in OFF states, the voltage (Vg-Vc) is set so as to be below zero according to the controlling method in accordance with this embodiment.

The foregoing structure of the image-forming apparatus is merely an example of the image-forming apparatus in accordance with this embodiment. Therefore, various modifications may be made according to the technical principals of the present invention. Although the NTSC input signal has been described, a format of an input signal employed in the image-forming apparatus of the present invention is not limited to the NTSC signal. Another method, such as PAL or SECAM, may be employed. Another television signal method using further large number of scanning lines (for example, a high-quality television method typified by the MUSE method) may be employed.

Also, aside from the display apparatus, the image-forming apparatus of the present invention may be used as an image-forming apparatus for a light beam printer comprising a photosensitive drum, for instance.

<Embodiments>
Embodiments of the present invention are described in detail below.

<First Embodiment>
FIGS. 1A and 1B are a plan view and a cross-sectional view of the electron-emitting device of the first embodiment, while FIG. 6 shows a method of manufacturing the same. The method of manufacturing the electron-emitting device of this example is described in detail below.

(Step 1)
First, as shown in FIG. 6A, the substrate 1 is prepared by sufficiently cleaning a quartz glass. Following this, with a sputtering method, a Ta film having a thickness of 300 nm is formed as the cathode electrode 2.

(Step 2)
Next, as shown in FIG. 6B, the insulating layer 3 that is an $SiO_2$ film having a thickness of 600 nm and the gate electrode 4 that is a Ta film having a thickness of 100 nm are stacked in this order.

(Step 3)
Then, as shown in FIG. 6C, a photomask pattern of a positive photoresist (AZ1500 manufactured by Clariant) is formed by spin coating, and is exposed to light and developed with a photolithography method to obtain a mask pattern 41.

21

(Step 4)

Next, as shown in FIG. 6D, dry etching is performed using $CF_4$ gas from above the mask pattern 41 functioning as a mask, so that the Ta gate electrode 4 and the $SiO_2$ insulating layer 3 are etched. This etching operation is terminated before the cathode electrode 2 is also processed. In this manner, a circular hole whose opening width w1 is 3 μm is formed.

(Step 5)

Following this, as shown in FIG. 6E, a diamond like carbon film having a thickness of 100 nm is stacked on the entire surface with a plasma CVD method. In this manner, the electron-emitting layer 5 made of diamond like carbon is formed on the bottom surface of the hole. $CH_4$ gas is used as the reaction gas. Reference numeral 5' denotes the diamond like carbon film stacked on the mask pattern 41 during the formation of the electron-emitting layer 5.

(Step 6)

Finally, as shown in FIG. 6F, the mask pattern 41 is completely removed to obtain the electron-emitting device of this example. In this device, the depth h1 of the hole is set to 500 nm.

As shown in FIG. 1A, the anode electrode 7 is arranged over the thus-manufactured electron-emitting device so that a distance H of 2 mm is maintained therebetween. Then, the control operation shown in FIG. 2A is performed. During the driving of the device, the voltages Va, V1, and V2 are set to 10 kV, 20 V, and 2 V, respectively. As a first comparative example, the voltages V1 and V2 are set to 20 V and 0 V, respectively.

Here, an electrode formed by applying a phosphor is used as the anode electrode 7 and an electron beam size is observed. The term "electron beam size" refers to a size of a beam area in which is observed at least 10% of the peak brightness of the light emitted from the phosphor.

Under these conditions, the electron beam diameter of the electron-emitting device during an ON period becomes Ø 150 μm in both this example and the first comparative example.

In the first comparative example, however, the amount of the emission current Ie that remains during an OFF period becomes 1/6 of that of the emission current Ie during an ON period, and light emission from the phosphor is observed during the OFF period. On the other hand, in this embodiment, the amount of the emission current Ie that remains during an OFF period becomes 1/100 or less of that of the emission current Ie during an ON period, and no light emission from the phosphor is observed.

In this embodiment, $Eg=18\ V/0.5\ \mu m=3.6\times 10^7\ V/m$, $Ea=10\ kV/2\ mm=5\times 10^6\ V/m$, and $Eg/Ea=7.2$.

Accordingly, this example realizes electric field conditions that efficiently control the electron-emitting device.

<Second Embodiment>

In this embodiment, another control method of the present invention is described.

Like in the first embodiment, the electron-emitting device shown in FIG. 1 is used in this embodiment. However, the distance H between the device and the anode electrode 7 is set to 1 mm and the anode voltage Va is set to 15 kV in this embodiment.

The control operation shown in FIG. 2B is performed in this embodiment. Also, as the second comparative example, the voltages V1 and V2 are respectively set to 15 V and 0 V, like in the first comparative example described in the first embodiment.

With the construction of this example, the electric field between the device and the anode electrode 7 is three times as strong as that in the first embodiment.

22

The electron emission current Ie remains during an OFF period if the voltage V2 is set to 2 V like in the first embodiment. Therefore, the voltage V2 is set to 4 V. On the other hand, even if the voltage V1 during an ON period is set to 16 V, a sufficient emission current Ie is obtained and the amount of the emission current Ie that remains during an OFF period becomes 1/100 or less than that of the emission current Ie during an ON period.

Also, as the second comparative example, the voltages V1 and V2 are set to 16 V and 0 V, respectively. In this case, the amount of the emission current Ie that remains during an OFF period becomes 1/4 of that of the emission current Ie during an ON period. As a result, the situation becomes worse in comparison with the first comparative example.

In this embodiment, the driving voltage Vg–Vc during an ON period becomes 12 V, so that the effective driving voltage is lowered in comparison with the first embodiment.

Also, in this embodiment, the electron beam diameter becomes Ø 130 μm that is smaller than that in the first embodiment.

In this embodiment, $Eg=12\ V/0.5\ \mu m=2.4\times 10^7\ V/m$, $Ea=15\ kV/2\ mm=7.5\times 10^6\ V/m$, and $Eg/Ea=3.2$.

<Third Embodiment>

In this embodiment, the image-forming apparatus shown in FIG. 9 is formed using an electron source including a plurality of electron-emitting devices of the second embodiment that are wired in the matrix manner shown in FIG. 7. Also, the driving circuit shown in FIG. 11 is formed in the apparatus and the control operation shown in FIG. 12 is performed. The voltages Vx1, Vx2, and Vy1 are set to 4 V, 20 V, and 16 V, respectively. Also, like the second embodiment as the third comparative example, the voltages V1 and V2 are respectively set to 16 V and 0 V, the voltages Vg and Vc during an OFF period are both set to 0 V, and the apparatus having the passive matrix configuration is controlled under these conditions for comparison.

The electron-emitting devices are arranged so that the intervals in the X direction and the intervals in the Y direction are both set to 150 μm. The fluorescent film 74 is arranged over the devices. With this construction, in the third comparative example, the contrast is lowered and an image that is entirely bright and blurred is obtained. However, with the image-forming apparatus of the third embodiment, light emission is not performed in pixels placed in an OFF state and therefore an image having a sufficient contrast is obtained.

As shown in FIG. 12B, in the case of matrix driving, a condition called "half select" is set for each line composed of devices in an ON state. Even in the case of the matrix driving, the electron-emitting device control method described above can be used even if the devices in each line under the half-select condition are placed in an OFF state. In this embodiment, the voltage (Vg–Vc) in each device placed in an OFF state falls below 0 V.

<Fourth Embodiment>

Next, the fourth embodiment is described. In this embodiment, a diamond film is formed as the electron-emitting layer 5 of the device shown in FIG. 1. The electron-emitting device of this example is manufactured in the same manner as in the first embodiment by appropriately changing the materials of the electrodes and the manufacturing method.

Like in the first embodiment, the anode electrode 7 is arranged so that a distance H of 2 mm is maintained between the anode electrode 7 and the device. Then, the control operation shown in FIG. 2A is performed by setting the voltages Va, V1, and V2 at 10 kV, 15 V, and 2 V, respectively.

Under these conditions, the emission current Ie is controlled in the same manner as in the first embodiment. In this embodiment, the driving voltage can be lowered in comparison with the first embodiment.

<Fifth Embodiment>

The fifth embodiment is described below. In this embodiment, the construction of the hole of the electron-emitting device shown in FIG. 1 is changed and the manufacturing method described in the first embodiment is used.

The opening width w1 of the hole of the electron-emitting device is changed to 5 µm, but the hole depth h1 is not changed from the first embodiment and is set to 500 nm.

Also, like in the first embodiment, the anode electrode 7 is arranged so that a distance H of 2 mm is maintained between the electrode 7 and the device. By setting the voltage Va at 10 kV, the control operation shown in FIG. 2A is performed. If the voltages V1 and V2 are respectively set to 19 V and 4 V, the same ON-OFF contrast as in the first embodiment is obtained.

In this embodiment, however, the ratio w1/h1 is high in comparison with the first embodiment, so that the electric field from the anode electrode 7 tends to remain. Accordingly, like in the case where the anode voltage Va is increased in the second embodiment, the voltage V2 should be increased to some extent, although the voltage V1 can be decreased.

FIGS. 5A and 5B each show how the strength of the remaining electric field Ea changes in accordance with the change in w1/h1. If w1/h1<1, the remaining electric field becomes almost zero even if the voltages Vc and Vg are both set to 0 V during an OFF period. In this case, the effect of the electron-emitting device driving method of the present invention to suppress the strength of a remaining electric field is decreased.

In this case, however, the electron-emitting device driving method of the present invention may be used without adversely affecting.

<Sixth Embodiment>

The sixth embodiment is shown in FIGS. 13A to 13C. In this embodiment, the electron-emitting construction of the electron-emitting device is changed.

In FIG. 13A, the insulating layer 3 is laminated on the electron-emitting layer 5. The control operation performed for the construction shown in FIG. 1 can also be performed for this construction.

In FIGS. 13B and 13C, two cathode electrode layers 2a and 2b are formed and the electron-emitting layer 5 is formed so that the surface thereof is lower than the surface of the cathode electrode layer 2b with reference to the substrate 1. With this construction, the potential distribution within the hole changes and an effect of decreasing the electron beam diameter is achieved. Also, in this embodiment, the effect of suppressing the strength of a remaining electric field is obtained using the electron-emitting device driving method of the present invention.

<Seventh Embodiment>

The seventh embodiment is shown in FIGS. 14A and 14B. In this embodiment, the electron-emitting device has a construction that differs from those described in the aforementioned examples.

FIG. 14A shows a construction where a plurality of holes are formed, while FIG. 14B shows a construction where the hole has a rectangular opening shape.

In either case of these drawings, electron emission is performed in a large area in comparison with the first embodiment.

In this embodiment, an electric field that is different from those in the aforementioned examples is generated in accordance with the construction. However, the same effect as in the examples described above is obtained by appropriately changing the conditions concerning the driving voltage using the electron-emitting device controlling method of the present invention.

<Eighth Embodiment>

The eighth embodiment is shown in FIGS. 15A and 15B. FIG. 15A is a cross-sectional view of the electron-emitting device of this example, while FIG. 15B is a plain view taken from above of the electron-emitting device.

Instead of the hole construction, the electron-emitting device of this example has a convex construction where the gate electrode 4, the insulating layer 3, the cathode electrode 2, and the electron-emitting layer 5 are laminated in this order on the substrate 1.

The components of the electron-emitting device are formed using the same materials as in the first embodiment, and the width w1 of the cathode electrode 2 is set to 3 µm. However, the thicknesses of the cathode electrode 2, the insulating layer 3, and the gate electrode 4 are set to 100 nm, 500 nm, and 2 µm, respectively. Also, the electron-emitting layer 5 is not arranged to cover the entire top surface of the cathode electrode 2 and the width w2 of this layer is set to 2 µm in this embodiment.

In this embodiment, the gate electrode 4 is arranged under the insulating layer 3, although the same effect as in the first embodiment is obtained by applying the same potentials as in the first embodiment between the gate electrode and the cathode electrode.

Accordingly, under the same conditions as in the first embodiment, a favorable control operation is performed by setting the voltages V1 and V2 at 18 V and 4 V, respectively.

Also, FIG. 16A shows the electric field that remains in the present electron-emitting device having the convex construction when the voltage Vg−Vc is set to 0 V. Unlike the case of the hole construction shown in FIG. 4, the convex construction has a characteristic that the strength of the remaining electric field is increased in accordance with the decrease in the ratio w1/h1. Also, as shown in FIG. 16B, the driving method of the present invention (see the solid line shown in FIG. 16B) achieves a profound effect of suppressing the electron emission during an OFF period, in comparison with a conventional driving method (see the broken line shown in FIG. 16B). Also, this effect is obtained regardless of how the ratio w1/h1 is set.

Accordingly, irrespective of the ratio w1/h1, the present electron-emitting device having the convex construction effectively suppresses the electron emission during an OFF period, in comparison with a conventional driving method. It is preferable that a condition "w1/h1≦10" is satisfied, and it is more preferable that a condition "w1/h1≦1" is satisfied.

Also, in this embodiment, if the ratio w1/h1 is set to 0.5 (w1=0.25 µm, h1=0.5 µm), electron emission is performed even if the voltage Vg is set to 5V.

As described above, with the present invention, electron emission from an electron-emitting device placed in a halt state is effectively suppressed. This realizes favorable control of an electron-emitting device that emits an electron beam having a small electron beam diameter, has a large area in which electron emission is performed, is manufactured without difficulty, operates with a low driving voltage, and performs high-efficiency electron emission.

Also, a high-performance electron source is realized using such an electron-emitting device. Further, an image-forming apparatus that does not suffer from the lowering of a contrast is realized using such an electron-emitting device.

What is claimed is:

1. A method of driving an image-forming apparatus, the image-forming apparatus comprising (i) a first substrate having arranged thereon (a) a plurality of scanning wirings, (b) a plurality of signal wirings which intersect with the plurality of scanning wirings, (c) a plurality of electron-emitting devices each of which includes (c1) a cathode electrode connected to one of the scanning wirings, (c2) a gate electrode being arranged over the cathode electrode and connected to one of the signal wirings, (c3) an insulating layer being arranged between the cathode electrode and the gate electrode, (c4) a hole, penetrating the gate electrode and the insulating layer, having a wide w1, wirings, and a depth h1 which is not larger than w1, and (c5) an electron-emitting film being arranged on the cathode electrode and arranged within the hole, and (ii) a second substrate, which is arranged at a distance not less than 1 mm from the first substrate, and having arranged thereon (d) a light-emitting film including a phosphor, and (e) an anode electrode, made of aluminum, covering the light-emitting film, and facing the plurality of electron-emitting devices, said method comprising the steps of:

applying a voltage not less than 10 kV between the anode electrode and the cathode electrode;

applying a scanning pulse sequentially to the plurality of scanning wirings; and applying signal pulses to the plurality of signal wirings, so that at least some of the plurality of electron-emitting devices connected to those scanning wirings are driven, wherein if a voltage of the scanning pulse is referred to as Vc and a voltage of each signal pulse is referred to as Vg, a voltage that satisfies the condition of (Vg−Vc)>0 is applied to each electron-emitting device to be driven, and a voltage that satisfies the condition of (Vg−Vc)<0 is applied to each electron-emitting device other than the electron-emitting devices to be driven.

2. A method according to claim 1, wherein if (i) the anode voltage applied to the anode electrode is referred to as Va, a distance between the cathode electrode and the anode electrode is referred to as H, and a distance between the cathode electrode and the gate electrode is referred to as h, (ii) an average strength of an electric field, which is applied between the cathode electrode and the gate electrode to cause the electron emission from the electron-emitting device, is set to Eg=(Vg−Vc)/h, and (iii) an average strength of an electric field applied between the electron-emitting device and the anode electrode is set to Ea=Va/H, the condition of Eg/Ea≦100 is satisfied.

3. A method according to claim 1, wherein if (i) the anode voltage applied to the anode electrode is referred to as Va, a distance between the cathode electrode and the anode electrode is referred to as H, and a distance between the cathode electrode and the gate electrode is referred to as h, (ii) an average strength of an electric field, which is applied between the cathode electrode and the gate electrode to cause the electron emission from the electron-emitting device, is set to Eg=(Vg−Vc)/h, and (iii) an average strength of an electric field applied between the electron-emitting device and the anode electrode is set to Ea=Va/H, the condition of Eg/Ea≦10 is satisfied.

4. A method according to claim 1, whrein the electron-emitting film is substantially flat, and the electron-emitting film is arranged substantially parallel to the anode electrode.

5. A method according to claim 1, wherein an electric field that is necessary for electron emission from the electron-emitting film is equal to or lower than $5 \times 10^7$ V/m, and if an anode voltage applied to the anode electrode is referred to as Va and a distance between the cathode electrode and the anode electrode is referred to as H, Ea=Va/H is equal to or greater than $5 \times 10^6$ V/m.

6. A method according to any one of claims 1, 2, and 3, wherein the electron-emitting film is a film made of one of diamond, diamond-like carbon, and a carbon fiber.

7. A method according to any one of claims 1, 2, and 3, wherein the plurality of electron-emitting devices are wired in a matrix manner.

8. An image-forming apparatus comprising:

(i) a first substrate having arranged thereon (a) a plurality of scanning wirings, (b) a plurality of signal wirings which intersect with the plurality of scanning wirings, (c) a plurality of electron-emitting devices each of which includes (c1) a cathode electrode connected to one of the scanning wirings, (c2) a gate electrode being arranged over the cathode electrode and connected to one of the signal wirings, (c3) an insulating layer being arranged between the cathode electrode and the gate electrode, (c4) a hole, penetrating the gate electrode and the insulating layer, having a width W1 and a depth h1 which is not larger than w1, and (c5) an electron-emitting film arranged on the cathode electrode and arranged within the hole, and (ii) a second substrate, which is arranged at a distance not less than 1 mm from the first substrate, and having arranged thereon (d) an image forming member, (e) an anode electrode, made of aluminum, covering the image forming member and facing the plurality of electron-emitting devices, and (f) a driver for applying a voltage not less than 1 kV between the anode electrode and the cathode electrode, for applying a scanning pulse sequentially to a plurality of scanning wirings and for applying signal pulses to the plurality of signal wirings, so that at least some of the plurality of electron-emitting devices connected to those scanning wirings are driven, wherein if a voltage of the scanning pulse is referred to as Vc and a voltage of each signal pulse is referred to as Vg, a voltage that satisfies the condition of (Vg−Vc)>0 is applied to each electron-emitting device to be driven, and a voltage that satisfies the condition of (Vg−Vc)>0 is applied to each electron-emiting device other than the electron-emitting devices to be driven.

9. An image-forming apparatus according to claim 8, wherein the image-forming member is a phosphor.

10. A method of driving an image-forming apparatus according to claim 1, wherein an outer edge of the electron-emitting film is arranged inside of an outer edge of the cathode electrode.

11. An image-forming apparatus according to claim 9, wherein the gate electrode is arranged on the first substrate and the cathode electrode is arranged on the gate electrode with an insulating layer therebetween.

12. An image-forming apparatus according to claim 9, wherein an outer edge of the electron-emitting film is arranged inside of an outer edge of the cathode electrode.

* * * * *